US011825091B2

(12) United States Patent
Haase et al.

(10) Patent No.: US 11,825,091 B2
(45) Date of Patent: Nov. 21, 2023

(54) TRANSFORM COEFFICIENT BLOCK CODING

(71) Applicant: FRAUNHOFER-GESELLSCHAFT ZUR FÖRDERUNG DER ANGEWANDTEN FORSCHUNG E.V., Munich (DE)

(72) Inventors: Paul Haase, Berlin (DE); Christian Rudat, Berlin (DE); Heiner Kirchhoffer, Berlin (DE); Phan Hoang Tung Nguyen, Berlin (DE); Mischa Siekmann, Berlin (DE); Heiko Schwarz, Berlin (DE); Detlev Marpe, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 18/104,424

(22) Filed: Feb. 1, 2023

(65) Prior Publication Data
US 2023/0188718 A1 Jun. 15, 2023

Related U.S. Application Data

(60) Division of application No. 17/033,306, filed on Sep. 25, 2020, now Pat. No. 11,601,648, which is a
(Continued)

(30) Foreign Application Priority Data
Mar. 29, 2018 (EP) .................................. 18165247

(51) Int. Cl.
*H04N 19/124* (2014.01)
*H04N 19/129* (2014.01)
(Continued)

(52) U.S. Cl.
CPC ......... *H04N 19/124* (2014.11); *H04N 19/129* (2014.11); *H04N 19/13* (2014.11);
(Continued)

(58) Field of Classification Search
CPC .... H04N 19/124; H04N 19/129; H04N 19/13; H04N 19/157; H04N 19/172;
(Continued)

(56) References Cited

U.S. PATENT DOCUMENTS

| 5,946,043 A | 8/1999 | Lee et al. |
| 7,702,013 B2 | 4/2010 | Schwarz |

(Continued)

FOREIGN PATENT DOCUMENTS

| CN | 103999367 | 8/2014 |
| EP | 1044566 | 10/2000 |

(Continued)

OTHER PUBLICATIONS

Final Office Action dated Jul. 26, 2022 in Japanese patent application 2020-552882 (with translation).
(Continued)

*Primary Examiner* — Joseph Suh
(74) *Attorney, Agent, or Firm* — NIXON & VANDERHYE P.C.

(57) ABSTRACT

A video encoder is configured to entropy encode an absolute value of a quantization level of a current transform coefficient at position (xC, yC), wherein the absolute value is encoded using context adaptive binary arithmetic encoding of bins of a first binarization. The video coder is further configured, for the current transform coefficient, to encode a bin of the first binarization by using a context which is determined based on a sum of minimum absolute values of transform coefficient quantization levels, based on encoded bins of the first binarization, at one or more transform
(Continued)

coefficient positions among (xC+1, yC), (xC+2, yC), (xC+1, yC+1), (xC, yC+1), and (xC, yC+2).

36 Claims, 19 Drawing Sheets

Related U.S. Application Data continuation of application No. PCT/EP2019/057895, filed on Mar. 28, 2019.

(51) Int. Cl.
| | | |
|---|---|---|
| H04N 19/13 | (2014.01) | |
| H04N 19/157 | (2014.01) | |
| H04N 19/176 | (2014.01) | |
| H04N 19/18 | (2014.01) | |
| H04N 19/186 | (2014.01) | |
| H04N 19/60 | (2014.01) | |
| H04N 19/172 | (2014.01) | |

(52) U.S. Cl.
CPC ......... *H04N 19/157* (2014.11); *H04N 19/172* (2014.11); *H04N 19/176* (2014.11); *H04N 19/18* (2014.11); *H04N 19/186* (2014.11); *H04N 19/60* (2014.11)

(58) Field of Classification Search
CPC .... H04N 19/176; H04N 19/18; H04N 19/186; H04N 19/60; H04N 19/96; H04N 19/132; H04N 19/463; H04N 19/91
See application file for complete search history.

(56) References Cited

U.S. PATENT DOCUMENTS

| | | | |
|---|---|---|---|
| 10,687,062 B1* | 6/2020 | Ramaswamy | H04N 19/177 |
| 2005/0253740 A1 | 11/2005 | Marpe | |
| 2006/0008009 A1* | 1/2006 | Bao | H04N 19/70 |
| | | | 375/E7.199 |
| 2010/0040136 A1 | 2/2010 | Sabo | |
| 2012/0207400 A1* | 8/2012 | Sasai | H04N 19/13 |
| | | | 382/233 |
| 2013/0114673 A1 | 5/2013 | Chien | |
| 2013/0114676 A1 | 5/2013 | Guo | |
| 2013/0195199 A1* | 8/2013 | Guo | H04N 19/91 |
| | | | 375/240.18 |
| 2013/0202029 A1 | 8/2013 | Lou | |
| 2013/0258052 A1* | 10/2013 | Li | H04N 13/161 |
| | | | 348/43 |
| 2013/0293738 A1* | 11/2013 | Kulkarni | H04N 19/152 |
| | | | 348/222.1 |
| 2013/0322531 A1* | 12/2013 | Chen | H04N 19/30 |
| | | | 375/240.12 |
| 2013/0343464 A1 | 12/2013 | Van Der Auwera et al. | |
| 2014/0225912 A1* | 8/2014 | Govil | G09G 3/3466 |
| | | | 345/593 |
| 2015/0010055 A1 | 1/2015 | Hsu et al. | |
| 2015/0181225 A1 | 6/2015 | Seregin | |
| 2015/0264362 A1 | 9/2015 | Joshi | |
| 2015/0334405 A1 | 11/2015 | James | |
| 2016/0044339 A1 | 2/2016 | Sung | |
| 2016/0094852 A1 | 3/2016 | Joshi et al. | |
| 2017/0064336 A1 | 3/2017 | Zhang | |
| 2017/0111643 A1* | 4/2017 | Bugdayci Sansli | H04N 19/184 |
| 2018/0249179 A1* | 8/2018 | Han | H04N 19/137 |
| 2018/0278958 A1* | 9/2018 | Hsiang | H04N 19/60 |
| 2018/0343471 A1* | 11/2018 | Jacobson | H04N 19/152 |
| 2019/0124342 A1* | 4/2019 | Young | H04N 19/93 |
| 2019/0215524 A1 | 7/2019 | Lee | |
| 2020/0045345 A1 | 2/2020 | Moon | |

FOREIGN PATENT DOCUMENTS

| | | | |
|---|---|---|---|
| EP | 2999218 | 3/2016 | |
| JP | 4295356 | 4/2009 | |
| JP | 4295356 B1 | 7/2009 | |
| WO | WO 2013/107908 A1 | 7/2013 | |
| WO | WO 2015/147378 A1 | 10/2015 | |
| WO | WO 2016/196369 A1 | 12/2016 | |
| WO | WO-2016196379 A1 * | 12/2016 | ........... H04N 19/122 |

OTHER PUBLICATIONS

Non-final office action dated Jul. 25, 2022 in U.S. Appl. No. 17/033,468, 32 pp.
Office Action dated May 25, 2022 for Chinese application 201980036095.3 (with translation).
Indian First Examination Report dated Mar. 12, 2021 for Indian patent application 202027042357.
Office Action dated Jan. 4, 2021 in Japanese patent application 2020-552882 (with translation).

* cited by examiner

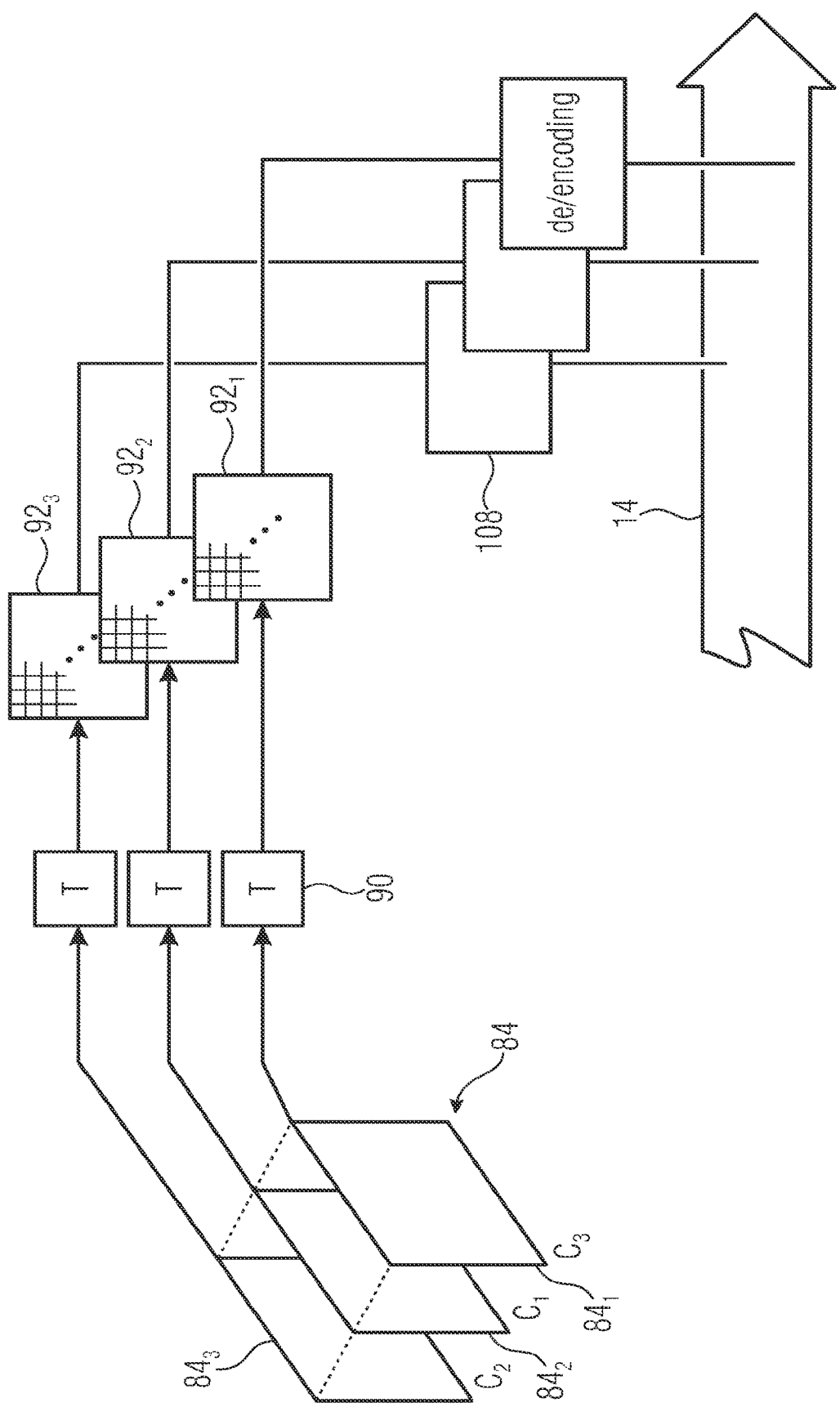

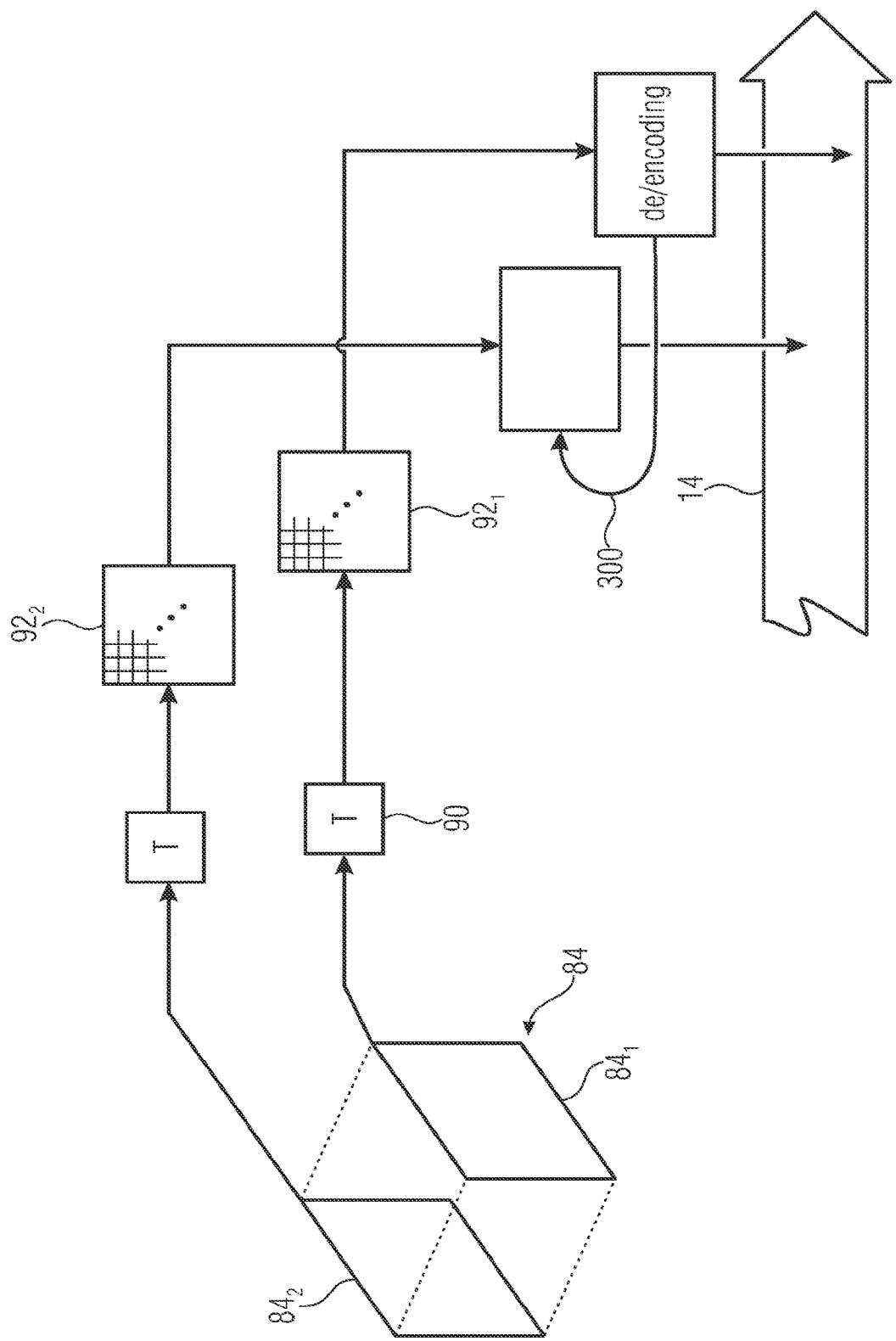

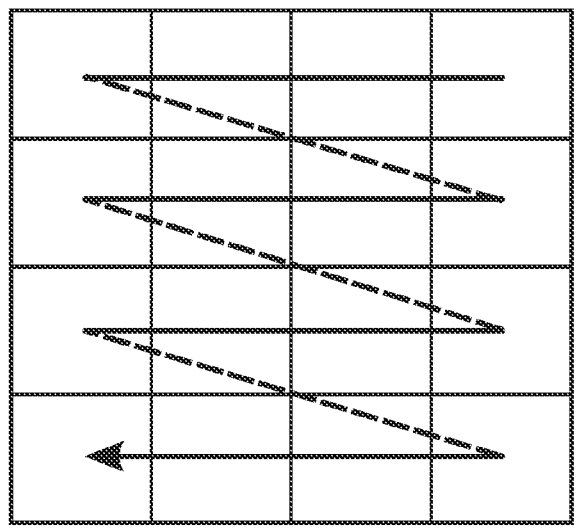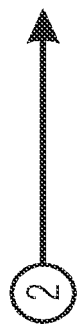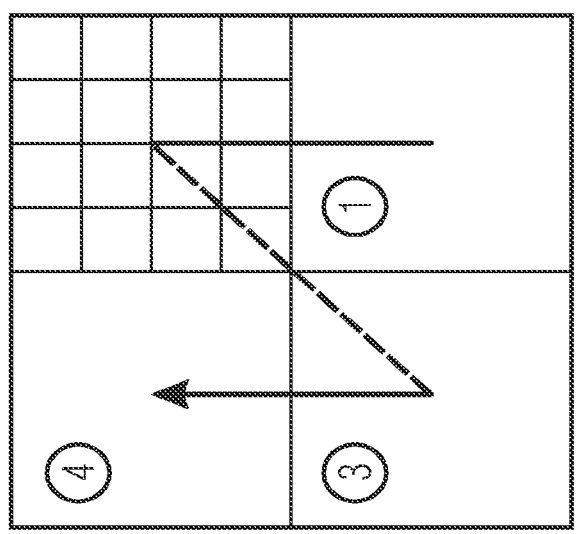
Fig. 19

```
>> CBF == 1: select scanning pattern: horizontal, vertical, diagonal
    >> last significant position in X and Y, derive last subblock
    >> for each subblock, starting with the subblock covering the last signifi-
        cant position
        >> for each scanning position within subblock
            >> code significance flag
        >> for each scanning position within subblock
        >> and significance positions, up to eight times
            >> code if level is greater than one
        >> for each scanning position within subblock
         >> and levels greater one, once
            >> code if level is greater than two
        >> for each scanning position within subblock
        >> and terminating bin is not equal to zero
            >> code remaining absolute level
        >> for each scanning position within subblock
        >> and significance positions
            >> code sign information, skip one sign if SBH condition holds true
```

Fig. 20

```
>> input: absolute level x = x0 + x1 + x2, Rice parameter k, b0
>> determine b1 = f(k)
>> truncated Unary(x0)
>> if x0 >= b0: Rice(x1) using k
>> if x1 >= b1: ExpGolomb(x2) using k+1
```

Fig. 21

```
>> input: absolute level x = x0 + x1 + x2, Rice parameter k, b0
>> determine b1 = f(k)
>> truncated Unary(x0)
>> if x0 >= b0: Rice(x1) using k
>> if x1 >= b1: ExpGolomb(x2) using k+1
```

Fig. 22

```
>> CBF == 1: select scanning pattern: horizontal, vertical, diagonal
   >> last significant position in X and Y, derive last subblock
   >> for each subblock, starting with the subblock covering the last signifi-
      cant position
      >> for each scanning position within subblock
         >> code significance flag
         >> if significant,
            >> code if level is greater than one
         >> if greater than one,
            >> code if level is greater than two
         >> if terminating bin is not equal to zero
            >> code remaining absolute level
   >> for each scanning position within subblock
   >> and significance positions
      >> code sign information, skip one sign if SBH condition holds true
```

Fig. 23

```
>> CBF == 1: select scanning pattern: horizontal, vertical, diagonal
>> last significant position in X and Y, derive last subblock
>> for each subblock, starting with the subblock covering the last signifi-
     cant position
   >> for each scanning position within subblock
      >> code significance flag
      >> if significant,
         >> code if level is greater than one
      >> if greater than one,
         >> code if level is greater than two
      >> if terminating bin is not equal to zero
         >> code remaining absolute level
   >> for each scanning position within subblock
   >> and significance positions
      >> code sign information, skip one sign if SBH condition holds true
```

Fig. 24

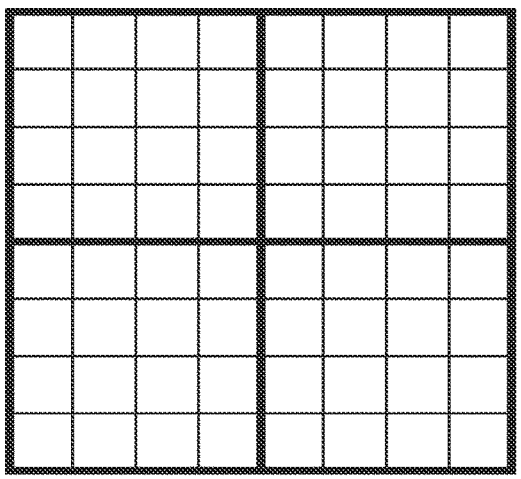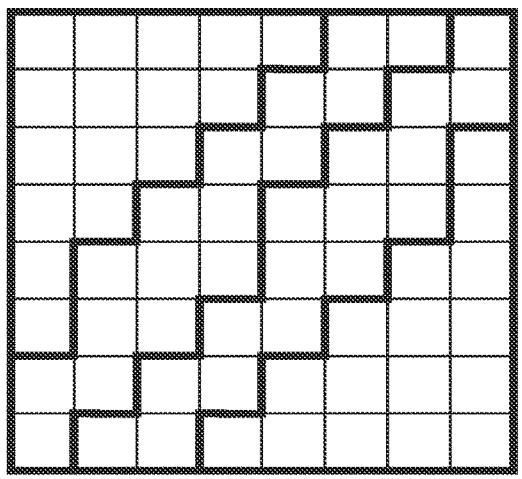

Fig. 25

TRANSFORM COEFFICIENT BLOCK CODING

CROSS-REFERENCES TO RELATED APPLICATIONS

This application is a divisional of U.S. patent application Ser. No. 17/033,306, filed Sep. 25, 2020, which in turn is a continuation of International Application No. PCT/EP2019/057895, filed Mar. 28, 2019, which is incorporated herein by reference in its entirety, and additionally claims priority from European Application No. EP 18 165 247.0, filed Mar. 29, 2018, which is incorporated herein by reference in its entirety.

BACKGROUND OF THE INVENTION

The present application is concerned with the coding of pictures and videos using transform coefficient block coding.

In other words, the present application to the field of digital signal processing and, in particular, to methods and devices for image and video decoders and encoders.

SUMMARY

An embodiment may have an encoder for encoding a picture into a data stream, configured to subject a block of the picture separately for a first color component and a second color component to a transformation to acquire a first transform coefficient block and a second transform coefficient block, respectively, entropy encode the second transform coefficient block context-adaptively using a context which depends on the first transform coefficient block.

Another embodiment may have a decoder for decoding a picture from a data stream, configured to derive a block of the picture by, separately for a first color component and a second color component, a reverse transformation of a first transform coefficient block and a second transform block, respectively, entropy decode the second transform coefficient block context-adaptively using a context which depends on the first transform coefficient block.

Another embodiment may have an encoder for encoding a picture into a data stream, configured to encode a transform coefficient block representing a block of the picture into the data stream using a scan pattern which sequentially traverses transform coefficients of the transform coefficient block by encoding into the data stream data representing a coded set of transform coefficients traversed by the scan pattern [or scan path] from a first termination coefficient position in a predetermined direction to a second termination coefficient, the data having quantization levels of the transform coefficients in the coded set of transform coefficients, wherein the encoder is configured to entropy encode the quantization levels context-adaptively using a first set of contexts for the quantization level of the transform coefficient at the first termination coefficient position or at the second termination coefficient position which is disjoint to a second set of contexts used for any other transform coefficient in the coded set of transform coefficients.

Another embodiment may have a decoder for decoding a picture from a data stream, configured to decode a transform coefficient block representing a block of the picture from the data stream using a scan pattern which sequentially traverses transform coefficients of the transform coefficient block by decoding from the data stream data representing a coded set of transform coefficients traversed by the scan pattern from a first termination coefficient position in a predetermined direction to a second termination coefficient position, the data having quantization levels of the transform coefficients in the coded set of transform coefficients, wherein the decoder is configured to entropy decode the quantization levels context-adaptively using a first set of contexts for the quantization level of the transform coefficient at the first termination coefficient position or at the second termination coefficient position which is disjoint to a second set of contexts used for any other transform coefficient in the coded set of transform coefficients.

Another embodiment may have an encoder for encoding a picture into a data stream, configured to entropy encode a quantization level of a currently encoded transform coefficient of a transform coefficient block representing a block of the picture context-adaptively by use of a context which is determined based on a sum of, and/or a number of significant ones among, one or more previously encoded transform coefficients located at positions determined by a local template positioned at the currently encoded transform coefficient.

Another embodiment may have a decoder for decoding a picture from a data stream, configured to entropy decode a quantization level of a currently decoded transform coefficient of a transform coefficient block representing a block of the picture context-adaptively by use of a context which is determined based on a sum of, and/or a number of significant ones among, one or more previously decoded transform coefficients located at positions determined by a local template positioned at the currently decoded transform coefficient.

Another embodiment may have an encoder for encoding a picture into a data stream, configured to entropy encoding a quantization level of a currently encoded transform coefficient of a transform coefficient block representing a block of the picture context-adaptively by setting a shape of a local template or disabling the local template [so that the template-specific context dependency is disabled] depending on previously encoded transform coefficients and/or depending on one or more of a size of the block, a color component of the block, a position of a termination coefficient position at which, when traversing the scan pattern along a forward direction, a last non-zero transform coefficient resides, a transformation underlying the transform coefficient block, use of a context which is determined based on one or more previously encoded transform coefficients located at positions determined by the local template positioned at the currently encoded transform coefficient, or if the local template disabled, is independent from previously encoded transform coefficients.

Another embodiment may have a decoder for decoding a picture from a data stream, configured to entropy decoding a quantization level of a currently decoded transform coefficient of a transform coefficient block representing a block of the picture context-adaptively by setting a shape of a local template or disabling the local template [so that the template-specific context dependency is disabled] depending on previously decoded transform coefficients and/or depending on one or more of a size of the block, a position of a termination coefficient position at which, when traversing the scan pattern along a forward direction, a last non-zero transform coefficient resides, a transformation underlying the transform coefficient block, use of a context which is determined based on one or more previously decoded transform coefficients located at positions determined by the local template positioned at the currently decoded transform coefficient, or if the local template disabled, is independent from previously decoded transform coefficients.

Another embodiment may have an encoder for encoding a picture into a data stream, configured to encoding a partitioning mode of a transform coefficient block representing a block of the picture into the data stream, encode the transform coefficient block by if the partition mode is a first mode [e.g. partition into partitions switched on], entropy encoding quantization levels of the transform coefficients of the transform coefficient block context-adaptively using, for each partition of partitions into which the transform coefficient block is subdivided, a set of contexts which is associated with the respective partition, and if the partition mode is a second mode [e.g. partition into partitions switched off], entropy encoding the quantization levels of the transform coefficients of the transform coefficient block context-adaptively using a global set of contexts.

Another embodiment may have a decoder for decoding a picture from a data stream, configured to decoding a partitioning mode of a transform coefficient block representing a block of the picture from the data stream, decode the transform coefficient block by if the partition mode is a first mode [e.g. partition into partitions switched on], entropy decoding quantization levels of the transform coefficients of the transform coefficient block context-adaptively using, for each partition of partitions into which the transform coefficient block is subdivided, a set of contexts which is associated with the respective partition, and if the partition mode is a second mode [e.g. partition into partitions switched off], entropy decoding the quantization levels of the transform coefficients of the transform coefficient block context-adaptively using a global set of contexts.

Another embodiment may have an encoder for encoding a picture into a data stream, configured to encode a transform coefficient block representing a block of the picture into the data stream using a scan pattern which sequentially traverses transform coefficients of the transform coefficient block by entropy encoding quantization levels of the transform coefficients of the transform coefficient block context-adaptively using, for each partition of partitions into which the transform coefficient block is subdivided, a set of contexts which is associated with the respective partition, wherein the scan pattern sequentially traverses the transform coefficients of the transform coefficient block in a manner so that at least one transform coefficient of a first partition is traversed between two transform coefficients of a second partition.

Another embodiment may have a decoder for decoding a picture from a data stream, configured to decode a transform coefficient block representing a block of the picture from the data stream using a scan pattern which sequentially traverses transform coefficients of the transform coefficient block by entropy decoding quantization levels of the transform coefficients of the transform coefficient block context-adaptively using, for each partition of partitions into which the transform coefficient block is subdivided, a set of contexts which is associated with the respective partition, wherein the scan pattern sequentially traverses the transform coefficients of the transform coefficient block in a manner so that at least one transform coefficient of a first partition is traversed between two transform coefficients of a second partition.

According to another embodiment, a method for encoding a picture into a data stream may have the steps of: subjecting a block of the picture separately for a first color component and a second color component to a transformation to acquire a first transform coefficient block and a second transform coefficient block, respectively, entropy encoding the second transform coefficient block context-adaptively using a context which depends on the first transform coefficient block.

According to another embodiment, a method for decoding a picture from a data stream may have the steps of: deriving a block of the picture by, separately for a first color component and a second color component, a reverse transformation of a first transform coefficient block and a second transform block, respectively, entropy decoding the second transform coefficient block context-adaptively using a context which depends on the first transform coefficient block.

According to another embodiment, a method for encoding a picture into a data stream may have the steps of: encoding a transform coefficient block representing a block of the picture into the data stream using a scan pattern which sequentially traverses transform coefficients of the transform coefficient block by encoding into the data stream data representing a coded set of transform coefficients traversed by the scan pattern [or scan path] from a first termination coefficient position in a predetermined direction to a second termination coefficient, the data having quantization levels of the transform coefficients in the coded set of transform coefficients, wherein the method has entropy encoding the quantization levels context-adaptively using a first set of contexts for the quantization level of the transform coefficient at the first termination coefficient position or at the second termination coefficient position which is disjoint to a second set of contexts used for any other transform coefficient in the coded set of transform coefficients.

According to another embodiment, a method for decoding a picture from a data stream may have the steps of: decoding a transform coefficient block representing a block of the picture from the data stream using a scan pattern which sequentially traverses transform coefficients of the transform coefficient block by decoding from the data stream data representing a coded set of transform coefficients traversed by the scan pattern from a first termination coefficient position in a predetermined direction to a second termination coefficient position, the data having quantization levels of the transform coefficients in the coded set of transform coefficients, wherein the method has entropy decoding the quantization levels context-adaptively using a first set of contexts for the quantization level of the transform coefficient at the first termination coefficient position or at the second termination coefficient position which is disjoint to a second set of contexts used for any other transform coefficient in the coded set of transform coefficients.

According to another embodiment, a method for encoding a picture into a data stream may have the steps of: entropy encoding a quantization level of a currently encoded transform coefficient of a transform coefficient block representing a block of the picture context-adaptively by use of a context which is determined based on a sum of, and/or a number of significant ones among, one or more previously encoded transform coefficients located at positions determined by a local template positioned at the currently encoded transform coefficient.

According to another embodiment, a method for decoding a picture from a data stream may have the steps of: entropy decoding a quantization level of a currently decoded transform coefficient of a transform coefficient block representing a block of the picture context-adaptively by use of a context which is determined based on a sum of, and/or a number of significant ones among, one or more previously decoded transform coefficients located at positions determined by a local template positioned at the currently decoded transform coefficient.

According to another embodiment, a method for encoding a picture into a data stream may have the steps of: entropy encoding a quantization level of a currently encoded transform coefficient of a transform coefficient block representing a block of the picture context-adaptively by setting a shape of a local template or disabling the local template [so that the template-specific context dependency is disabled] depending on previously encoded transform coefficients and/or depending on one or more of a size of the block, a color component of the block, a position of a termination coefficient position at which, when traversing the scan pattern along a forward direction, a last non-zero transform coefficient resides, a transformation underlying the transform coefficient block, use of a context which is determined based on one or more previously encoded transform coefficients located at positions determined by the local template positioned at the currently encoded transform coefficient, or if the local template disabled, is independent from previously encoded transform coefficients.

According to another embodiment, a method for decoding a picture from a data stream may have the steps of: entropy decoding a quantization level of a currently decoded transform coefficient of a transform coefficient block representing a block of the picture context-adaptively by setting a shape of a local template or disabling the local template [so that the template-specific context dependency is disabled] depending on previously decoded transform coefficients and/or depending on one or more of a size of the block, a position of a termination coefficient position at which, when traversing the scan pattern along a forward direction, a last non-zero transform coefficient resides, a transformation underlying the transform coefficient block, use of a context which is determined based on one or more previously decoded transform coefficients located at positions determined by the local template positioned at the currently decoded transform coefficient, or if the local template disabled, is independent from previously decoded transform coefficients.

According to another embodiment, a method for encoding a picture into a data stream may have the steps of: encoding a partitioning mode of a transform coefficient block representing a block of the picture into the data stream, encoding the transform coefficient block by if the partition mode is a first mode [e.g. partition into partitions switched on], entropy encoding quantization levels of the transform coefficients of the transform coefficient block context-adaptively using, for each partition of partitions into which the transform coefficient block is subdivided, a set of contexts which is associated with the respective partition, and if the partition mode is a second mode [e.g. partition into partitions switched off], entropy encoding the quantization levels of the transform coefficients of the transform coefficient block context-adaptively using a global set of contexts.

According to another embodiment, a method for decoding a picture from a data stream may have the steps of: decoding a partitioning mode of a transform coefficient block representing a block of the picture from the data stream, decoding the transform coefficient block by if the partition mode is a first mode [e.g. partition into partitions switched on], entropy decoding quantization levels of the transform coefficients of the transform coefficient block context-adaptively using, for each partition of partitions into which the transform coefficient block is subdivided, a set of contexts which is associated with the respective partition, and if the partition mode is a second mode [e.g. partition into partitions switched off], entropy decoding the quantization levels of the transform coefficients of the transform coefficient block context-adaptively using a global set of contexts.

According to another embodiment, a method for encoding a picture into a data stream may have the steps of: encoding a transform coefficient block representing a block of the picture into the data stream using a scan pattern which sequentially traverses transform coefficients of the transform coefficient block by entropy encoding quantization levels of the transform coefficients of the transform coefficient block context-adaptively using, for each partition of partitions into which the transform coefficient block is subdivided, a set of contexts which is associated with the respective partition, wherein the scan pattern sequentially traverses the transform coefficients of the transform coefficient block in a manner so that at least one transform coefficient of a first partition is traversed between two transform coefficients of a second partition.

According to another embodiment, a method for decoding a picture from a data stream may have the steps of: decoding a transform coefficient block representing a block of the picture from the data stream using a scan pattern which sequentially traverses transform coefficients of the transform coefficient block by entropy decoding quantization levels of the transform coefficients of the transform coefficient block context-adaptively using, for each partition of partitions into which the transform coefficient block is subdivided, a set of contexts which is associated with the respective partition, wherein the scan pattern sequentially traverses the transform coefficients of the transform coefficient block in a manner so that at least one transform coefficient of a first partition is traversed between two transform coefficients of a second partition.

Another embodiment may have a non-transitory digital storage medium having a computer program stored thereon to perform the method for encoding a picture into a data stream, the method having the steps of: subjecting a block of the picture separately for a first color component and a second color component to a transformation to acquire a first transform coefficient block and a second transform coefficient block, respectively, entropy encoding the second transform coefficient block context-adaptively using a context which depends on the first transform coefficient block, when said computer program is run by a computer.

Another embodiment may have a non-transitory digital storage medium having a computer program stored thereon to perform the method for decoding a picture from a data stream, the method having the steps of: deriving a block of the picture by, separately for a first color component and a second color component, a reverse transformation of a first transform coefficient block and a second transform block, respectively, entropy decoding the second transform coefficient block context-adaptively using a context which depends on the first transform coefficient block, when said computer program is run by a computer.

Another embodiment may have a non-transitory digital storage medium having a computer program stored thereon to perform the method for encoding a picture into a data stream, the method having the steps of: encoding a transform coefficient block representing a block of the picture into the data stream using a scan pattern which sequentially traverses transform coefficients of the transform coefficient block by encoding into the data stream data representing a coded set of transform coefficients traversed by the scan pattern [or scan path] from a first termination coefficient position in a predetermined direction to a second termination coefficient, the data having quantization levels of the transform coefficients in the coded set of transform coefficients, wherein the method has entropy encoding the quantization levels context-adaptively using a first set of contexts for the quantization level of the transform coefficient at the first termination coefficient position or at the second termination coefficient position which is disjoint to a second set of contexts used for any other transform coefficient in the coded set of transform coefficients, when said computer program is run by a computer.

Another embodiment may have a non-transitory digital storage medium having a computer program stored thereon to perform the method for decoding a picture from a data stream, the method having the steps of: decoding a transform coefficient block representing a block of the picture from the data stream using a scan pattern which sequentially traverses transform coefficients of the transform coefficient block by decoding from the data stream data representing a coded set of transform coefficients traversed by the scan pattern from a first termination coefficient position in a predetermined direction to a second termination coefficient position, the data having quantization levels of the transform coefficients in the coded set of transform coefficients, wherein the method has entropy decoding the quantization levels context-adaptively using a first set of contexts for the quantization level of the transform coefficient at the first termination coefficient position or at the second termination coefficient position which is disjoint to a second set of contexts used for any other transform coefficient in the coded set of transform coefficients, when said computer program is run by a computer.

Another embodiment may have a non-transitory digital storage medium having a computer program stored thereon to perform the method for encoding a picture into a data stream, the method having the steps of: entropy encoding a quantization level of a currently encoded transform coefficient of a transform coefficient block representing a block of the picture context-adaptively by use of a context which is determined based on a sum of, and/or a number of significant ones among, one or more previously encoded transform coefficients located at positions determined by a local template positioned at the currently encoded transform coefficient, when said computer program is run by a computer.

Another embodiment may have a non-transitory digital storage medium having a computer program stored thereon to perform the method for decoding a picture from a data stream, the method having the steps of: entropy decoding a quantization level of a currently decoded transform coefficient of a transform coefficient block representing a block of the picture context-adaptively by use of a context which is determined based on a sum of, and/or a number of significant ones among, one or more previously decoded transform coefficients located at positions determined by a local template positioned at the currently decoded transform coefficient, when said computer program is run by a computer.

Another embodiment may have data streams acquirable by the inventive methods.

In accordance with a first aspect of the present application, a coding efficiency increase in picture coding is achieved by using a context or context model for entropy encoding/decoding a certain transform coefficient block of a certain color component which depends on the transform coefficient block of a different color component. That is, a block of a picture is separately subject to a transformation for a first color component and a second color component, respectively, so as to obtain a first transform coefficient block for the first color component and second transform coefficient block for the second color component, and an entropy encoding/decoding the second transform coefficient block context-adaptively, the context used is selected dependent on the first transform coefficient block. Both transformations might relate to a prediction residual determined for the block for each color component, but this is merely optional. In any case, rendering the context used for entropy encoding/decoding the second transform coefficient block dependent on the first transform coefficient block improves the probability estimation underlying the entropy encoding/decoding and, accordingly, increases the coding efficiency. In accordance with an embodiment, the context dependency on the first transform coefficient block is used, or applied for, an indication coded into the data stream for the first and second transform coefficient blocks, which indicates whether the transform coefficients within the respective transform coefficient block are encoded into the data stream, or whether the encoding of the transform coefficients of the respective transform coefficient block is skipped and all transform coefficients within the respective transform coefficient block are zero. This indication might be a flag signaled for both transform coefficient blocks in the data stream. Thus, in accordance with this embodiment, encoding/decoding of the indication for the second transform coefficient block is performed using context-adaptive entropy encoding/decoding using a context which depends on the first transform coefficient block such as depending on the indication signaled in the data stream for the first transform coefficient block or quantization levels of transform coefficients of the first transform coefficient block.

In accordance with a second aspect of the present application picture coding using transform coefficient block entropy coding is rendered more efficient by spending a separate set of contexts for entropy coding a quantization level of certain transform coefficients. In particular, a transform coefficient block which represents a block of the picture is assumed to be coded into the data stream using a scan pattern which sequentially traverses the transform coefficients of the transform coefficient block. Accordingly, encoding/decoding data representing a coding set of transform coefficients traversed by the scan pattern from a first termination coefficient position onwards in a predetermined direction to a second termination coefficient position is done using entropy encoding/decoding. The data comprises quantization levels of the transform coefficients in the coded set of transform coefficients. The encoding/decoding the quantization levels is done context-adaptively using a first set of contexts for the quantization level of the transform coefficient at the first termination coefficient position or at the second termination coefficient position, wherein this first set of contexts is disjoined to a second set of contexts used for any other transform coefficient in the coded set of transform coefficients. For instance, a separate context set is used for the DC transform coefficient of the transform coefficient block or, differently, speaking, the transform coefficient at the upper left-hand side, with the predetermined direction leading to this DC transform coefficient which represents the second termination coefficient position, though. For instance, the transform coefficients' quantization levels may be coded using context-adaptive binary entropy coding/decoding by using a binarization of the quantization levels of the transform coefficients and the disjoined set of contexts may apply to, or be used for, one or more bins of the binarization such as a prefix part of the binarization.

In accordance with a third aspect of the present application, a coding efficiency improvement in encoding a picture using entropy coding of a transform coefficient block is achieved by determining a context for entropy encoding/decoding a quantization level of a currently encoded transform coefficient of the transform coefficient block based on a sum of and/or a number of significant ones among, one or more previously encoded transform coefficients located at positions determined by a local template positioned at the currently encoded/decoded transform coefficient. That is, a local template is used in order to examine transform coefficients located nearby in the transform coefficient block as far as the quantization level of the one or more transform coefficients thus examined is revealed by a previous portion of the data stream. For instance, the entropy encoding/decoding of the quantization levels of the transform coefficients of the transform coefficient block may be done on a binary basis by sequentially entropy encoding/decoding bins of a binarization of the quantization levels of the transform coefficient in a plurality of passes and the context for at least bin of the binarization of the currently encoded/traversed transform coefficient may, thus, be determined based on the just-mentioned sum and/or the just-mentioned number of significant ones among the transform coefficients located at the local template. For instance, the sum may be a sum of an absolute value of the coefficient level of the one or more previous transform coefficients located at the local template, which absolute value this coefficient level of the one or more previous transform coefficients minimally has according to previously encoded/decoded bins of the binarization of the coefficient level of the one or more previous transform coefficients. Additionally or alternatively, the context may be determined based on the number of significant ones among the one or more previous transform coefficients located at the local template with the significance being determined based on the previously encoded/decoded bins.

A further aspect of the present application relates to coding transform coefficients of a transform coefficient block using binarization of absolute values of the quantization levels of the transform coefficients. In accordance with this aspect of the present application, a coding efficiency increase is achieved by setting a binarization parameter for parameterizing the binarization of a currently encoded/decoded transform coefficient based on a sum of, and/or a number of significant ones among, one or more previously encoded/decoded transform coefficients located at positions determined by a local template positioned at the currently encoded/decoded transform coefficient. For instance, a first part of the binarization of the transform coefficients might be coded using context-adaptive entropy encoding/decoding while a second part of the binarization is encoded/decoded using an equi-probability bypass mode. That is, the second part is written into the data stream, and read therefrom, at a code rate of one. The second part might comprise a prefix part and a suffix part and the binarization parameter may determine the length of the prefix part. The length might, for instance, be an Exp-Golomb order or Rice parameter. Similar statements as made above might be true with respect to the possibility of coding the transform coefficients of the transform coefficient block, or the coefficient levels thereof, in several passes and with respect to the consideration of this circumstance in forming this sum and/or determining the number of significant coefficients.

A further aspect of the present application also relates to the binarization used to code absolute values of quantization levels of the transform coefficients of a transform coefficient block. In particular, in accordance with this aspect, picture coding is made more efficient by adaptively varying a cutoff value associated with a binarization. The binarization comprises a first binarization code below a cutoff value and a second binarization code, prefixed by a codeword of the first binarization code for the cutoff value, above the cutoff value. The adaptive variation of the cutoff value is performed dependent on previously encoded/decoded transform coefficients. For instance, the adaptation may be done in a manner also resulting in setting the cutoff value to zero whereupon the binarization merely comprises the second binarization code. The coding may be done in a manner so that bins of the first binarization code are coded context-adaptively, whereas bins of the second binarization code are coded in bypass mode.

A further aspect of the present application also relates to the cutoff value and aims at increasing the coding efficiency by setting the cutoff value depending on one or more of a size of the block, a color component of the block, a prediction mode underlying a prediction signal a prediction residual of which the block represents, a transformation underlying the transform coefficient block, a quantization parameter used to quantize the transform coefficient block, a measure of an energy of previously encoded/decoded transform coefficients, wherein the latter may be located at positions determined by a local template positioned at a currently encoded/decoded transform coefficient or located at positions within a partition of the transform coefficient block offset to a current partition, the currently encoded/decoded transform coefficient is located in and preceding the current partition according to a coding order used for encoding/decoding the absolute value of the quantization level of the transform coefficients of the transform coefficient block defined by traversing the transform coefficients of the transform coefficient block along a scan pattern in a predetermined direction.

An even further aspect of the present application aims at increasing the coding efficiency of picture coding using transform coefficient block coding by an intelligent way of setting the shape of the local template or disabling the local template used for context-adaptively entropy encoding quantization levels of transform coefficients of the transform coefficient block. In particular, the dependency may involve one or more of a size of the block, a color component of the block, a position of a termination coefficient position at which, when traversing the scan pattern along a forward direction, a last non-zero transform coefficient results, and a transformation underlying the transform coefficient block. The context may then be determined based on one or more previously encoded/decoded transform coefficients located at positions determined by the local template positioned at the currently encoded/decoded transform coefficient or, if the local template is disabled, independent from these transform coefficients. In this manner, the context managing complexity, the number of context and the context efficiency in terms of probability estimation accuracy may be better determined, or adapted to, on the actual needs. In this regard, one should know that the usage of too many contexts does not increase the coding efficiency inevitably. Rather, the selection of contexts needs to take into account that contexts should be, advantageously, used sufficiently frequently in order to, by way of context updates, attain good probability estimations. Thus, this aspect sees to adapt the context managing characteristic to the needs in order to improve the coding efficiency.

In accordance with a further aspect of the present application, the transform coefficient block is partitioned into patterns for sake of using separate sets of contexts for the various partitions. A coding efficiency increase is aimed at by varying the partitions in shape, so that they are not conformed to each other within the transform coefficient block, and/or by shaping the partitions depending on a scanning pattern along which the entropy encoding/decoding the quantization levels of the transform coefficient block is performed, and/or by shaping the partitions depending on a size of the block and/or by shaping the partitions depending on an explicit partition shaping information. Again, the idea behind this aspect relates to the necessity to adapt the context management complexity to the actual needs. Thereby, the coding efficiency is increased.

A further aspect of the present application relates to the partitioning of a transform coefficient block into partitions in terms of signaling in the data stream for each partition an indication whether all transform coefficients within the respective partition are coded into the data stream or whether the coding of all transform coefficients within the respective partition is skipped and all transform coefficients within the respective partition are zero. In particular, in accordance with this aspect of the present application, the indication is interpreted in a way indicating whether all coefficients are coded or none. Each of these partitions may have a set of contexts associated therewith using which the transform coefficients within the respective partition are encoded if so indicated by the indication. In other words, here the partition wise indication of zeroness is indicative, if so set, that all transform coefficients within a certain partition are coded and this circumstance needs not to be questioned anymore.

A further aspect of the present application also relates to an aspect of spending partition-specific context sets for encoding the quantization levels of transform coefficients within the various partitions and aims at improving the coding efficiency by signaling by way of a partition mode for the transform coefficient block in the data stream, whether partitioning is used, or whether such partitioning is disabled and this one set of context is used globally for the transform coefficient block instead.

Finally, a further aspect of the present application also deals with the partition-specific context set usage and suggests improving the coding efficiency by decoupling the scan pattern along which the transform coefficients of the transform coefficient block are sequentially coded, from the partitioning in that the scan pattern sequentially traverses the transform coefficients of the transform coefficient block in a manner so that at least one transform coefficient of a first partition is traversed between two transform coefficients of a second partition. In this manner, it is feasible to traverse the transform coefficients in a manner so that the "knowledge increase" during scanning the transform coefficients increases more rapidly so as to gain improved coding history for the context selection/adaptation, but with concurrently being able to appropriately associated individual context sets to various partitions of the transform block.

BRIEF DESCRIPTION OF THE DRAWINGS

Embodiments of the present invention will be detailed subsequently referring to the appended drawings, in which:

FIG. 11a shows a schematic diagram illustrating the coding of a residual block with respect to a decomposition of this block into more than one color component;

FIG. 12 shows a schematic diagram illustrating a first embodiment of the present application of performing context selection for one color component dependent on the transform coefficient block of the same residual block for another color component;

FIG. 19 illustrates a partition-wise scanning example of transform examples of a transform coefficient block;

FIG. 20 illustrates a pseudocode for coding a transform coefficient block;

FIG. 21 illustrates a pseudocode for binarizing an absolute value of a quantization level of a transform coefficient;

FIG. 22 illustrates an example for binarizing an absolute value of a quantization level of a transform coefficient;

FIG. 23 illustrates a pseudocode for coding transform coefficients of a transform coefficient block;

FIG. 24 illustrates a pseudocode for coding transform coefficients of a transform coefficient block; and FIG. 25 illustrates different examples for a partitioning of a transform coefficient block into partitions.

DETAILED DESCRIPTION OF THE INVENTION

The following description of the figures starts with a presentation of a description of video encoder and video decoder of a block-based predictive codec for coding pictures of a video in order to form an example for a coding framework into which embodiments described herein may be built. The video encoder and video decoder are described with respect to FIGS. 1 to 3. Thereinafter the description of further embodiments of the present application are presented with respect to figures. Same are numbered and in the above section a reference is made which portions above refer to which embodiment described and claimed below. All these embodiments could be built into the video encoder and decoder of FIGS. 1 and 2, respectively, although the embodiments described herein such as those described with respect to the subsequent Figs. may also be used to form video encoder and video decoders not operating according to the coding framework underlying the video encoder and video decoder of FIGS. 1 and 2.

Figure 1:
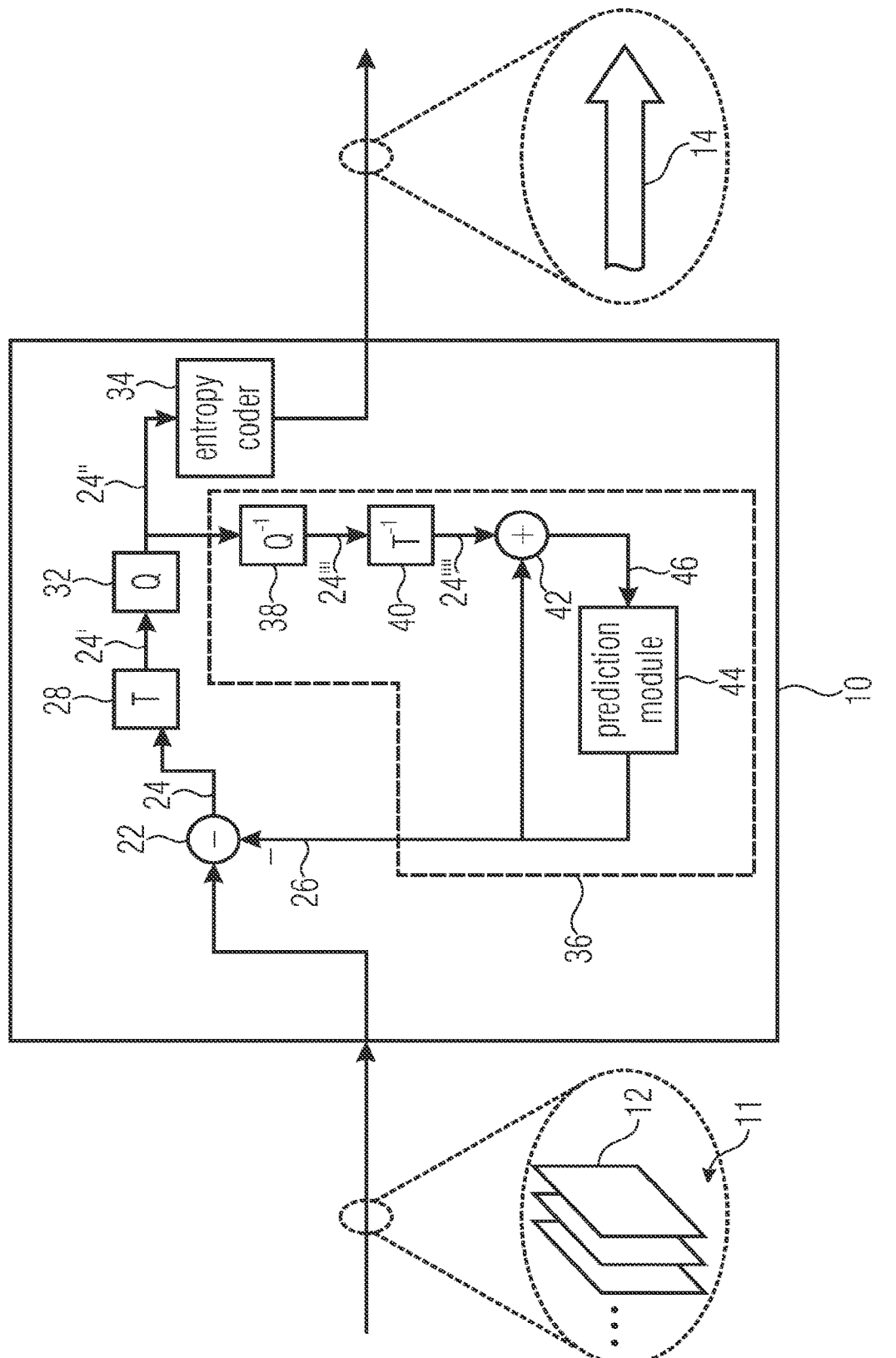
FIG. 1 shows a schematic block diagram of a block-based predictive decoder using transform-based residual coding, which serves as an example for possible implementations of the embodiments of the present application described herein.
Figure 2:
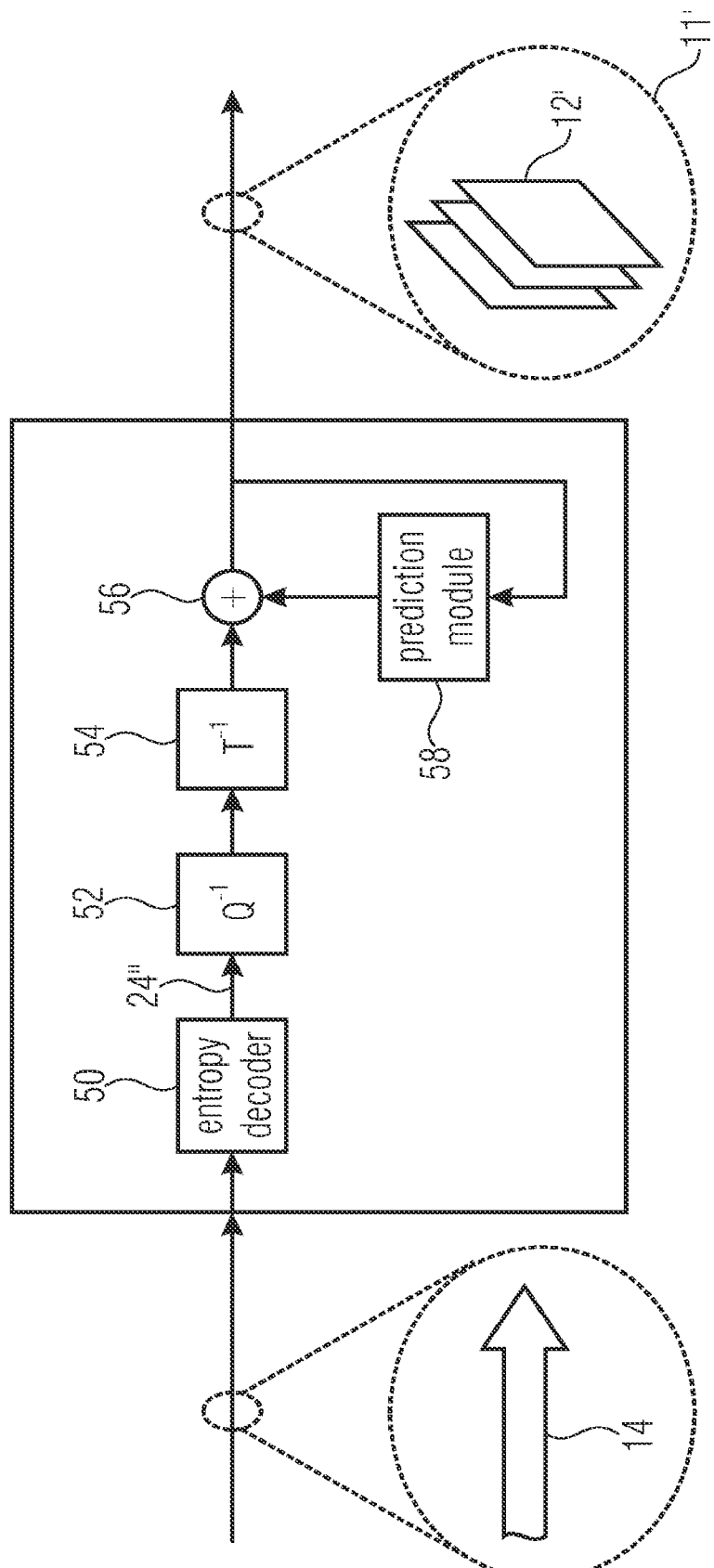
FIG. 2 shows a schematic block diagram of a block-based predictive video decoder fitting to the encoder of FIG. 1, which serves as an example for possible implementations of the embodiments for a decoder described herein.

FIG. 1 shows an apparatus for predictively coding a video 11 composed of a sequence of pictures 12 into a data stream 14. Block-wise predictive coding is used to this end. Further, transform-based residual coding is exemplarily used. The apparatus, or encoder, is indicated using reference sign 10. FIG. 2 shows a corresponding decoder 20, i.e. an apparatus 20 configured to predictively decode the video 11' composed of pictures 12' in picture blocks from the data stream 14, also here exemplarily using transform-based residual decoding, wherein the apostrophe has been used to indicate that the pictures 12' and video 11', respectively, as reconstructed by decoder 20 deviate from pictures 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. video 11 or a current picture 12. The prediction residual signal former 22 may, for instance, be a subtractor which subtracts the prediction signal from the original signal, i.e. current picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction residual 26 is generated by a prediction stage 36 of encoder 10 on the basis of the prediction residual signal 24" decoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'.

A prediction module 44 of prediction stage 36 then generates the prediction signal 26 on the basis of signal 46 by using, for instance, spatial prediction, i.e. intra prediction, and/or temporal prediction, i.e. inter prediction. Details in this regard are described in the following.

Likewise, decoder 20 may be internally composed of components corresponding to, and interconnected in a manner corresponding to, prediction stage 36. In particular, entropy decoder 50 of decoder 20 may entropy decode the quantized spectral-domain prediction residual signal 24″ from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24″ so that, as shown in FIG. 2, the output of combiner 56 results in the reconstructed signal, namely the video 11' or a current picture 12' thereof.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost, and/or using some rate control. As described in more details below, encoder 10 and decoder 20 and the corresponding modules 44, 58, respectively, support different prediction modes such as intra-coding modes and inter-coding modes or modes where the former modes form a kind of set or pool of primitive prediction modes based on which the predictions of picture blocks are composed. The granularity at which encoder and decoder switch between these prediction compositions may correspond to a subdivision of the pictures 12 and 12', respectively, into blocks. Note that some of these blocks may be blocks being solely intra-coded and some blocks may be blocks solely being inter-coded and, optionally, even further blocks may be blocks obtained using both intra-coding and inter-coding, but details are set-out hereinafter. According to intra-coding mode, a prediction signal for a block is obtained on the basis of a spatial, already coded/decoded neighborhood of the respective block. Several intra-coding sub-modes may exist the selection among which, quasi, represents a kind of intra prediction parameter. There may be directional or angular intra-coding sub-modes according to which the prediction signal for the respective block is filled by extrapolating the sample values of the neighborhood along a certain direction which is specific for the respective directional intra-coding sub-mode, into the respective block. The intra-coding sub-modes may, for instance, also comprise one or more further sub-modes such as a DC coding mode, according to which the prediction signal for the respective block assigns a DC value to all samples within the respective block, and/or a planar intra-coding mode according to which the prediction signal of the respective block is approximated or determined to be a spatial distribution of sample values described by a two-dimensional linear function over the sample positions of the respective block with deriving tilt and offset of the plane defined by the two-dimensional linear function on the basis of the neighboring samples. Compared thereto, according to inter-prediction mode, a prediction signal for a block may be obtained, for instance, by temporally predicting the block inner. For parametrization of an inter-prediction mode, motion vectors may be signaled within the data stream, the motion vectors indicating the spatial displacement of the portion of a previously coded picture of the video 11 at which the previously coded/decoded picture is sampled in order to obtain the prediction signal for the respective block. This means, in addition to the residual signal coding comprised by data stream 14, such as the entropy-coded transform coefficient levels representing the quantized spectral-domain prediction residual signal 24″, data stream 14 may have encoded thereinto prediction related parameters for assigning to the blocks prediction modes, prediction parameters for the assigned prediction modes, such as motion parameters for inter-prediction modes, and, optionally, further parameters which control a composition of the final prediction signal for the blocks using the assigned prediction modes and prediction parameters as will be outlined in more detail below. Additionally, the data stream may comprise parameters controlling and signaling the subdivision of picture 12 and 12', respectively, into the blocks. The decoder 20 uses these parameters to subdivide the picture in the same manner as the encoder did, to assign the same prediction modes and parameters to the blocks, and to perform the same prediction to result in the same prediction signal.

Figure 3:
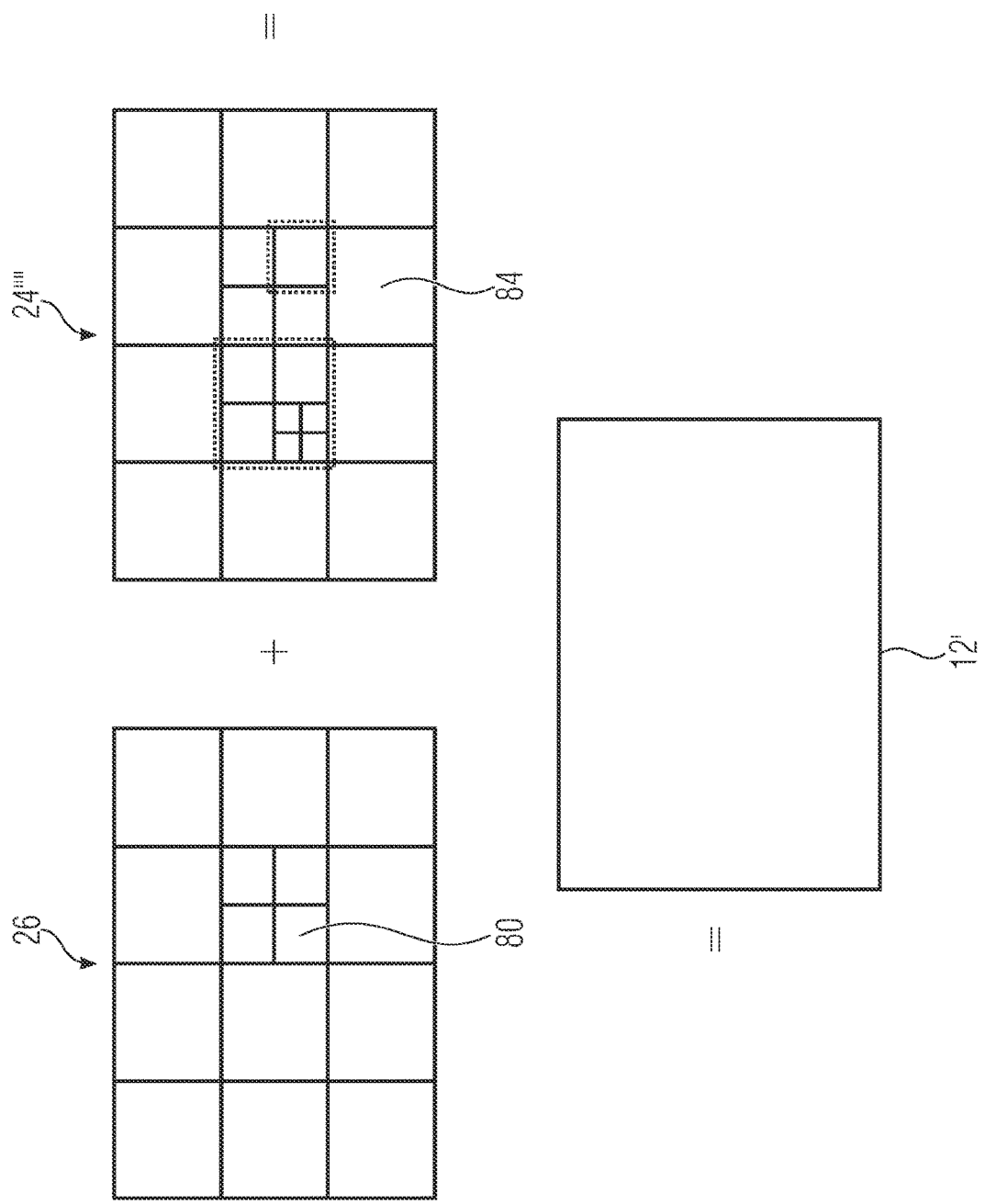
FIG. 3 shows an example for a partitioning of a picture into coding blocks encoded using intra-prediction and inter-prediction, respectively, and a partition of the same picture into residual blocks for the sake of transform-based residual coding of the prediction residual with concurrently schematically illustrating the prediction correction on the basis of the residual by way of addition of the prediction signal and the residual signal, respectively.

FIG. 3 illustrates the relationship between the reconstructed signal, i.e. the reconstructed picture 12', on the one hand, and the combination of the prediction residual signal 24″″ as signaled in the data stream, and the prediction signal 26, on the other hand. As already denoted above, the combination may be an addition. The prediction signal 26 is illustrated in FIG. 3 as a subdivision of the picture area into blocks 80 of varying size, although this is merely an example. The subdivision may be any subdivision, such as a regular subdivision of the picture area into rows and columns of blocks, or a multi-tree subdivision of picture 12 into leaf blocks of varying size, such as a quadtree subdivision or the like, wherein a mixture thereof is illustrated in FIG. 3 where the picture area is firstly subdivided into rows and columns of tree-root blocks which are then further subdivided in accordance with a recursive multi-tree subdivisioning to result into blocks 80.

The prediction residual signal 24″″ in FIG. 3 is also illustrated as a subdivision of the picture area into blocks 84. These blocks might be called transform or residual blocks in order to distinguish same from the coding blocks 80. In effect, FIG. 3 illustrates that encoder 10 and decoder 20 may use two different subdivisions of picture 12 and picture 12', respectively, into blocks, namely one subdivisioning into coding blocks 80 and another subdivision into blocks 84. Both subdivisions might be the same, i.e. each block 80, may concurrently form a transform block 84 and vice versa, but FIG. 3 illustrates the case where, for instance, a subdivision into transform blocks 84 forms an extension of the subdivision into blocks 80 so that any border between two blocks 80 overlays a border between two blocks 84, or alternatively speaking each block 80 either coincides with one of the transform blocks 84 or coincides with a cluster of transform blocks 84. However, the subdivisions may also be determined or selected independent from each other so that transform blocks 84 could alternatively cross block borders between blocks 80. As far as the subdivision into transform blocks 84 is concerned, similar statements are thus true as those brought forward with respect to the subdivision into blocks 80, i.e. the blocks 84 may be the result of a regular subdivision of picture area into blocks, arranged in rows and columns, the result of a recursive multi-tree subdivisioning of the picture area, or a combination thereof or any other sort of segmentation. Just as an aside, it is noted that blocks 80 and 84 are not restricted to being quadratic, rectangular or any other shape. Further, the subdivision of a current picture 12 into blocks 80 at which the prediction signal is formed, and the subdivision of a current picture 12 into blocks 84 at which the prediction residual is coded, may not the only subdivision used for coding/decoding. These subdivision from a granularity at which prediction signal determination and residual coding is performed, but firstly, the residual coding may alternatively be done without subdivisioning, and secondly, at other granularities than these subdivisions, encoder and decoder may set certain coding parameters which might include some of the aforementioned parameters such as prediction parameters, prediction signal composition control signals and the like.

FIG. 3 illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments such as prediction signals obtained from other views or from other coding layers which are coded/decoded in a separate prediction loop with separate DPB, for instance.

In FIG. 3, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

In any case, it should be noted that the set of supported transforms may comprise merely one transform such as one spectral-to-spatial or spatial-to-spectral transform.

As already outlined above, FIGS. 1-3 have been presented as an example where the concepts described further below may be implemented in order to form specific examples for video encoders and decoders according to the present application. Insofar, the video encoder and decoder of FIGS. 1 and 2, respectively, represent possible implementations of the video encoders and decoders described herein below.

The embodiments of the various aspects of the present application that will be described later on sometimes make use of common underlying concepts which are presented beforehand. That is, encoders and decoders of embodiments described later on, do not have to, as just-outlined, correspond, in implementation, to the details set out above with respect to FIGS. 1-3, but they may correspond to one or more of the following technical details and these technical details help or assist in understanding the embodiments described later on. For instance, let's start with FIG. 4. The embodiments described later on coincide in that they are concerned with picture coding. The picture might be part of a video and the decoders and encoders described below may be video encoders and video decoders, respectively, but still picture coding may apply as well. Thus, FIG. 4 schematically illustrates the general behavior or task of encoders and decoders for which embodiments are described below.

Figure 4:
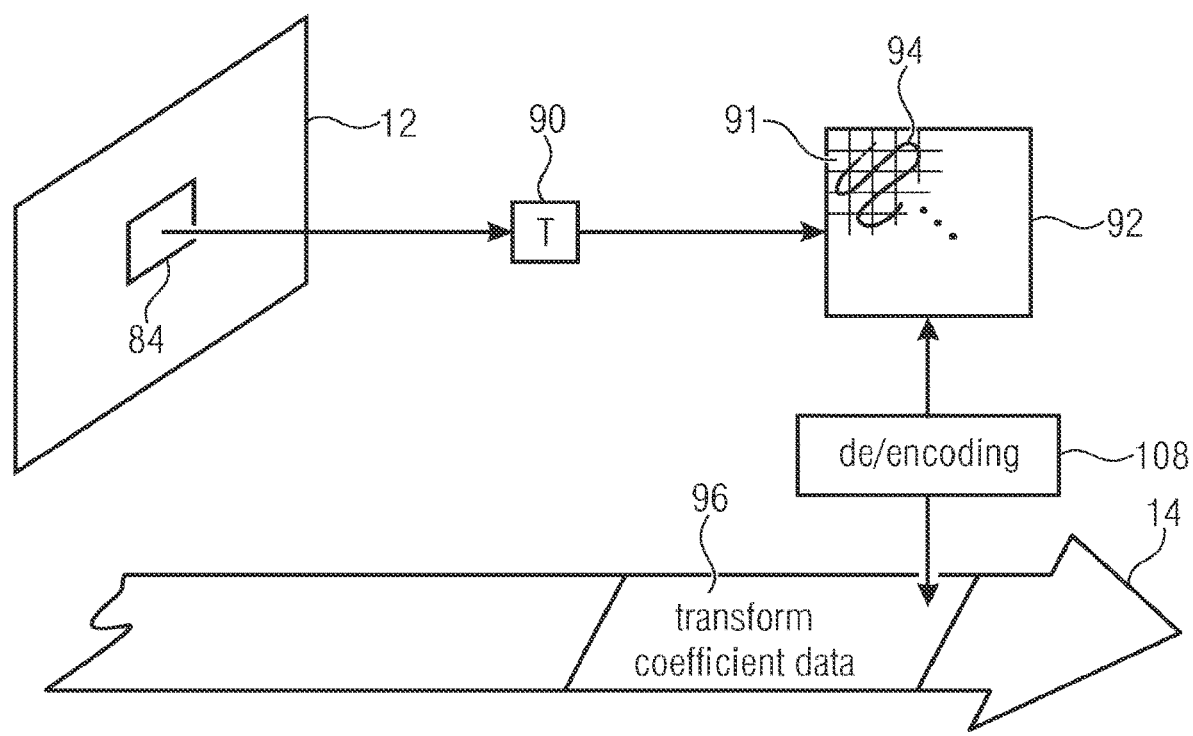
FIG. 4 shows a schematic diagram illustrating the transform-based residual coding of a residual block by de-encoding the transform coefficient block 92 associated with the residual block via a certain transformation.

FIG. 4 shows the picture to be coded. The same reference signs as used in FIGS. 1-3 are used in order to help in understanding as to how the details set forth herein below could be used to implement the example of FIG. 1-3 in a manner so as to arrive at an embodiment of the present application. Further, FIG. 4 shows a block 84 of picture 12. It is a currently coded block or currently decoded block. The usage of the reference sign 84 reveals that the transform coding outlined herein below, may relate to a prediction residual as it has been outlined above with respect to FIGS. 1 to 3, but this is, in principle, a circumstance which could be left off in alternative embodiments. That is, for all the embodiments set out herein below, it may be that the transform coefficient block mentioned therein represents the transform of a prediction residual within block 84 such as the residual with respect to an intra-picture prediction or inter-picture prediction. Block 84 is related to the transform coefficient block 92 by way of transform 90. Examples of the transform have been set out above with respect to FIGS. 1-3 and they shall apply for all embodiments. One transform is selected for block 84. Alternatively, the transform may be fixed. In case of selection, the selection may be signaled in the data stream. Among the transform, one may be the identity transform. While it might be that the transform of the transform coefficient block 92 has a dimension or size coinciding with the size of block 84, i.e., the number of coefficients of block 92 may coincide with the number of samples in block 84, this needs not to apply to all transformations supported or may, in case of merely one transformation 90 being used, not apply. Both, encoder and decoder may use the inverse transformation so as to reconstruct the inner of block 84 such as the prediction residual, in spatial domain, the decoder for sake of presentation, the encoder for sake of feeding the decoded picture buffer. The embodiments described subsequently, concentrate on the task 108 of de/encoding the transform coefficient block 92 into/from data stream 14.

As illustrated in FIG. 4, the transform coefficient block 92 may be composed of transform coefficients 91 which are arranged in a rectangular array. That is, the transform coefficient block 92 may be a rectangular block.

Figure 5:
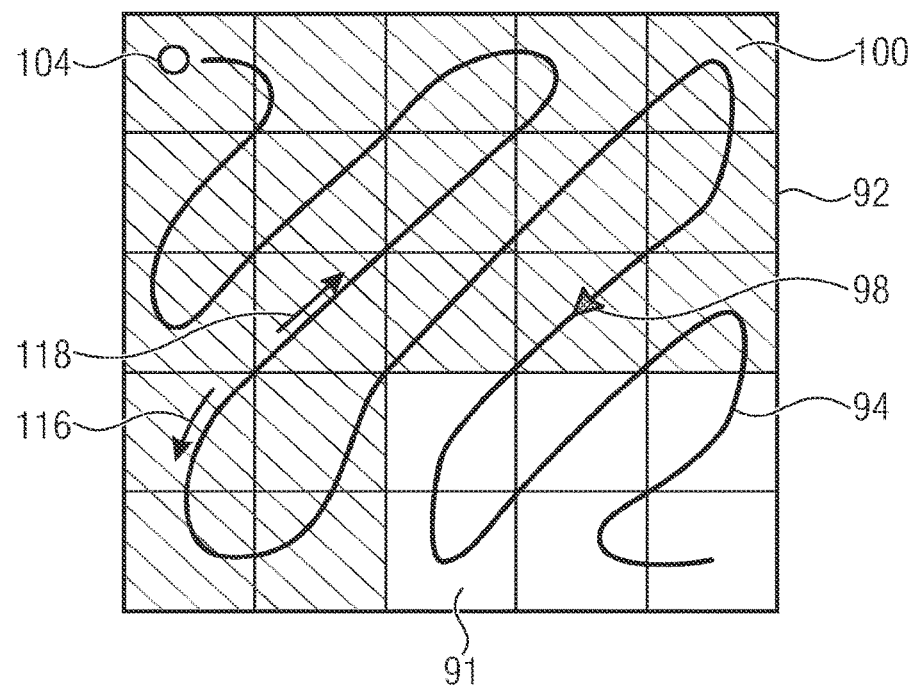
FIG. 5 shows a schematic diagram illustrating the coding of a coded set of transform coefficients of a transform coefficient block by defining the coded set via an indication indicating a last non-zero transform coefficient when scanning the transform coefficients from a specific firstly scanned transform coefficient such as a DC coefficient to a coefficient farthest away from this first coefficient, so that the coded set comprises all coefficients between the last non-zero coefficient and the transform coefficient at the first coefficient position.

The aim of the transformation 90 is to aim at a redundancy reduction and to gather non-zero coefficients towards a smaller number of the coefficients 91. See, for instance, FIG. 5, which shows a transform coefficient block 92. The transform coefficient at transform coefficient position 104, namely the upper left coefficient position, may be a DC coefficient and towards this coefficient position 104 the probability of a certain coefficient to be quantized to a quantization level not being zero increases, for instance. In order to exploit this circumstance, the coding of the transform coefficient block 92 may involve the signalization of an indication in the data stream which indicates a transform coefficient position 98 which is furthest away from coefficient position 104 when sequentially scanning the transform coefficients starting from coefficient position 104 along a scanning path 94 in a manner generally leading away from coefficient position 104. The indication of this termination position 98 shall serve as an indication that the data stream 14 has encoded thereinto only a coded set 100 of transform coefficients 91, namely the hatched ones in FIG. 5, which coded set 100 includes all transform coefficients, and including, termination coefficient position 98 to, and including, termination coefficient 104. The other coefficients, non-hatched in FIG. 5, are then known to be zero at decoder side.

It might be useful, and as used in accordance with some embodiments of the present application, when the coded set of transform coefficients 91 is coded into the data stream 14 along the reverse direction 118, i.e., not the forward direction along scanning path 94 generally leading away from termination coefficient position 104, but the opposite direction thereof which leads to termination coefficient position 104.

Figure 6:
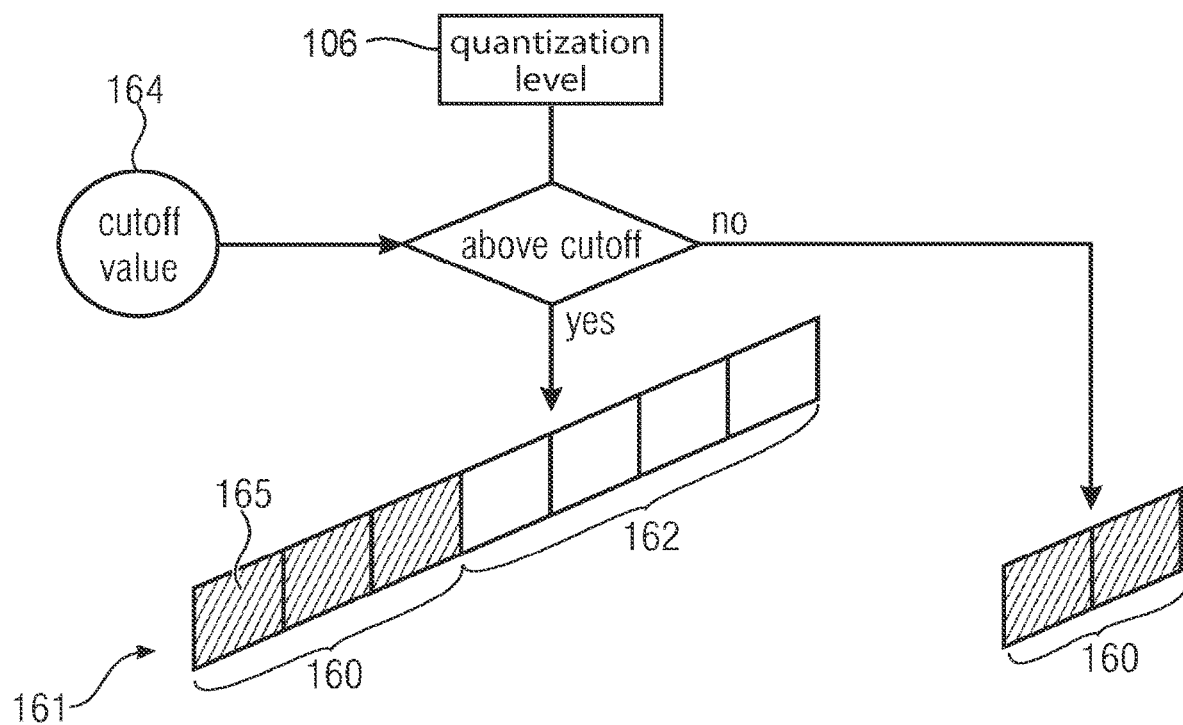
FIG. 6 shows a schematic diagram illustrating the possibility of coding transform coefficients using a binarization composed of a first binarization code and a second binarization code with switching from the binarization merely comprising the first binarization code to a state where the binarization comprises the codeword of the first binarization code for the cutoff value followed by the second binarization code.

Although not specifically discussed with respect to some embodiments described later on, it might even apply for the latter embodiments (optionally) that a quantization levels of the transform coefficients 91 are coded into the data stream 14 using binarization. That is, a quantization level of a certain transform coefficient 91 is, as illustrated in FIG. 6, by way of the binarization mapped onto a bin string or codeword 161. The binarization may be composed of a first binarization code 160 which serves as a kind of prefix, and a second binarization code 162. To be more precise, let's say 106 in FIG. 6 is the quantization level. If the quantization level 106 is above a certain cutoff value 164, the quantization level 106 is binarized to a bin string 161 composed of a part 162 stemming from the second binarization code, prefixed by a codeword of the first binarization code which corresponds to the cutoff value 164. If, however, the quantization level 106 is not above the cutoff value, then the quantization level 106 is mapped onto a bin string composed of the first binarization code 160 only. In some embodiments, the cutoff value 164 may become zero for certain transform coefficients in which case the binarization 161 merely comprises the second binarization code 162.

Although it might be that the one or more bins forming the binarization 161 of a certain transform coefficient may be coded into the data stream, and decoded therefrom, respectively, coefficient by coefficient along the scanning path 94, some embodiments described later on make use of several passes which traverse the coefficients. This means, in turn, that whenever a "previously encoded/decoded transform coefficients" are mentioned below, the binarization thereof might not have been encoded/decoded completely. Rather, at least one bin has been encoded/decoded for such a previous transform coefficient. The binarization 161 may be formed in such a manner that a length of the first binarization code, the length of the second binarization code as well as the overall binarization length of binarization 161 monotonically increases with respect to the quantization level 106 or, to be more precise, the magnitude value thereof. That is, the more leading bins of the binarization 161 have been read for a certain quantization level 106, the more probable it becomes that, firstly, the binarization 161 is completely read and, secondly, the larger an absolute value is which the quantization level 106 may not fall below or which the quantization level minimally has in case there are bins of the binarization 161 following these leading bins and not yet having been read.

As a concrete example, for instance, it might be that the bins of the first binarization code 160 are coded/decoded first in one or more passes with then attending to the coding/decoding of the second binarization code. While the bins of the first binarization code 160 might be coded using context-adaptive entropy coding, the bins of the second binarization code 162 might be coded using an equi-probability bypass mode, i.e., using a code rate of one.

Figure 7:
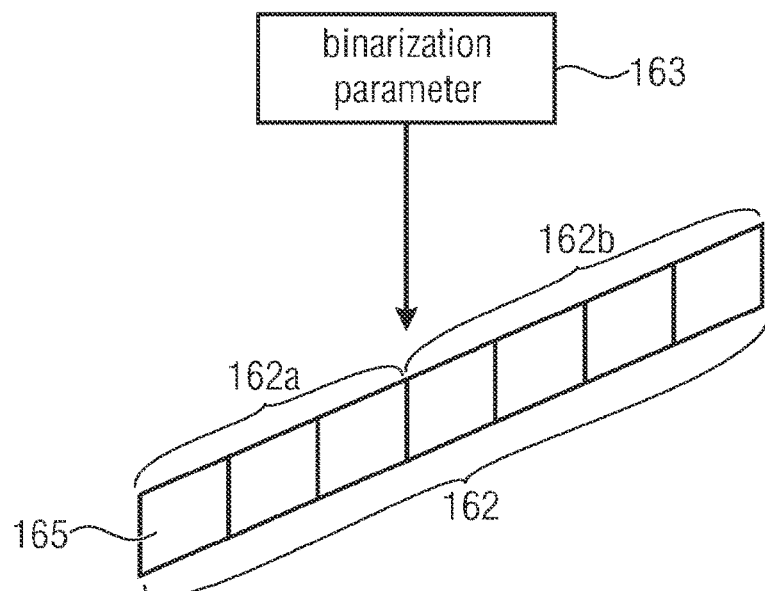
FIG. 7 shows a schematic diagram illustrating a possibility for having a binarization with a prefix part and a suffix part when such a binarization may underlie, for instance, the second binarization code of FIG. 6.

As illustrated in FIG. 7, the second binarization code itself might be composed binarization code comprising a prefix part 162a and a suffix part 162b. A binarization parameter 163 might adjust a length of the prefix part 162a. For instance, the binarization parameter 163 might be an Exp-Golomb order or a Rice parameter.

Again, the bins 165 of the binarization 161 belonging to the first binarization code might be coded using context-adaptive binary coding. Same are illustrated are using hatching in FIG. 6. The other bins 165 belonging to the second binarization code 162 might be coded using the bypass mode and are illustrated in FIGS. 6 and 7 without hatching. Many embodiments described subsequently relate to context selection. This context selection may then, as a specific implementation, be used for context-adaptively coding one or more of the bins 165, for instance. Further details are set out hereinbelow.

Before starting with the description of the embodiments of the present application, further concepts which are sometimes commonly used by some of the embodiments described later on shall be presented. In particular, in accordance with some embodiments, the transform coefficient block 92 is partitioned into partitions 120 as illustrated using dashed lines in FIG. 8, for sake of signaling that all transform coefficients within a certain partition 120 are zero and accordingly, may be skipped when coding the transform coefficients 91. If such partitioning for sake of zeroness signalization is used, an indication is signaled in the data stream 14 on a partition by partition basis in order to signal for a certain partition whether the transform coefficients 91 therein are all zero, or whether this is not the case and the transform coefficients 91 therein are coded into the data stream. If not taught to the contrary during the description of the various embodiments of the present application, one possible applying to all the subsequently applied embodiments is that the scanning part 94 may be selected in a way so that the transform coefficients 91 are traversed by the scanning path 94 in a manner so that all transform coefficients 91 of a certain partition 120 are scanned or traversed by the scan path 94 before the transform coefficient of any other partition. When combining the latter possibility with the multiple pass alternatives mentioned above with respect to FIGS. 6 and 7, it may be that the transform coefficients 91 within one partition 120 are coded completely, i.e., the bins of the bin string 161 are coded completely, before the coded/decoding proceeds with transform coefficients of any other partition. That is, one or more passes are used to traverse an encode/decode the transform coefficients 91 of a certain partition 120 along scan path 94, before the coding/decoding proceeds in one or more passes with the encoding/decoding of transform coefficients of the next partition along the scan path 94 in scan order such as scan order 118.

Figure 9:
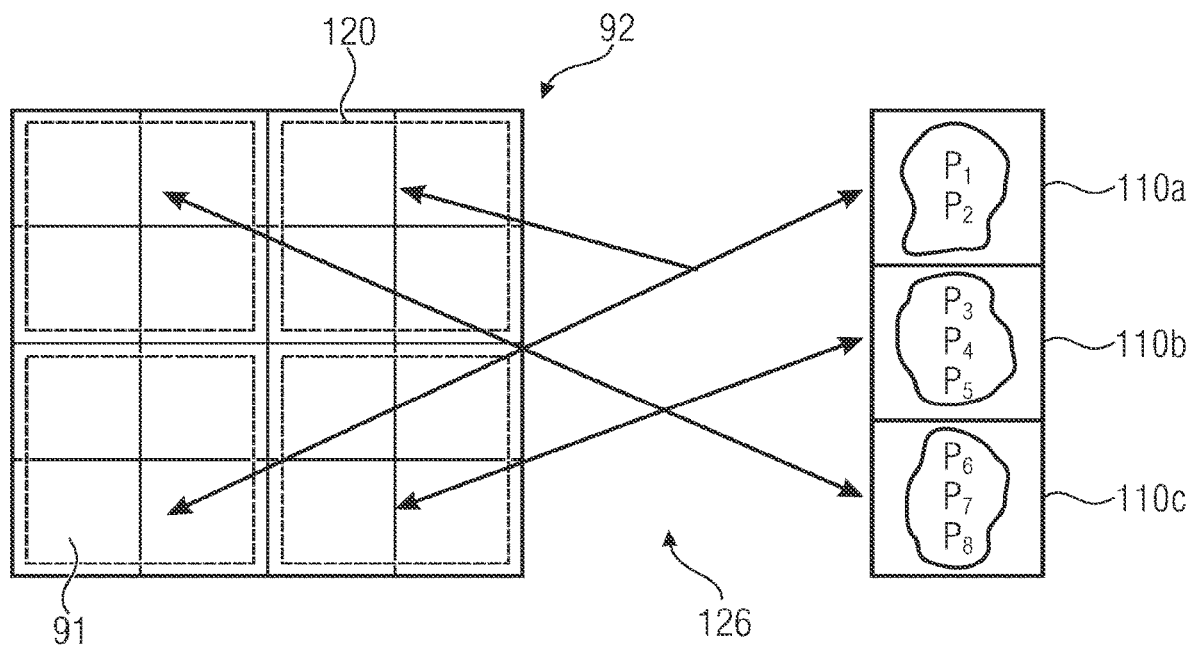
FIG. 9 shows a schematic diagram illustrating the usage of partitions for the sake of context set association.

Another concept using partitions is illustrated with respect to FIG. 9. A few embodiments described later on make use of this concept. Here, the transform coefficient block 92 is partitioned into partitions 120 for sake of context usage. Context sets 110a to 110c are depicted at the right hand side of FIG. 9. A set 110a-c of contexts comprises one or more contexts indicated by "$P_\#$". Each "context" may alternatively be denoted as a context model and indicates the probability estimation underlying the entropy coding using this context. For instance, in case of binary entropy coding, i.e., the entropy coding of a bin, a context indicates the probability estimation for one of the bin values, for instance, and, accordingly, automatically also the probability estimation for the other bin value. Each of the partitions 120 has one of the context sets 110a-c associated therewith. For instance, transform coefficients 91 within a certain partition 120 are entropy coded/decoded using a selected one out of the context set 110 associated with that partition 120 with the selection out of this set being done, for instance, on the basis of an evaluation of coefficients in the neighborhood of the current coefficient 91.

Figure 10:
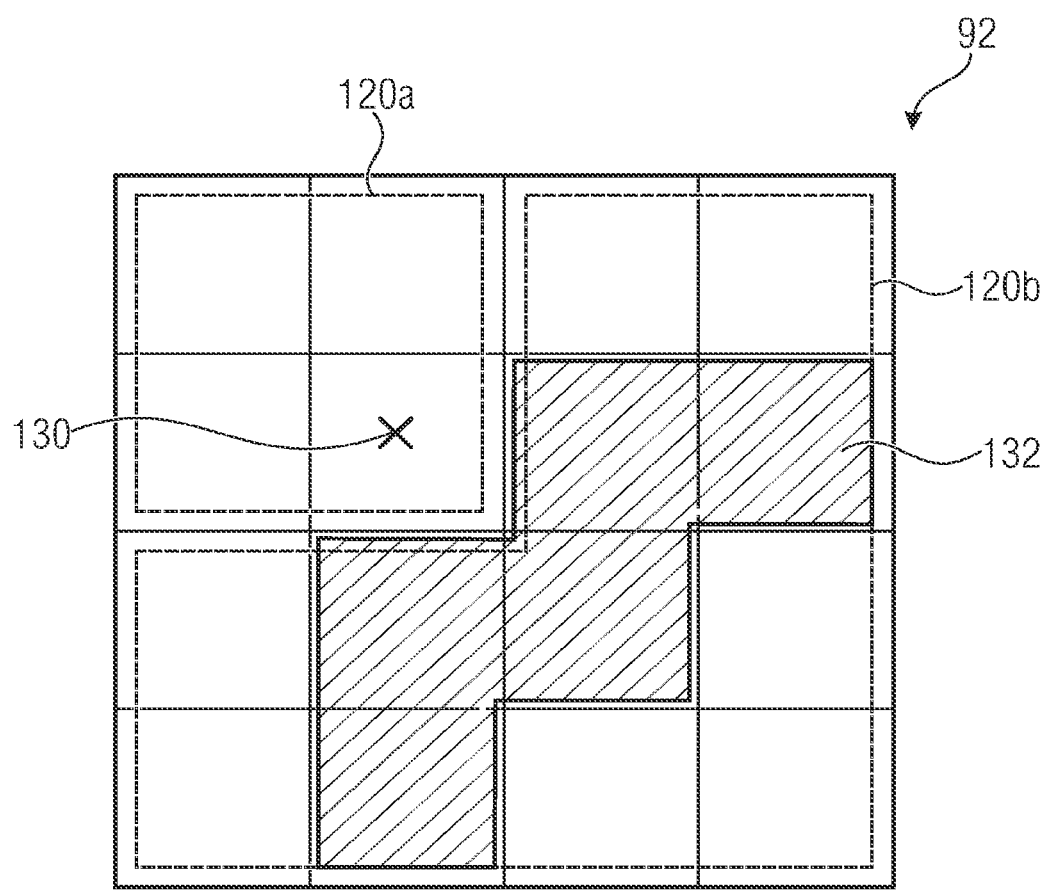
FIG. 10 shows schematically a transform coefficient block and the usage of a local template for a currently encoded/decoded transform coefficient block for the sake of selecting one context for this currently entropy-encoded/decoded transform coefficient.

The latter circumstance is, for instance, depicted in FIG. 10. A currently encoded/decoded transform coefficient is highlighted herein using a cross 130. Currently encoded/decoded may, when using the multi-pass approach mentioned above, mean that one bin of this coefficient 130 is currently encoded/decoded. Reference sign 132 indicates a local template positioned at/around coefficient 130 and coefficients positioned within or at this local template 132 be evaluated or used in order to determine the context to be used for encoding coefficients 130 or its currently encoded/decoded bin. Again, some embodiments directly mention the usage of the local template 132. Embodiments described later on, which do not specifically mention the use of the local template 132 for sake of determining the context used for coding a currently encoded/decoded coefficient 130 may, however, in fact be modified so as to also make use of this way of selecting the context. The selection for coefficient 130 may, in accordance with the embodiment of FIG. 9, be done out of the set associated with the partition 120a the current coefficient 130 is located in. However, the usage of portioning for sake of partition-specific deign of context sets is merely an example and may not be used by all embodiments.

Another aspect which some of the embodiments described later on directly relate to, and which may also be used to modify or extend other embodiments, relates to the content of block 84 relating to multiple components, namely multiple color components. Examples for color components are, for instance, a luma/coma representation according to which the content of block 84 is spatially sampled ones for luma L and for two coma components $C_1$ and $C_2$, but other examples may exist as well. Block 84 would, thus, be composed of a sample array $84_1$ for the first color component, a sample array $84_2$ for the second color component, a sample array for a third color component $84_3$. The aspect here is that each component may be treated separately. That is, for each component, the respective sample array of block 84 may represent a prediction residual with respect to a respective component of a predictor. Each sample array is subject to the transformation 90, advantageously the same one, and yields a corresponding transform coefficient block $92_1$ to $92_3$. It should be noted here, however, that the sample resolution of the various color components may differ from each other and so the sizes among the sample arrays and the sizes among the transform coefficient blocks may vary likewise. Each transform coefficient block $92_1$ to $92_3$ is subject to de/encoding 108 into/from data stream 14, with each transform coefficient block $92_1$ to $92_3$ being subject to the measures and steps and processes described with respect to FIGS. 3 to 9. While the multicomponent concept described in FIG. 11a may be applied onto subsequently explained embodiments which do not further mention any color component aspect, it should be noted that the subsequently explained embodiments may likewise be used for cases or implementations where merely one component exists.

Figure 11B:
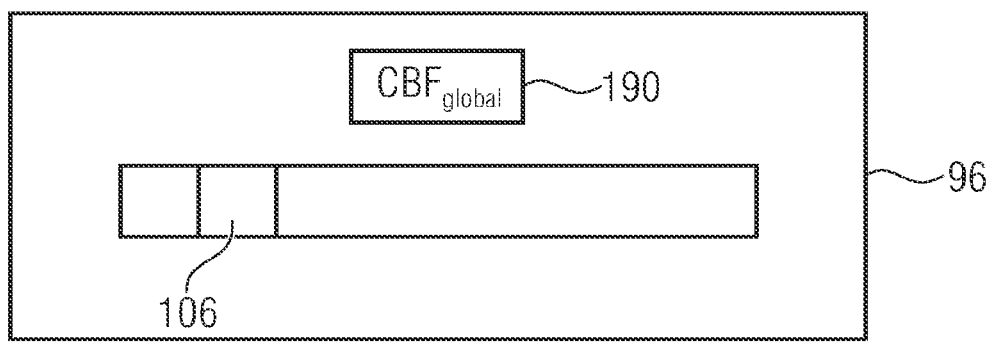
FIG. 11b schematically illustrates the data 96 of coding the transform coefficient block 92 into a data stream 14 as including a global zeroness indication 190 indicating whether all transform coefficients of that block 92 are zero, in which case the quantization levels of the transformation coefficients may not have to be coded but infer to be zero at the decoder side.
Figure 11C:
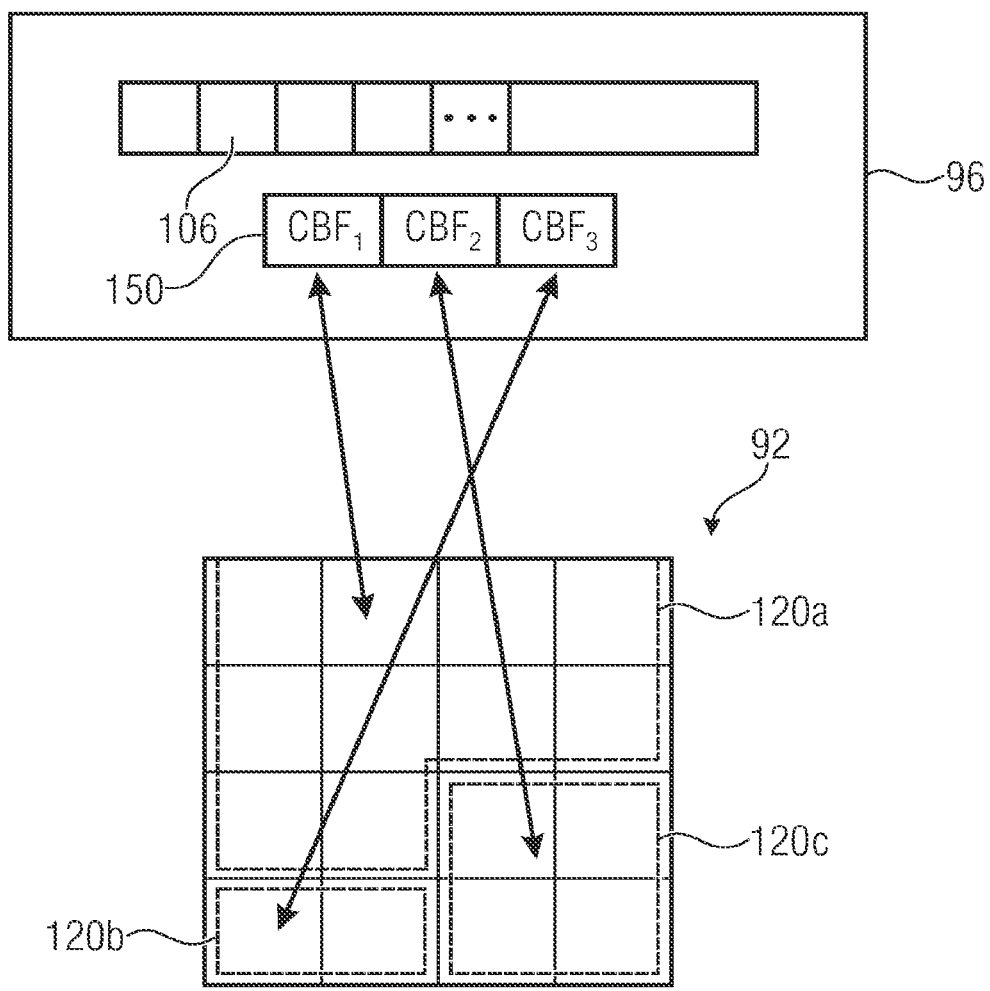
FIG. 11c schematically illustrates the usage of partitioning of a transform coefficient block into partitions for the sake of indicating, in units of partitions, the zeroness of transform coefficients by way of coded sub-block flags CBFs.
Figure 11D:
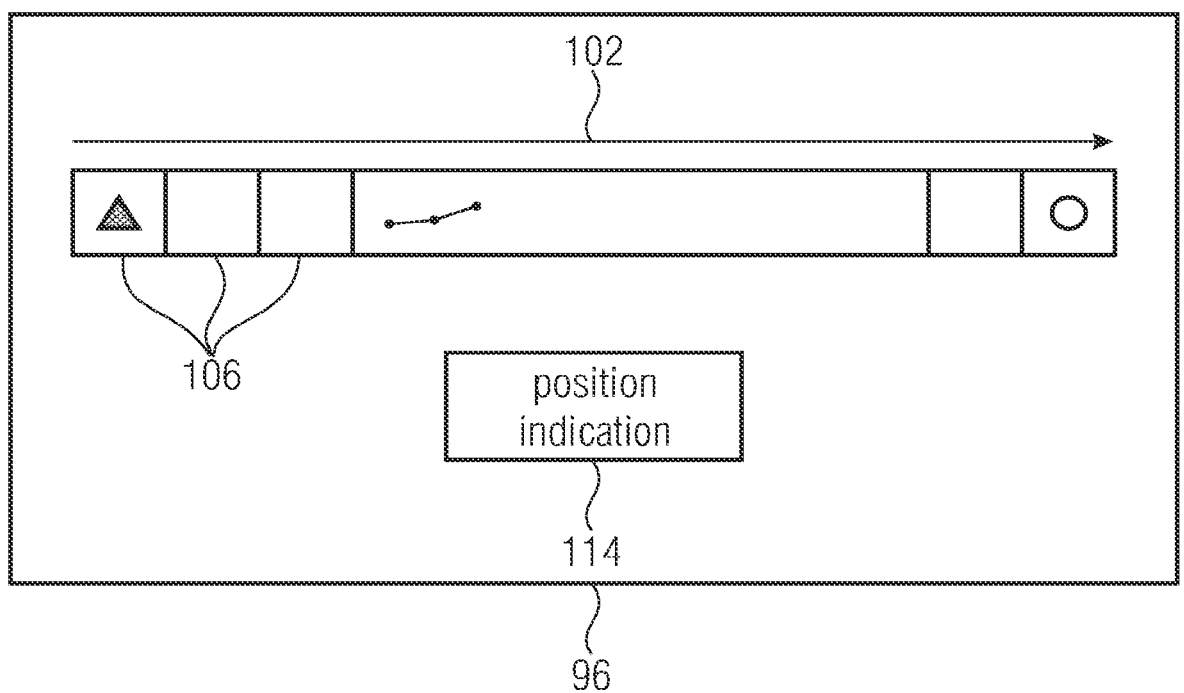
FIG. 11d illustrates that the data 96 into which a transform coefficient block is coded may comprise a last position indication 114 indicating the last coefficient position of a non-zero transform coefficient as shown in FIG. 5.
Figure 11E:
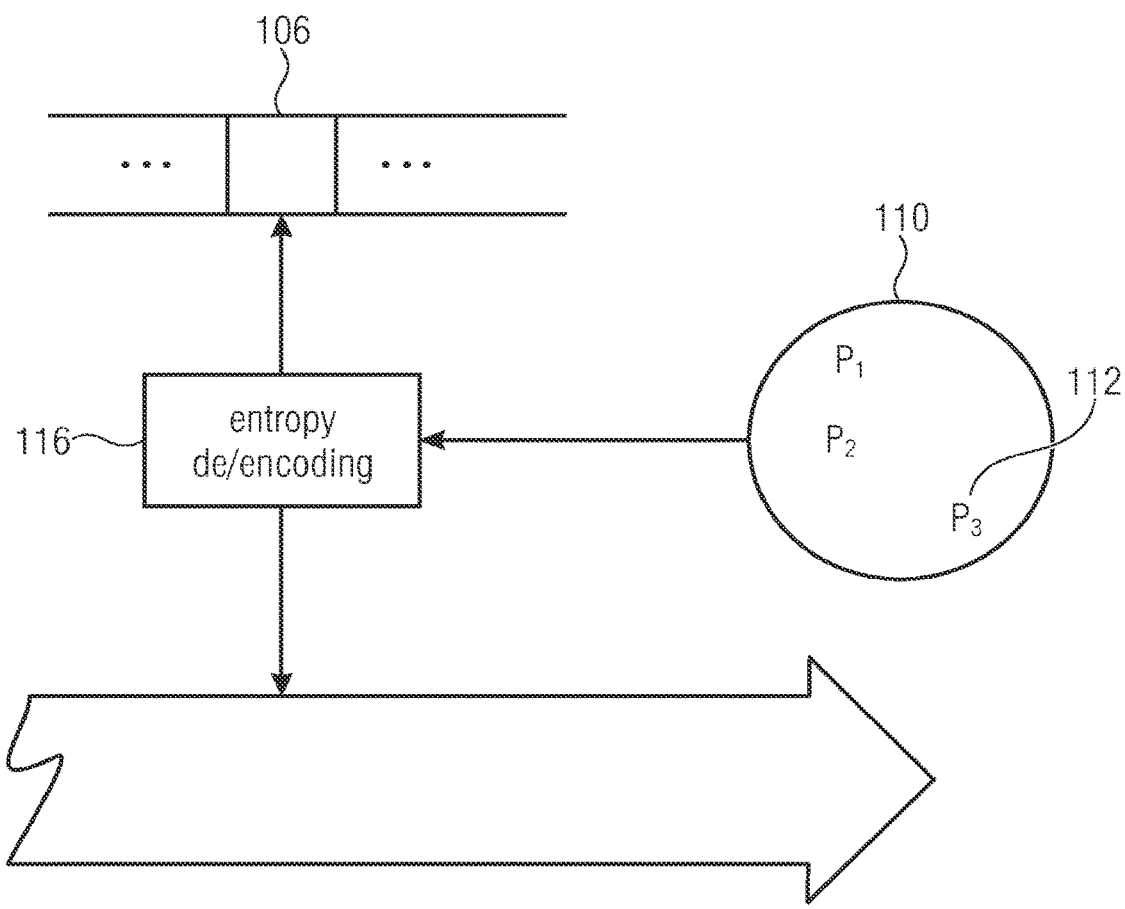
FIG. 11e exemplarily shows the entropy de/encoding of quantization levels of transform coefficients in a context-adaptive manner using a certain context out of a context set.
Figure 11F:
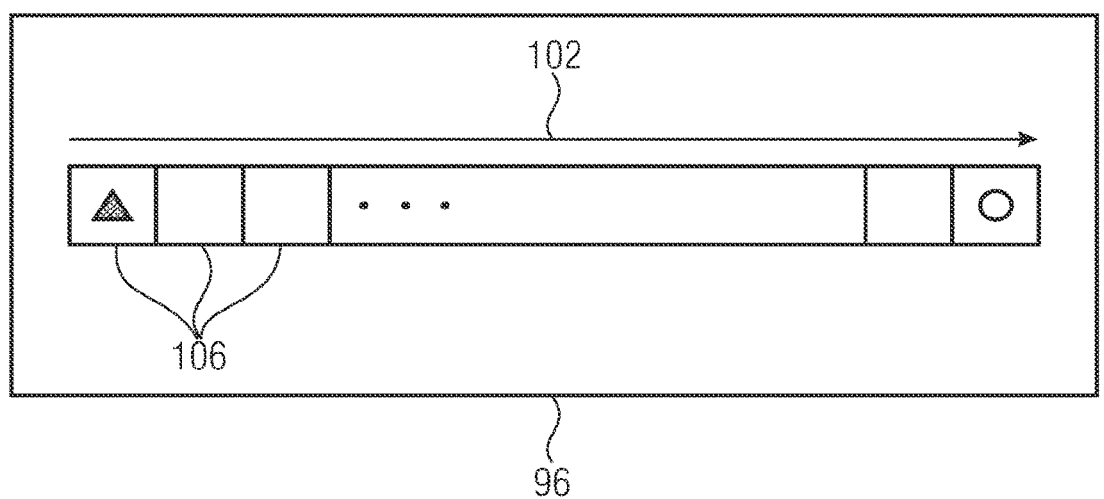
FIG. 11f schematically illustrates the fact that the data into which a transform coefficient block is coded may comprise a sequential coding of the transform coefficients' quantization levels in a coding order 102 in the data stream which corresponds to traversing the scan part of FIG. 5 from the last coefficient position to the first coefficient position.

Another aspect not yet having been described above is the fact that the coding of a certain transform coefficient block 92 and, accordingly, the decoding thereof, may start with an indication 190 whether any of the transform coefficients 91 of that transform coefficient block 92 is non-zero anyway. If not, the transform coefficient block is known to the decoder to be zero globally. Merely if this indication 190 which is illustrated in FIG. 11b indicates that at least one non-zero coefficient 91 exists, any combination of the above-outlined concepts is used to code the transform coefficient block. In a similar manner, FIG. 11c illustrates the similar indications 150 for partitions 120, i.e. they indicate zeroness within an associated partition 120. FIG. 11d illustrates the last position indication 114 which might indicate the position 98. FIG. 11e illustrates the individual context currently used for entropy encoding/decoding 116 a current coefficient's quantization level 106, selected out of an associated context set 110, and FIG. 11f illustrates the coding order 102 at which the quantization levels 106 are coded into the data stream, namely an order resulting from traversing path 94 in the direction 118, for instance.

The reader should now be prepared to understand and follow the embodiments of the present application subsequently described. An embodiment which relates to a first aspect of the present application is described with respect to FIG. 12. Here, encoder and decoder encode/decode a picture 12 into data stream 14 in a manner special in terms of performing the entropy coding of different transform coefficient blocks of different color components of one block 84. FIG. 12 shows block 84 as being composed of two color components, thereby being composed of sample arrays $84_1$ and $84_2$, although it is clear that the composition may encompass three color components as explained with respect to FIG. 11a. As explained with respect to FIG. 11a, the encoder subjects block 84 of the picture 12 separately for the first color component and the second color component to transformation 90 to obtain a first transformation coefficient block $92_1$ and a second transform coefficient block $92_2$, respectively and likewise, the decoder derives the block 84 of the picture by separately performing a reverse transformation on the first transformation coefficient block $92_1$ and the second transform coefficient block $92_2$, respectively. With respect to the entropy encoding and entropy decoding of the second transform coefficient block $92_2$ into/from data stream 14, encoder and decoder operate context-adaptively using a context which depends on the first transform coefficient block $92_1$. The dependency is illustrated in FIG. 12 by way of an arrow 300.

For example, the context determined using dependency 300 on the first transform coefficient block may relate to the partition-specific indications explained above with respect to FIG. 8, indicating whether transform coefficients 91 in a certain partition 120 are all zero or contain at least one non-zero coefficient in which case the quantization levels of the transformation coefficients 91 inside that partition are entropy encoded/decoded into/from data stream 14 whereas this entropy encoding/decoding is skipped for the other partitions indicating all-zeroness. Such an indication for a partition 120 could be a flag and could be called a coded sub-block flag. The context chosen for such a coded sub-block flag for a certain partition/sub-block 120 could, for instance, be chosen dependent on the coded sub-block flag (further indication) coded for the collocated sub-block (partition) in the first transform coefficient block. The selection could, thus, be made among two available contexts: a first available context is used if the flag for the collocated partition in the first transform coefficient block $92_1$ is one and the second available context is used for the flag of a certain partition in the second transform coefficient block $92_2$ if the flag for the collocated partition in the first transform coefficient block $92_1$ is zero. The dependency 300 for a certain indication of a certain partition 120 of the second transform coefficient block $92_2$ could, however, alternatively be implemented in a different manner. For instance, the context chosen for a certain indication of zeroness with respect to a certain partition 120 of the second transform coefficient block $92_2$ could depend on the quantization levels of the transform coefficients of the first transform coefficient block such as those within the collocated partition.

That is, without having been explicitly stated above, we may assume that the two transform coefficient blocks $92_1$ and $92_2$ may be of equal shape and size or may be of equal aspect ratio with respect to horizontal and vertical dimension and the partitioning into partitions 120 may be equal for these blocks $92_1$ and $92_2$ or coincide when scaling one transform coefficient block $92_1$ onto the other.

Alternatively or additionally, the dependency 300 may relate to the global indication of transform coefficient zeroness explained above. That is, the indication coded into or decoded from data stream 14 with respect to transform coefficient block $92_2$ would then, via dependency 300, depend on, with respect to the context used, on the first transform coefficient block $92_1$. If this indication indicates that the transform coefficients 91 of the second transform coefficient block $92_1$ comprise at least one non-zero coefficient, the quantization levels of the transform coefficients 91 of block $92_2$ are entropy encoded into and entropy decoded from data stream 14, but if the indication indicates that all transform coefficients within the second transform coefficient block are zero, the coding/decoding of the second transform coefficient block $92_2$ is done with the decoder inferring that all transform coefficients 91 of that block $92_2$ are zero. For instance, the dependency 300 may, in that case, render the context used for the indication of zeroness for the second transform coefficient block $92_2$ dependent on the corresponding indication coded/decoded for the first transform coefficient block $92_1$. Alternatively, the dependency 300 may render the context used for the indication of zeroness of transform coefficient block $92_2$ dependent on the quantization levels of the transform coefficients of the first transform coefficient block $92_1$. For instance, a first context could be chosen for the indication for the second transform coefficient block if the indication for the first transform coefficient block $92_1$ indicates the non-zeroness of at least one transform coefficient of the first transform coefficient block $92_1$ and a second context could be chosen for the zeroness indication of the second transform coefficient block $92_2$ if the corresponding zeroness indication of the first transform coefficient block $92_1$ indicates all-zeroness of the transform coefficients of the first transform coefficient block $92_1$.

Additionally or alternatively, the dependency 300 could relate to the position indication of the termination coefficient position 98. Different possibilities exist to signal this position indication in data stream 14. For instance, the position indication could be signaled in the data stream as a one-dimensional address or rank indicating the position 98 as an address or rank of position 98 among all coefficient positions when measured along the scan path 94 in the forward direction 116. Alternatively, the position indication could indicate position indicate position 98 within the respective transform coefficient block by way of two coordinates which indicate position 98 in terms of its horizontal and vertical position within transform coefficient block $92_1$ and $92_2$, respectively. Now, in addition to, or alternatively to the possibilities of implementing the dependency 300 already discussed above, the dependency 300 may affect the last position indication of position 98 for the second transform coefficient block $92_2$. In particular, the context used to encode this indication may depend on the first transform coefficient block such as the last position indication of position 98 for the first transform coefficient block $92_1$ or an evaluation of the position or distribution of significant transform coefficients 91 within the first transform coefficient block $92_1$.

The way the last position indications of blocks $92_1$ and $92_2$ are encoded may also involve a binarization into a binarization code and the context the dependency of which involves the dependency 300 may be used for one or more bins such as the first bin of the binarization code of the last position indication.

Additionally or alternatively, one or more bins such as the first bin of the binarization 161 of the transform coefficients 91 within the second transform coefficient block $92_2$ may be subject to the dependency 130, i.e., the context used to encode the one or more bins of binarization 161 may depend on the first transform coefficient block $92_1$ such as the corresponding bin of the binarization of the collocated transform coefficient of the first transform coefficient block $92_1$.

In finalizing the description of the embodiment(s) of FIG. 12 it should be noted that the two color components shown in FIG. 12 may be coma components and in particular, the color component of the second transform coefficient block may be $C_r$ while the color component of the first transform coefficient block $92_1$ may be $C_b$.

The next embodiment for an encoder for encoding a picture into, and a decoder for decoding the picture from a data stream relates to a further aspect of the present application, namely one aiming at a coding efficiency increase by providing a specific context set 110 for specific transform coefficient positions, namely the transform coefficient position 104 which may be, as outlined above, a DC coefficient position. While the embodiment is presented in the following with respect to exactly this transform coefficient position 104, it should be noted that the provision of a specific, coefficient individual context set may alternatively or additionally be applied to coefficient position 98, i.e., the non-zero coefficient's position farthest away from coefficient position 104 measured along scan path 94. "Context individual" shall denote the fact that the context set is not used for any other coefficient 91 of the same transform coefficient block or even that none of the contexts contained in the context set of the transform coefficient position in question, here 104, is used for coding any other transform coefficient within the same transform coefficient block.

The embodiment may be illustrated on the basis of FIG. 5. Encoder and decoder are configured to encode/decode the transform coefficient block 92 into/from the data stream using the scan pattern 94 by encoding/decoding into/from the data stream the data 96 (compare FIG. 4) which represents the coded set 100 of transform coefficients 91 traverse by the scan pattern 94 from the first termination coefficient position 98 in a predetermined direction 102 to the second termination coefficient 104, the data 96 comprising quantization levels of non-zero transform coefficients in the coded set 100 of transform coefficients, i.e., at least the quantization levels of the non-zero transform coefficients along with the locations thereof or the quantization levels of all transform coefficients of coded set 100. It should be understood that the signaling of the position indication of position 98 described above with respect to FIG. 5 shall be understood for the presently described embodiment merely as an example and the signaling of this position indication could be left off alternatively in the present embodiment with, for instance, the coded set 100 covering all transform coefficients 91 of transform coefficient block 92 inevitably or otherwise synchronizing encoder and decoder in determining the coded set 100.

In any case, in accordance with a present embodiment, encoder and decoder are configured to entropy encode/entropy decode the quantization levels context-adaptively with using a specific (first) set of contexts, 110, for the termination coefficient position 104 which may be a DC coefficient position, and this coefficient set 110 used for the coefficient at position 104 is disjoined to the one or more sets of contexts used for any other transform coefficient 91 in the coded set 100 of transform coefficients. In accordance with a specific example, for instance, one context set 110 is used for entropy encoding the quantization level of the DC transform coefficient at position 104, while another/different context set 110 is used for entropy encoding/decoding the quantization levels of all other transform coefficients 91 of block 92 wherein the "difference" between the context sets may involve that none of the contexts contained in the context set of the coefficient at position 104 is contained within the context set of the other transform coefficients and vice versa.

In accordance with the above-mentioned alternative where the position specific context set is used for the transform coefficient quantization level at position 98, all other transform coefficients 91 could use the same context set which is then different from the context set used for transform coefficient at position 98. And in case of the further alternative also mentioned above, position specific context sets could be used for both the transform coefficients at position 104 as well as the one at position 98 and they could be mutually different to each other as well as to the context set which would then, for example, be jointly used for entropy encoding/decoding the coefficients 91 contained in the coded set 100 and being between positions 104 and 98 along scan path 94.

The position specific context set thus individually provided for one coefficient position, namely here coefficient position 104, could be used, for instance, for encoding one or more bins of the binarization 161 of the transform coefficient as position 104. This one or more bin 165 could be one or more bins 165 of the first binarization code 160. It could, for instance, be the first bin in bin order of binarization 161 with this bin, for instance, indicated whether the transform coefficient at the corresponding position is significant, i.e., non-zero, or not. Likewise, the disjoined set of contexts used for the other transform coefficients would be used for the corresponding one or more bins of the binarization 161 of these other transform coefficients.

It should be recalled that the context sets just-mentioned with respect to FIG. 5 may then serve as a reservoir out of which a specific context is then used for a currently encoded/decoded transform coefficient. That is, the position specific context set 110 for the transform coefficient at position 104 would serve as a basis of reservoir out of which the context actually to be used for entropy encoding/decoding the one or more bins of the binarization 161 of the coefficient level of the transform coefficient at position 104 is selected using a local template 132 shown in FIG. 10. The local template 132 shown in FIG. 10 comprises five transform coefficient positions in the neighborhood of the currently entropy encoded/decoded transform coefficient 130 namely the coefficient positions to the right of, below, diagonally to the right and bottom of the currently entropy encoded/decoded transform coefficient 130 as well as the next but nearest position to the right and the next but nearest position below coefficient 130. However, this is merely an example and the number and location of the positions covered by the local template 132 could be chosen differently.

Figure 8:
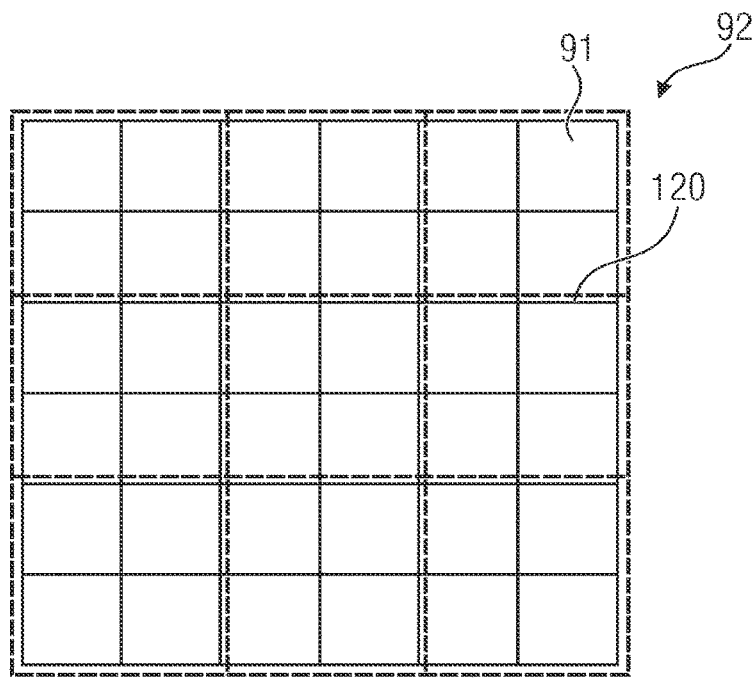
FIG. 8 exemplarily illustrates a partitioning of a transform coefficient block into partitions, here a regular partitioning into rows and columns of partitions, each partition, accordingly, being composed of an array of coefficients, wherein the partitioning may be used for a context set association to the transform coefficients and/or zeroness indication of the transform coefficients as described herein below.
Figure 13:
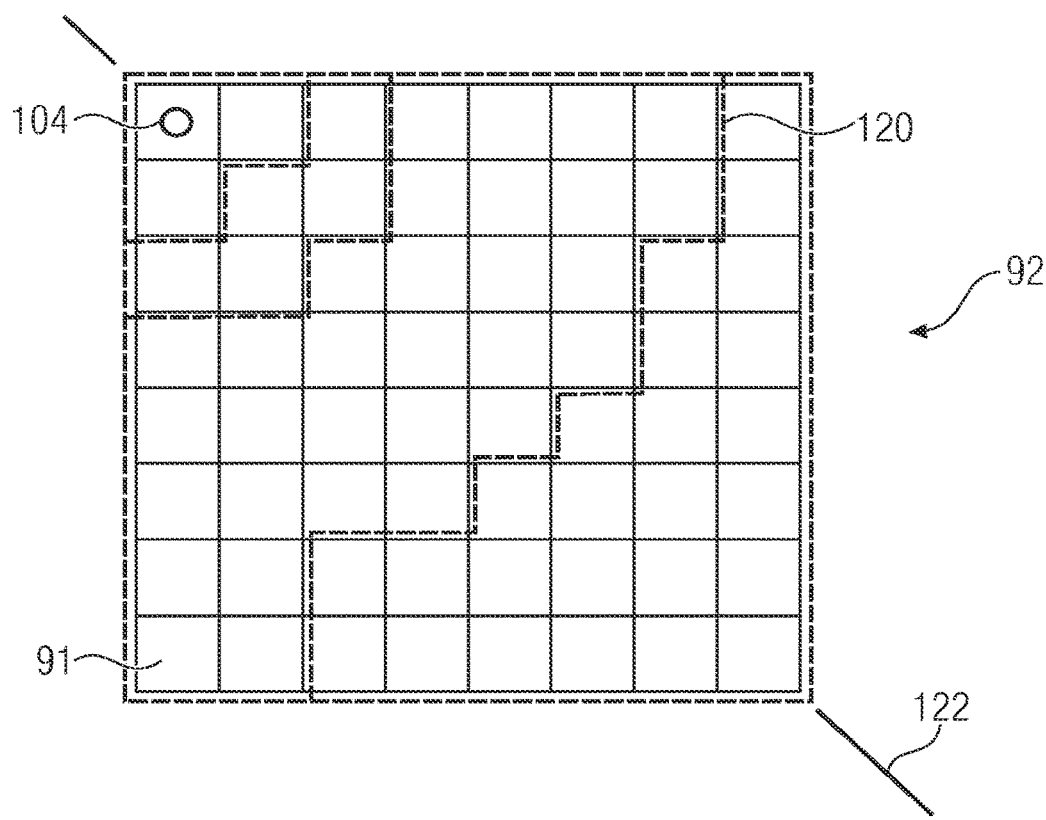
FIG. 13 shows a schematic diagram illustrating a partitioning of a transform coefficient block into partitions which do not coincide in shape as shown in FIG. 8.

For completeness, it is noted that the just-described embodiments where a context-specific context set is used for one or two specific coefficient positions 104 and/or 98, may be combined with the possibility discussed with respect to FIG. 8 according to which for the remaining transform coefficients, partition specific coefficient sets 110 may be used for partitions 120 into which the transform coefficient block 92 is partitioned. For instance, FIG. 13 shows position 104 and shows that the transform coefficient block 92 is partitioned into several partitions, namely here four partitions 120. In accordance with the present embodiment, a position-specific context set would be used for entropy encoding/decoding the quantization level of the coefficient at position 104, while for all the other transform coefficients 91 of block 92 the context set to be used would be determined to be the one associated with the partition the respective transform coefficient 91 is located in and these context sets may be mutually disjoined as well as disjoined to the context set provided specifically for position 104.

In the example, of FIG. 13, the partitions extend diagonally along a direction obliquely to a transform coefficient block's diagonal 122 which runs through the termination coefficient position 104 such as the DC coefficient position, and the opposite corner of the transform coefficient block, i.e., the coefficient position at the bottom right hand side of the coefficient block 92 which, thus, may correspond to the highest frequency in both horizontal and vertical direction.

It is clear that the embodiment just-described with respect to FIGS. 5 and 13 may readily be combined with the embodiment described with respect to FIG. 12.

The embodiments described next relate to a further aspect of the present application for an encoder for encoding a picture into a data stream and a decoder for decoding the picture from the data stream, with the aspect being specific with respect to a context selection or a context determination for a currently encoded/decoded transform coefficient. The embodiment(s) may be best understood and described with respect to FIG. 10. Specifically, encoder and decoder are configured to entropy encode/decode a quantization level of the currently encoded/decoded transform coefficient 130 of transform coefficient block 92 context-adaptively by use of a context which is determined based of a sum of and/or a number of significant ones among the one or more previously encoded/decoded transform coefficients located at positions determined by the local template 132 which template is positioned at the currently encoded/decoded transform coefficient 130. It should be recalled that, while it would be possible in accordance with the present embodiment(s) that the transform coefficients or, to be more precise, their quantization levels are entropy coded/decoded one after the other, i.e. completely before proceeding with the entropy encoding/decoding the next transform coefficient 91, the concept discussed above could be applied as well according to which the entropy encoding/decoding the quantization levels of the transformation coefficients takes place using context-adapted binary entropy coding of bins of a binarization of quantization levels in multiple passes. The context-adaptivity may be restricted to the first binarization code 160 as discussed above. That is, on the one hand, it is noted that the context selected/determined using the local template 132 and forming the sum and/or counting the number of significant ones among the one or more transform coefficients within the local template 132 could be applied to one or more bins of the first binarization code 160. Additionally, multiple pass coding could be used. That is, the currently entropy encoded/decoded transform coefficient 130 could be the transform coefficient whose bin is currently entropy encoded/decoded. Further, as the bins 165 of the binarization 161 of the transform coefficients 91 of block 92 are coded sequentially in a plurality of passes, the bins 165 or the binarization 161 of the transform coefficients 91 encompassed by the local template 132 could have been entropy encoded/decoded incompletely so far. Accordingly, with respect to the determination of the context for coefficient 130 or, to be more precise, its currently encoded/decoded bin, the sum could be computed as follows. In particular, the sum of coefficients 91 within local template 132 could be computed as the sum of predetermined absolute value of the coefficient level of the one or more transform coefficients located within the local template 132, which predetermined absolute value the coefficient level of the respective coefficient inside local template 132 minimally has to have according to the bins of the binarization of that coefficient level of that transform coefficient which have been encoded/decoded so far in the multiple pass bin encoding/decoding process. As a specific example, you may imagine that the binarization 161 comprises the following bins: the first bin of the first binarization code 160 may, as already mentioned above, indicate whether the quantization level of the transform coefficient to which the binarization 161 relates, is significant, i.e. non-zero, or not. A second bin in bin order of the binarization 160 could also belong to the first binarization code 160, i.e. could also be one subject to context-adaptive entropy encoding/decoding, and could indicate whether the absolute value of the quantization level of the coefficient which the binarization 160 relates to is greater than 1 or not. A third bin in bin order could also belong to the first binarization code 160 and could indicate whether the absolute value of the transform coefficient is odd or even, i.e. its parity. An even further bin in bin order, i.e. the fourth bin, could also belong to the first binarization code 160 and could indicate whether the present transform coefficient is greater than 2 in case of the parity being even or 3 in case of the parity being odd. The other bins may belong to the second binarization code 162. Thus, depending on the number of bins already having been entropy encoded/decoded for the coefficients within local template 132, its absolute quantization level value is either completely known and may form an addend of the sum, or a minimum absolute value may be used instead and be derived on the basis of the already encoded/decoded bins of the quantization level of that coefficient.

As far as the number of significant coefficient within local template is concerned, same is available in accordance with the just-outlined example as the first bin is already encoded for the coefficients within local template for at least those coefficients within the local template preceding along the scan pass the currently encoded/decoded coefficient 130 in the reverse direction 118.

A specific example could be that the context determination is based merely on the sum. Another example could be that the context is determined/selected merely based on the number or count of significant coefficients within template 132. An even other example is that a difference between sum and number of significant coefficients is used. Further, alternatively or additionally, the context determined in the just-outlined manner could be used for one or more bins of the first binarization code 160 such as any or more than one of the just specifically exemplified bins.

The embodiment(s) just-described with respect to FIG. 10 may be combined with any of the embodiments described above.

The embodiment(s) described next relate(s) to a further aspect of the present application and may be combined with any of the previously described embodiments of the aspects of the present application. The description may also be provided with respect to FIG. 10. Just as the decoders and encoders described with respect to FIG. 10 and relating to the previously described embodiment(s), the embodiment(s) described now relate(s) an encoder for encoding a picture into the data stream and a decoder for decoding the picture from the data stream, encoder and decoder configured to encode/decode the transform coefficient block 92 into/from the data stream. In accordance with the embodiment(s) described now, however, the local template and, in particular, the one or more previously encoded/decoded transform coefficients located at positions thereof, are used to set a binarization parameter. The absolute value of a quantization level of a currently encoded/decoded transform coefficient 130 of the transform coefficient block 92 is encoded/decoded in a manner binarized using a binarization which is parametrized using the binarization parameter. The sum of and/or the number of significant ones among the one or more previously encoded/decoded transform coefficients is used for the determination.

That is, the description of the present embodiment quite far coincides with the description given previously with respect to the determination of the context on the basis of an evaluation of the local template's one or more previously encoded/decoded transform coefficients with the present embodiment(s), however, concentrating on the setting of the binarization parameter. It should be noted that the binarization using which, according to the present embodiment(s), the absolute value of the quantization level of the transform coefficients of the transform coefficient block are encoded/decoded and whose binarization parameter is set using the local template 132, might be a binarization 161 as described above with respect to FIG. 6, but needs not to be necessarily. That is, the binarization meant here might have a first binarization code or first part or prefix part whose bins are coded context-adaptively, but it may also be that the whole transform coefficient block is coded using bypass mode, for instance, or that the binarization meant here only consists of the second binarization code 162. The binarization parameter determined based on an evaluation of the local template 132 may determine a length of the prefix part 162a. A look-up table may be used in order to map the sum of absolute values of the quantization levels of the one or more previously encoded/decoded transform coefficients within the local template 132 onto the binarization parameter. It might be that the binarization parameter is determined in a manner so that same continuously increases or continuously decreases over the transform coefficients.

With respect to the further details, reference is made to the description of the embodiment described previously, namely with respect to the determination of the context on the basis of which context-adaptively entropy coded bins of the binarization are coded. These details set out as to how the sum may be determined in case of traversing the transform coefficients using a multi-pass approach. In this regard, for the present embodiment as well as for the previous one, it should be recalled that the multi-path approach could be done in a manner so that the multi-pass approach is applied partition-wise. In any case, however, as the scan pass 94 generally points from bottom right to top left of the transform coefficient block 92, template positions illustrated in FIG. 10, i.e. template positions which lie to the right and/or bottom of the currently encoded/decoded transform coefficient 130, tend to be already encoded/decoded at the time the currently encoded/decoded transform coefficient or its current bin is up to be encoded/decoded into/from the data stream.

The embodiment(s) described next relate to an encoder and a decoder for encoding/decoding a picture into/from a data stream which is specific in terms of a cutoff value 164. The following description may, thus, best be understood on the basis of a combination of FIG. 4 and FIG. 6. Here, encoder and decoder are configured to encode/decode the transform coefficient block 92 into/from the data stream using a scan pattern 94, shown in FIG. 5, by encoding/decoding an absolute value of quantization levels 106 of the transform coefficients 91 of the transform coefficient block 92 in a manner binarized using a first binarization code 160 below the cutoff value 164 and a second binarization code 162, prefixed by a codeword of the first binarization code for the cutoff value, above the cutoff value. As became clear from the above-description of possible general implementation examples or concepts, it might be that the bins of the first binarization code 160 are coded using context-adaptive binary entropy coding whereas the second binarization code is coded using an equi-probability bypass mode. In accordance with the present embodiment, the cutoff value for the transform coefficients 91 of the transform coefficient block 92 is adaptively varied depending on previously encoded/decoded transform coefficients.

In accordance with a specific embodiment, the adaptive variation could be embodied as follows. The transform coefficient block 92 could be partitioned into partitions 120 with the scan path 94 leading through the transform coefficient block 92 so as to scan the transform coefficients 91 partition by partition. That is, all transform coefficient positions within one partitioned would be scanned/traversed by the scan path 94 prior to the next partition. Beyond this, the encoding/decoding of the transform coefficients 91 would be done in a manner so that the bins 165 are coded in passes. The bins 165 of the first binarization code 160 would be subject to context-entropy encoding, while the bins of the second binarization code 162 would be subject to an equi-probability bypass mode. The bins of the first binarization code 160 would be encoded/decoded prior to those of the second binarization code 162. In this coding environment, the adaptive variation of the cutoff value could be implemented as follows: the bins 165 of the transform coefficients 91 within a current partition are scanned in one or more leading passes. However, the number of the bins 165 coded using context-adaptive binary entropy coding/decoding might be limited. That is, in that case, let's assume one pass is used to code the bins 165 of the first binarization code 160. Then, the bins 165 of the first binarization code 160 of the absolute value of the quantization level of the coefficients 91 within the current partition 120 would be coded coefficient by coefficient. Then number of bins, thus having been coded for the individual coefficients 91, would vary depending on the value of the respective transform coefficient's quantization level. At a certain coefficient, the maximum number of context-adaptively binary entropy coded bins 165 of the first binarization code 160 would be reached. The first pass would, thus, be completed. The next pass would scan the coefficients 91 of the current partition again from the beginning, i.e., from the coefficient position within that partition 120 furthest away from position 104 of block 92. For all coefficients prior to reaching the maximum number of context-adaptively binary entropy coded bins, the cutoff value 164 would be equal to the initial value for the cutoff value. For the coefficient whose bins 165 of the first binarization code 160 could not be context-adaptively binary entropy encoded/decoded completely because of the reaching of the maximum number of context-adaptively entropy coded bins, the cutoff value is reduced in a manner corresponding to the number of coded bins 165 of the first binarization code 160 of that coefficient. In particular, the cutoff value is reduced for this coefficient to correspond to the number of bins coded for that coefficient and the second binarization code 162 for this coefficient simply codes the "reminder" above the maximum absolute value associated with the first binarization code's bins 165. For subsequent coefficients within that partition 120, the cutoff value would even be zero and the binarization 161 would merely consist of the second binarization code 162.

In the just-outlined example, the adaptive variation of the cutoff value played a central role. In the subsequently outlined embodiment(s) a setting of the cutoff value is used to increase the coding efficiency, but according to this embodiment, the setting may alternatively be an initial setting of the cutoff value at the beginning of coding the transform coefficient block and decoding the same, respectively, rather than an adaptive setting of the cutoff value during the coding/decoding of the transform coefficient block although the latter option also exists according to the present embodiment. That is, in accordance with these embodiment(s), an encoder and decoder for encoding/decoding a picture into/from a data stream encodes/decodes the transform coefficient block 92 by encoding/decoding an absolute value of a quantization level 106 of the transform coefficients 91 of the transform coefficient block 92 in a manner binarized using a first binarization code below a cutoff value 164 and using a second binarization code 162, prefixed by a codeword of the first binarization code 160 for the cutoff value 164, above the cutoff value. The cutoff value 164 is set depending on one or more of a size of the block 84,
a color component of the block 84,
a prediction mode underlying a prediction signal a prediction residual of which block 84 represents, such as intra or inter coding mode,
a transformation underlying the transform coefficient block 92,
a quantization parameter used to quantize the transform coefficient block 92,
a measure of an energy of previously encoded/decoded transform coefficients, and
an evaluation of previously encoded/decoded transform coefficients.

Again, the setting described herein could be done for each coefficient 91 or, alternatively, merely for the first one being coded such as the coefficient at position 98 or, alternatively, the coefficients firstly traversed by the scan path 94 within each partition, i.e., the coefficient as position 98 within the firstly traversed partition 120 and likewise the firstly traversed coefficients in any following partition 120.

The above-mentioned alternatives for setting the cutoff value 164 may be implemented in a multitude of possibilities. In principle, however, the setting of the cutoff value could also be embodied, as one example, in the manner outlined with respect to the previous example: that is, for each coefficient, the cutoff value 164 could be set in a manner depending on the number of bins of the first binarization code already having been context-adaptively binary entropy coded/decoded so far. This number could be used as a measure for the energy or this number could be the result of the evaluation of previously decoded/encoded transform coefficients. If the number or count of already encoded/decoded bins of the first binarization code 160 is done per partition 120, this number or count would represent a measure for the energy of previously encoded/decoded transform coefficients within the current partition 120. With respect to the present embodiment of setting the cutoff value 164 as well as to the previous embodiment(s) of adaptively varying the cutoff value 164 it should be noted, however, that there is also a variation with respect to the maximum number of context-adaptively binary entropy coded bins: instead of defining same for each partition 120 separately, the maximum number could be determined globally. This would mean, that the maximum number is reached for one specific coefficient 91 and the whole transform coefficient block 92, positioned in one partition 120 only. For all previously scanned partitions 120, the cutoff value would correspond to the initial one, while the reduction of the cutoff value 164 down to zero would only occur within that partition. Following partitions would have a cutoff value 164 of zero for all their coefficients 91.

There exists many further embodiments of the just-outlined embodiment for setting the cutoff value 164 depending on one or more of the above-outlined/listed alternatives. For instance, the evaluation of previously encoded/decoded transform coefficients could be restricted to coefficients 91 located at positions determined by the local template 132. That is, the setting would be done for a currently encoded/decoded transform coefficient 130 and the setting would be, effectively, an adaptive variation. Even alternatively, the evaluation of previously encoded/decoded transform coefficients could be done with respect to coefficients located at positions within a partition of the transform coefficient block offset to a current position, the currently encoded/decoded transform coefficient 130 is located in and preceding the current partition according to the coding order 118. In the latter alternative, the evaluation could be done for each partition 120, namely at a kind of initial setting of the cutoff value at the beginning of coding the transform coefficients 91 within the respective partition 120. Further alternatives will further be discussed in the following. One, for instance, the initial setting could be done in accordance with any of the one or more alternatives listed above. Depending on the initially set value of the cutoff value 164 succeeding or exceeding a predetermined threshold, the adaptive variation of the cutoff value could be activated or the cutoff value could be kept constant. One example is, for instance, that the cutoff value is initially set depending on the quantization parameter. If the quantization determined by the quantization parameter is finer than a predetermined threshold, the adaptive variation could be activated and the cutoff value could be adaptively varied and, thus, be amended relative to the initial setting, depending on previously encoded/decoded transform coefficients, but if the quantization parameter corresponds to a coarser quantization, then the cutoff value is kept constant.

Figure 14:
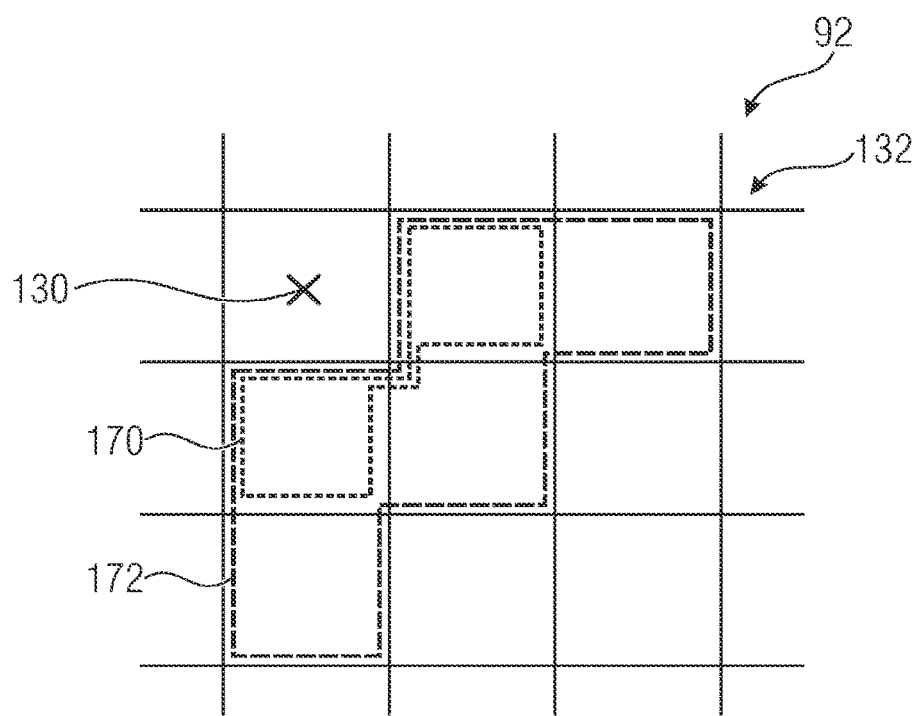
FIG. 14 shows a schematic diagram illustrating a possibility of varying shapes of a local template used for context selection as taught in FIG. 10, or even disabling same.

In the following, embodiment(s) of the present application are concerned, which are related to an aspect of the present application which specifically deals with the shape of the local template 132. That is, in accordance with the present embodiment(s), the encoder is for encoding a picture into the data stream 14, and the decoder is for decoding the picture from the data stream. Encoder and decoder are configured to entropy encode/decode a quantization level 106 of a currently encoded transform coefficient 130 of a transform coefficient block 92 by use of a context which is determined based on one or more previously encoded transform coefficients located at positions determined by the local template 132 positioned at the currently encoded/decoded transform coefficient 130 or, if the local template 132 is disabled, independent from previously encoded/decoded transform coefficients 91. In particular, in accordance with the embodiment of FIG. 14, depending on 1) previously encoded/decoded transform coefficients 91 and/or 2) one or more of a size of the block 84, a color component of block 84, a position of a termination coefficient positioned at which, when traversing the scan pattern 94 along a forward direction 116, a last non-zero transform coefficient results, namely 98, and a transformation 90 underlying the transform coefficient block 92, a shape of the local template 132 is set or depending thereon the local template 132 is disabled, meaning that the local template 132 vanishes and does not comprise any coefficient positioned at all. FIG. 14 exemplarily shows two shapes 170 and 172 for the local template 132. One, namely 172, corresponds to the example depicted and described above with respect to FIG. 10. The other, namely 170, merely comprises the immediate right-hand neighboring coefficient position and the immediately neighboring position below the currently entropy encoded/decoded coefficient 130.

In accordance with the first alternative, according to which the dependency relates to previously encoded/decoded transform coefficients, their dependency on the previously encoded/decoded transform coefficients may be restricted to those one or more previously encoded/decoded transform coefficients located at positions determined by the smaller shape for the local template such as the local primitive template 170. Depending on an evaluation of the coefficients positioned at the primitive template 170, it is decided whether, for instance, this primitive template 170 is used for the context determination, or whether the larger primitive template 172 is used. The larger primitive template 172 extends further away from the currently encoded transform coefficient 130 than primitive template 170. The second primitive template 172 may include the positions also included by the first primitive template 170, or may not include them.

The decision of which shape to use on the basis of an evaluation of the coefficients within the smaller template 170 may be done depending on a sum of, or a number of significant ones among the one or more previously encoded transform coefficients within the primitive template 170. Even a disablement decision may be made depending on an evaluation of the one or more coefficients within the primitive template 170. Even further, a disablement decision may be made depending on if an accumulator value derived from previously encoded/decoded transform coefficients within the transform coefficient block, or a count of previously encoded/decoded transform coefficients within the transform coefficient block is greater than some threshold, exceeds a predetermined amount. Additionally or alternatively, the local template may be disabled if a count of previously encoded/decoded transform coefficients 91 within the transform coefficient block being insignificant, exceeds a predetermined amount.

As to the context dependency on the one or more coefficients within the local template 132, the details set out above may hold true, i.e. the sum and/or the number of significant coefficients within the local template may be used. Further, the context derived based on the local template 132 may be restricted to be used for bins 165 of the prefix part 160. And further, the above made notes with respect to the usage of multiple passes and the relevance for the determination of the sum within the local template 132 may apply here as well.

Referring to a particular embodiment, it may be that the local template 132 is disabled for a chroma component, whereas the local template 132 is not disabled for the luma component.

Further embodiment(s) of the present application relate to the sizes of partitions 120 when using the partitions 120 as a granularity for determining context set usage. Reference is made, for instance, to FIGS. 8 and 13. Embodiment(s) of the present application relating to this aspect describe an encoder and a decoder for encoding/decoding a feature into/from data stream 14. They encode/decode transform coefficients 91 of a transform coefficient block 92 by entropy encoding/decoding quantization levels 106 of the transform coefficients 91 of the transform coefficient block 92 context-adaptively using, for each partition 120, a context set 110, which is associated with a respective partition. Specifically, however, the partitions 120 into which the transform coefficient block 92 is subdivided, 1) vary in shape such that they are, for instance, not conform to each other as depicted in FIG. 13, whereas they are conform to each other in FIG. 8, and/or 2) are shaped depending on a scanning pattern along which the entropy encoding/decoding the quantization levels of the transform coefficients 91 is performed and which may, for instance, be signaled in the data stream 14, for instance, are determined inherently for the current blocks 84/92, respectively, and/or 3) are shaped depending on a size of the block 84 and/or 4) are shaped depending on explicit partition-shaping information signaled in the data stream 14. In this embodiment, it may be possible to use, for instance, the local template 132 to decide for each coefficient 91 within a certain partition 120 which of the sets of context associated with the respective partition to actually use for entropy encoding the respective coefficient or its current bin. The partitions 120 of the current embodiment may additionally serve as partitions for which coded block flags are transmitted in the data stream as described above, i.e. indications whether all transform coefficients 91 within the respective partition are zero or not.

Further embodiment(s) of the present application relate to an even further aspect of the present application, namely one according to which partition for sake of zeroness indication is used, but the indication 150 indicates for a partition whether all transform coefficients within the respective partition are coded into the data stream or whether the coding of all transform coefficients within the respective partition is skipped and all transform coefficients within the respective partition are zero. In particular, in accordance with this aspect of the present application, the indication is interpreted in a way indicating whether all coefficients are coded or none. Each of these partitions may have a set of contexts associated therewith using which the transform coefficients within the respective partition are encoded if so indicated by the indication. In other words, here the partition wise indication of zeroness is indicative, if so set, that all transform coefficients within a certain partition are coded and this circumstance needs not to be questioned anymore. Not even the significant flag of the lastly coded coefficient of a partition for which the indication 150 signals coding of its coefficients may be inferred based on all previous coefficients being zero.

Further embodiment(s) of the present application relate to an even further aspect of the present application, namely one according to which a partition mode is signaled in the data stream for the transform coefficient block 92, which indicates whether a partitioning into partitions 120 for use in associating partition-individual context sets 110 is applied or not. To be more precise, the embodiment(s) describe an encoder and a decoder for encoding/decoding a picture into/from a data stream with encoding/decoding a partitioning mode of the transform coefficient block 92 into/from the data stream 14 and encoding/decoding the transform coefficient block 92 by, if the partition mode is a first mode which switches on, for instance, the partitioning into partitions 120, entropy encoding/decoding quantization levels 106 of the transform coefficients 91 of the transform coefficient block 92 context-adaptively using, for each partition 120 of partitions into which the transform coefficient block 92 is subdivided, a context set 110 which is associated with a respective partition, and, if the partition mode is a second mode indicating, for instance, that the partitioning into partitions 120 is switched off, entropy encoding/decoding the quantization levels 106 of the transform coefficients 91 context-adaptively using a global set of contexts. It should be noted, however, that the globality may be restricted with respect to the special context set used for the coefficient at position 104 and/or the coefficient positioned at position 98. Again, even here in this embodiment, the partitions 120 may additionally play the role of forming the units at which an indication of transform coefficient zeroness is sent in the data stream: that is, for each partition 120 a coded sub-block flag could be a signal in the data stream indicating whether all transform coefficients 91 within the respective partition are zero or not.

Figure 15:
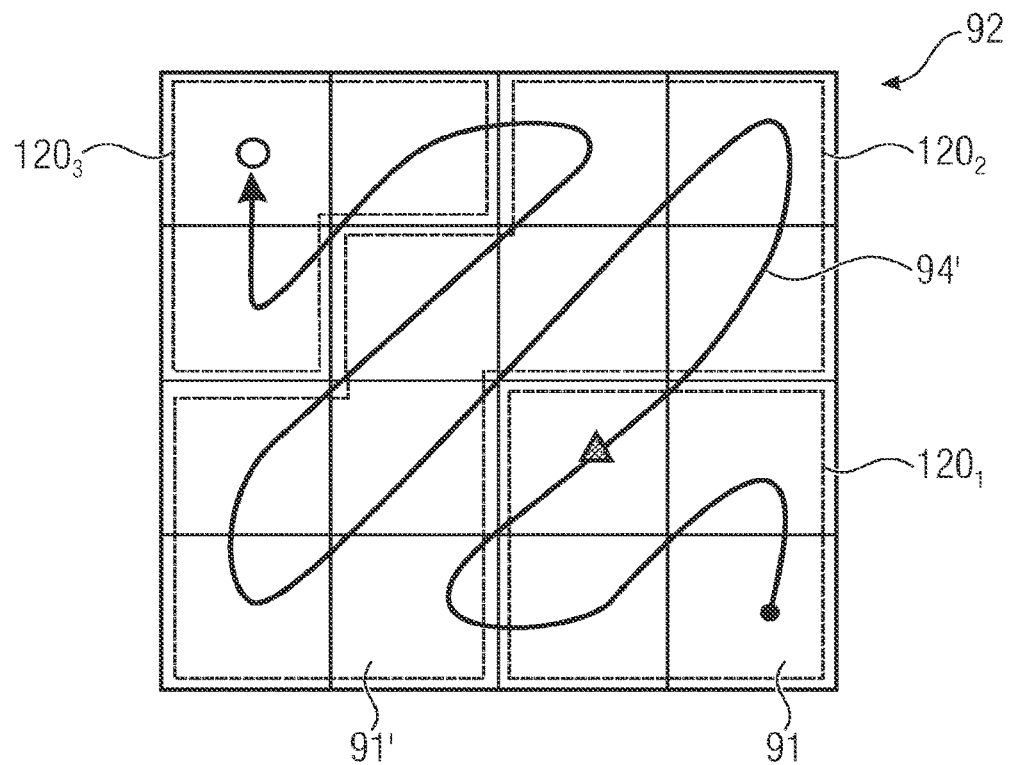
FIG. 15 shows a schematic diagram illustrating a transform coefficient block partitioned into partitions with the scan part for sequentially encoding the transform coefficients traversing the transform coefficients in a manner so that transform coefficients of the partitions are interleaved with each other.

Embodiment(s) dealing with a last aspect of the present application may be best understood by referring to FIG. 15. Again, this aspect is related to the usage of partitioning into partitions 120 for the sake of the association of partition-individual context sets 110 to the partitions 120. Encoder and decoder are configured to encode/decode a picture into/from a data stream and encode/decode a transform coefficient block 92 using a scan pattern 94, which sequentially traverses transform coefficients 91 of the transform coefficient block 92 by entropy encoding/decoding quantization levels 106 of the transform coefficients of the transform coefficient block 92 context-adaptively using, for each partition 120 of the partitions into which the transform coefficient block 92 is subdivided, a context set 110 which is associated 126 with the respective partition 120. However, differing from the previous descriptions with the scan pattern 94 was described to exemplarily scan the transform coefficients 91 in a manner partition-by-partition, the scan pattern 94 of FIG. 15 scans the transform coefficients 91 differently with FIG. 15 indicating the circumstance by using an apostrophe for the scan pattern, i.e. 94'. The scan pattern 94' sequentially traverses the transform coefficients 91 of the transform coefficient block 92 in a manner so that at least one transform coefficient of a first partition is traversed between two transform coefficients of a second partition. For instance, coefficient 91' of FIG. 15 is such a coefficient: it is scanned between two coefficients of partition $120_1$. It is, however, a member of partition $120_2$.

Figure 16:
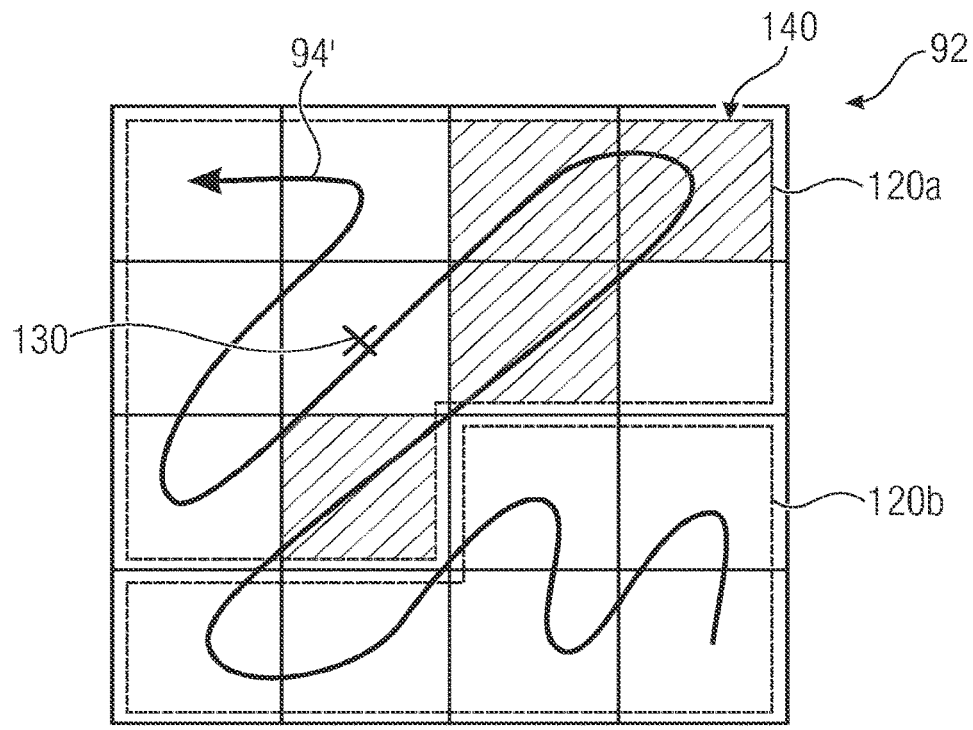
FIG. 16 shows a schematic diagram illustrating a transform coefficient block and its coding using an interleaving scan part as shown in FIG. 15 with exemplarily illustrating a currently entropy-encoded/decoded transform coefficient and previously encoded transform coefficients exceeding certain thresholds, with a count thereof being used, for example, for context selection for the currently entropy-encoded/decoded transform coefficient.

The partition-wise association of context sets to partitions 120 does not, however, mean that the context sets 110 associated to the partitions 120 are mutually different or mutually disjoint with respect to each pair of partitions 120. In other words, one set of context may commonly be associated to two partitions. For instance, the interleaving of transform coefficients 91 along the scan pattern 94 may be related to partitions 120 having a common context set 110 associated therewith. To understand this, reference is made to FIG. 16 which shows another example for a scan part 94', which traverses the transform coefficients 91 in a manner interleaving the transform coefficients of at least two partitions 120, here partitions 120a and 120b which are, in the example of FIG. 16, the only partitions 120a and 120b into which the transform coefficient block 92 is partitioned. Here, a common context set may be associated with partitions 120a and 120b. In both examples FIGS. 15 and 16, however, the partitions may additionally be used as units, in units of which the zeroness coding or zeroness indication is signaled in the data stream, i.e. coded-sound block flags. In the embodiment of FIGS. 15 and 16, context selection out of the context set 110 associated with the respective partition 120 a currently encoded/decoded transform coefficient 130 is located and may be performed using a local template 132 as discussed above. Additionally or alternatively, the context selection out of the associated context set 110 may be done based on a count of previously decoded/encoded transform coefficients within the current partition. The currently encoded/decoded transform coefficient is located in, such as depending on whether this count exceeds one or more certain thresholds. In the example of FIG. 16, for instance, if transform coefficient 130 was the currently encoded/decoded transform coefficient, the four hatched transform coefficients may represent previously encoded/decoded transform coefficients of block 92 exceeding the one or more certain thresholds.

Figure 17:
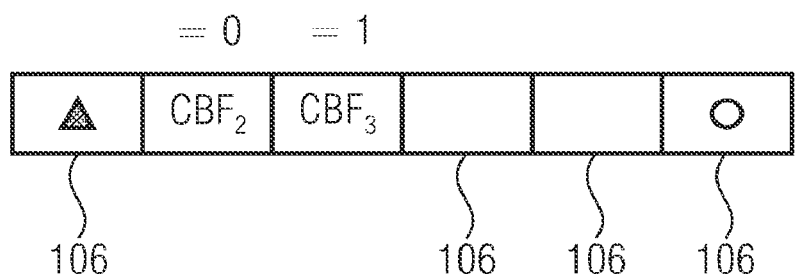
FIG. 17 shows a schematic diagram illustrating a coding sequence of the quantization level of coefficients on the one hand and zeroness indications of coded sub-block flags on the other hand, resulting from coding a transform coefficient block with an interleaving scan part exemplarily shown in FIG. 18.
Figure 18:
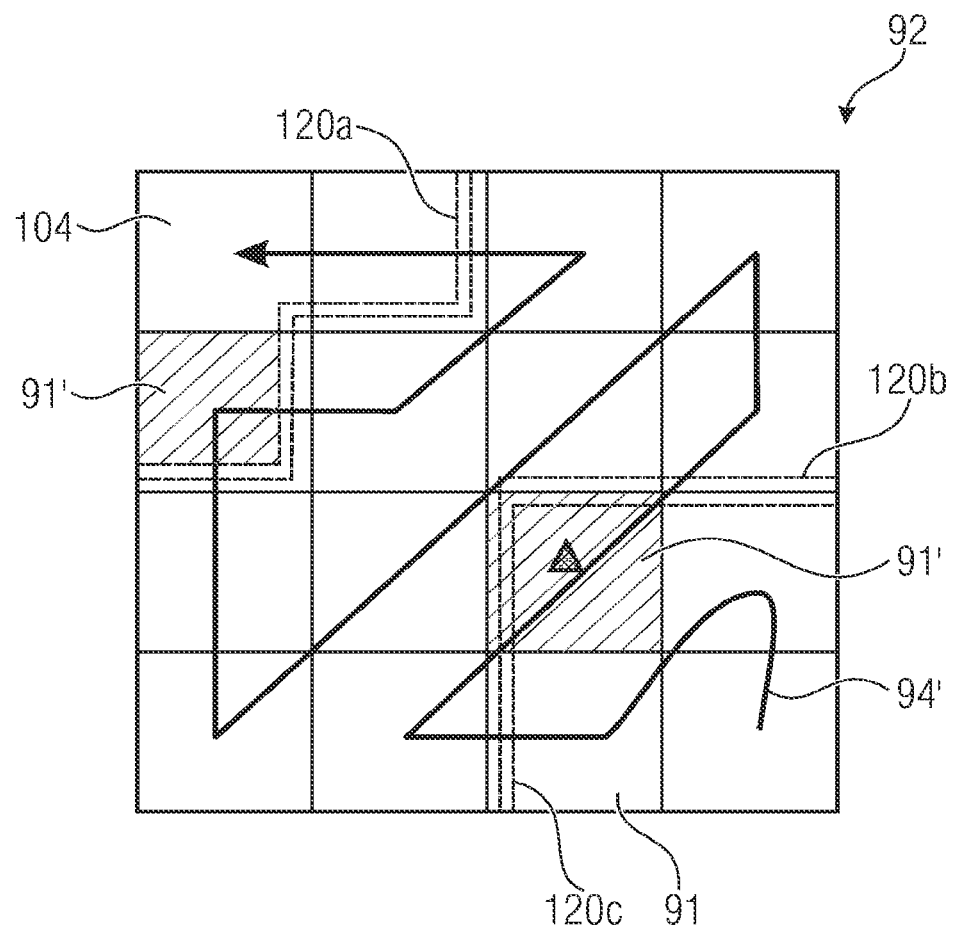
FIG. 18 also shows a transform coefficient block with a scan part which interleaves transform coefficients of different partitions as shown in FIGS. 15 and 16, with illustrating using hatching of the non-zero coefficients.

When making use of the zeroness indication or coded sub-block flags, same may be coded into the data stream or decoded therefrom, respectively, the first time the transform coefficient of a certain partition 120 is scanned. That is, the zeroness indication or coded sub-block flag for a certain partition 120 may be scanned as soon as a first transform coefficient 91 of that partition is scanned along the scan part 94'. FIG. 17 and FIG. 18 provide an example for this. FIG. 18 shows, again, an example for a transform coefficient block 92, this time partitioned into three partitions 120a, 120b and 120c. One transform coefficient 91 (interleaved) in scan part 94' between two transform coefficients of another partition, namely partition 120b, is shown with reference sign 91'. FIG. 17 assumes that this transform coefficient 91' is accidentally also the firstly coded transform coefficient, i.e. is positioned at position 98, for instance, when using the last position indication also discussed above with respect to FIG. 5. Its quantization level 106 is coded, followed by the coded sub-block flag $CBF_2$ for partition 102b which is zero because all transform coefficients 91 within that partition 120b are zero. FIG. 18 assumes that all non-zero transform coefficients 91 are indicated using hatching. The coefficient right below coefficient position 104 is also one of the coefficients 91' arranged in scan part order between two coefficients of another partition. It is, concurrently, the first one of partition $120_a$ scanned and accordingly, a zeroness indication $CBF_3$ as indicated for this partition $120_a$ following the $CBF_2$ for partition $120_b$. As, again, coefficient 91' right below coefficient position 104 is assumed to be non-zero, $CBF_3$ is signaled to be 1 and the coefficients 91 within partition $120_a$ are then coded.

It has often been mentioned above, but it is again noted here, that the above mentioned embodiments belong to different aspects of the present application may be combined such as embodiments related to cross-color-component context derivation with all other embodiments or combination of the latter, embodiments relating to binarization parameter setting with embodiments relating to context derivation, embodiments relating to context set attribution to certain coefficient so partitions with embodiments relating to context selection out of such a set using a local template and so forth.

Thus, above embodiments relate to transform coefficient block coding such as for entropy coding in image and video compression.

The above embodiment relate to the field of digital signal processing and, in particular, to a method and apparatus for image and video decoders and encoders. Notably, above embodiments yield a set of strategies applied to the entropy coding stage in image and video compression architectures that employ partitioning techniques. Improved context modeling strategies have been achieved by modifying the processing orders of the syntax elements. The set of techniques included, inter alias: analyzing the local activity for the current level, employing dedicated context models, modifying the syntax processing order, evaluating cross-component syntax elements, and exclusion or dedicated handling of coding states with extreme probabilities.

In particular, the above embodiments present a set of new techniques for entropy coding which is suitable, particularly, for syntax elements related to the residual compression stage in image and video compression architectures that employ partitioning techniques. Such a design usually divides pictures into regular shapes, such as rectangles or blocks. Without loss of generality, the term block stands for an arbitrary form that describes the applied partitioning technique in the description of this document. The starting point may be the maximum allowed size as explained above with respect to FIG. 3, and a partitioning algorithm may divide each block further into smaller units. Such partitioning may be carried out by using a quadtree structure, such as in the state-of-the-art High Efficiency Video Coding (HEVC) specification. Different strategies for the partitioning may also be possible, e.g., using a binary tree instead of a quadtree. Besides the partitioning, due to new coding tools prior the residual compression stage, the existing approaches have to be further evolved. In order to achieve an improved compression efficiency, the following aspects are addressed:

Definition of syntax elements to alternate the coding order (e.g. FIG. 15, 16, 18)

In conjunction with the above modifications, the binarization is adjusted (e.g. with respect to an adaptive variation of the cutoff value)

Context modeling for each bin that the binarization process produces (e.g. see concept of adapting shape or disablement of the local contaext template for certain characteristics)

Evaluation of the local activity in spatial (e.g. see the embodiments making use of the local template or setting the cutoff value depending on certain characteristics concerning, for instance, energy or the like), frequency (e.g. see the concept of adapting shape or disablement of the local contaext template for certain characteristics and setting the cutoff value depending on certain characteristics concerning, for instance, energy or the like), and cross-component (e.g. claim see FIG. 11a) domain Exclusion of coding modes having extreme probabilities Dedicated handling for coding modes having extreme probabilities Separate handling of dedicated coding states The entropy coding stage employed in HEVC is Context-based Adaptive Binary Arithmetic Coding (CABAC), and it consists of three inner processing stages. The first stage is the binarization stage, the second stage is the context modeling stage, and the final processing unit is the binary arithmetic coding engine. All input symbols pass the binarization stage. Its output is either the same symbol if the input is already binary or a codeword representing the input symbol, referred to as bin string. The context modeling stage selects a context model and passes its choices to the entropy coding engine. Note that binary arithmetic coding engines, such as the M-Coder as implemented in CABAC, usually supports a bypass mode for symbols having a uniform probability. The remainder of this document refers the coding with context models to as regular mode, and the coding without context model as the bypass mode.

For the residual compression stage, i.e., the transmission of the transform coefficient levels, the input is mainly a block consisting of integer-valued coefficients. These values are usually prediction residuals transformed into the frequency domain, and the levels often represent only a partial amount of the original information due to the quantization process. Since the processing is serial nature in the entropy coding stage, a decomposition of the two-dimensional shape into a one-dimensional vector is needed. A scanning pattern specifies the mapping of a two-dimensional block to a one-dimensional vector. Such a scanning pattern may be applied multiple times so that each time only a partial amount of the transform coefficient levels is transmitted in the bitstream, such as in HEVC. This document describes the residual compression stage from different point-of-views in the following paragraphs.

The residual compression in HEVC works as follows. A coded block flag (CBF) syntax element is coded first signaling the insignificance of the current transform block, i.e., whether all transform coefficient levels are equal to zero or not. When a significant level exists, the last significant scanning position is specified. It depends on the selected scanning pattern, and all levels from the signaled last position to the first position defined by the scanning pattern are coded. Implicitly, the scanning order is equal to the usage of the scanning pattern in reverse order. The splitting of the whole process into subtasks enables improvements in terms of implementation complexity and compression efficiency. Transform blocks larger than 4×4 are processed in subunits of 4×4, referred to as subblocks. The processing order of the subblocks are identical to the handling of the scanning positions, i.e., assume that each subblock represents a regular frequency position and the transform block has the size of N/4×M/4 instead of N×M, as illustrated exemplarily in FIG. 19 for an 8×8 block using the vertical scanning pattern.

In the first step for a significant transform block, the absolute coordinate of the last position is coded, i.e., the x-coordinate and y-coordinate with the top-left corner defined as the coordinate origin. One out of three pre-defined scanning pattern is selected: diagonal, horizontal or vertical. When the prediction mode is intra, the transform block is smaller or equal to 8×8, and the predictor's direction is within a pre-defined range, either the horizontal or the vertical scanning pattern is used. Next, starting with the subblock containing the last significant level, remaining information about the level is coded until the level is reconstructed. The described process is repeated for the remaining subblocks until the last sub-block in processing order, where the latter is the subblock covering the DC frequency position. There exist additional techniques embedded into the processing, such as the coding of CBFs for the subblocks. It is skipped for the last subblock since the signaling of the last scanning position already infers the significance for that subblock. The inference for the subblock covering the DC frequency position is also a special case. Additionally, the sign bit hiding (SBH) technique may be applied for each subblock. An overview is given in FIG. 20.

From the binarization stage point-of-view, each integer-valued x represents a point on an interval, and each point of the interval is assigned with a codeword. The Unary code is the commonly used scheme where $|x|=n$ is represented by n times the binary value $b_0$ followed by a terminating binary value $b_1$. When the set of integer-valued symbols is limited, the terminating binary value can be left out for the maximum input symbol, leading to the so-called truncated Unary code. In HEVC, the binarization process for the levels is a composition of three different schemes. The first three absolute level values fall into the truncated Unary part. When the current absolute level is greater than the limit, the remaining of the value is binarized using Rice codes. The actual Rice code is selected by specifying the order k. However, the interval covered by the Rice codes is limited too and the remaining value of the integer-value use Exponential-Golomb codes for binarization. In HEVC, the order of the Exponential-Golomb code is equal to k+1. The transition between the codes are referred to as binarization bounds and both bounds, i.e., the transition from truncated Unary to Rice and the transition from Rice to Exponential-Golomb, are adaptive depending on the number of coded syntax elements for the first bound and the Rice parameter k for the second bound. The first bound switches within each subblock and is equal to three at the beginning of the processing for each subblock. Whenever an absolute level greater than two is coded, the bound is lowered to two. And whenever eight absolute levels greater than one is coded, the bound is lowered to one. The consequence is that for all frequency positions covered by the subblock, the significance is coded in the regular mode, but only up to eight positions the information whether the level is greater than one and once the information whether the level is greater than two. The selection of the Rice parameter k is as follows. The parameter is equal to zero at the beginning of each subblock. After a full level is reconstructed, the absolute value is compared against a threshold, and if the absolute level is greater than the threshold, k is incremented by one. However, k is limited to four and does not exceed that value, given the Main profile of HEVC. The binarization of levels is summarized in FIG. 21 and FIG. 22.

The coding for each subblock is split into several scanning passes so that syntax elements are ordered in groups. In the first processing pass, the significance information is transmitted. Next, all greater than one syntax element, then all greater than two syntax elements, the remaining absolute level, and finally the signs are transmitted. The binarization for the integer-valued last significant position works as follows. Depending on the block size, the maximum value is limited to N−1 for a block size equal to N. Depending on the size N, the output of the binarization is a combination of truncated Unary and fixed-length binary codes.

The context modeling works in detail as follows. Generally, binary symbols (bins) that result from a fixed-length binarization, Golomb-Rice, or Exponential-Golomb codes are coded in the bypass mode while bins related of the Unary code or truncated Unary code are coded using the regular mode. Also, input symbols that are already binary are usually coded in the regular mode of the arithmetic binary coder. For the CBF in the luma component, a dedicated context model is employed for the residual quadtree (RQT) depth equal zero and another dedicated context model for the remaining depths. Since the CBF signaling in chroma is along each depth instead of the leaf level as in luma, a dedicated context model is used for each depth of the RQT. The last position, specified as x-coordinate and y-coordinate, employs the same context model for a specific number of consecutive bins depending on the block size. More specific, instead of using a single context model for each bin, a uniform context quantizer is employed reducing the number of used context models. The coding of the levels employs four syntax element types using different context model sets. The CBF for the subblocks employs three different context models depending on the significance of the neighboring right and bottom subblocks: both neighbors are significant, both neighbors are insignificant, and one out of the two is significant. The significance flag employs four different patterns where a context model is fixed assigned to a scanning position within the subblock, and the patterns depend on the neighboring right and bottom subblocks. The remaining level information using regular modes is greater than one and two, i.e., the two bins of the truncated Unary code when the first binarization bound is equal to three. Since the greater than two is coded once, a single context model is employed. For the greater than one information, the next context model in the set is used until the first nonterminating binary value $b_0$ occurs. If the case occurs, a dedicated context model is used until the end of the subblock. Additionally, a context set is selected depending on the existence of levels greater than one in the previous sub-block.

The context modeling plays an important aspect in the entropy coding stage. Higher compression efficiency results can be achieved by employing more advanced techniques for context modeling. The embodiments presented herein improve the compression efficiency for level coding by modifying the coding order so that existing information is earlier available for context modeling stage. A possible coding structure is illustrated in FIG. 23.

According to an embodiment, the processing order is modified so that each level is transmitted completely before stepping to the next scanning position. By doing so, conditions are enabled for the context modeling stage allowing a higher compression efficiency. Particularly, instead of processing a subblock in multiple passes, the absolute level for each scanning position is fully transmitted so that only one processing pass is needed. Although the multiple scanning passes approach has benefits for some hardware architectures, it also has disadvantages for another architecture types, e.g., in terms of memory access. An overview is as depicted in FIG. 24.

The modified processing order transmits the absolute level completely so that when evaluating neighboring frequency positions, the full absolute levels are available instead of a partial amount only. Note that the modification is not necessarily fixed as described. Often, the residual energy is flat so that the absolute levels are small. A trade-off operation mode only enables the template evaluation when a specific amount of absolute levels larger than a specified threshold have been detected. (e.g. see the embodiment described with respect to FIG. 14) Additionally, for throughput reasons, the number of flags indicating that the absolute level is greater than one and greater than two, may be restricted in order to reduce the number of bins in regular mode. (e.g. see the embodiments described with respect to FIG. 6 and aiming at adapting or setting the cutoff value4) When employing the absolute level coding, the concept of subblocks does not necessarily have to rely on 4×4 shapes anymore (e.g. the embodiments related to the shaping of the partitions such as with respect to FIG. 13), but instead, it may be a group of successive scanning positions. That is, not interleaving of coefficients belonging to different portions may take place. Note that the main reason for subblocks may be context modeling. The concept of 4×4 subblocks can be easily extended to a group of scanning positions. For example, a fixed number of scanning positions equal to 16 may be used resulting in a similar configuration to the existing 4×4 subblocks. FIG. 25 illustrates an example of converting a regular partition into 4 partitions of size 16 (in coefficients) (left) into 4 partitions of the same size but following the zigzag scan (right).

The grouping into successive scanning positions often consists of scanning positions only, depending on the selected size. In order to improve the compression efficiency, the size may be configured to be variable, (see the embodiment relating to the partitions' shape) but fixed for a given transform block size. Another example is as follows. The DC frequency position may form a dedicated shape, and the number of scanning positions forming is equal to the diagonal. Note that the size should be configured in a way depending on the block size. Forming a specific number of successive scanning patterns to a group left out the neighborhood relationship among the frequency positions. It is, therefore, reasonable to group scanning positions that are spatially close to each other together. In order to combine with the existing scanning patterns, it is not necessary to process the scanning positions of one group successively. (see FIGS. 15, 16 and 18) Instead, the CBF of a group is coded when the first scanning position of the group is processed. See FIGS. 17 and 18. Furthermore, the grouping can be specified beforehand, e.g., using forward-driven, (compare above-mentioned explicit partition shaping information) or backward-driven approaches, (compare above-mentioned partition shaping depending on scan pattern or block size) or a combination of both. In this configuration, depending on the last significant position, a further flag is coded signaling whether grouping is used or not, resulting in the presence or absence of CBFs for the groups. (See embodiment using partition mode signaling) The adaptation of the number of scanning positions allows the reduction of the cost of a level at a high-frequency position as follows. Generally, levels at higher frequency positions have low energy, and the distance among the significant levels also trend to be larger than at a lower frequency position. Therefore, the rate-distortion optimization quantization approaches further quantize such levels to insignificance. When forming the number of scanning positions adaptively, the cost for the distance between two such levels can be further reduced. The concept can be applied at the other end too. In a higher operation points with high residual energy, the cost for a group of scanning positions having only significant levels can be further reduced. Also, the definition of the CBF for the group is changed, meaning that when a CBF is equal to one, the group is coded instead of the existence of at least one significant coefficient within the group. Changing the semantic reduces the logic.

From empirical data point-of-view for 4:2:0 chroma subsampled signals, the luma residual signal usually consists of higher energy than the spatially adjacent (e.g. spatially corresponding) chroma residual signals. This fact can be incorporated in the coding of the levels when the processing is reordered so that the levels are coded immediately after the signaling of the CBF. More information can then be evaluated for the context modeling stage. The context modeling for the luma CBF and residual can be conditioned to the outcomes of the chroma CBFs or the chroma residuals. (compare description of FIG. 12) Moreover, the coding of the last significant position can be decoupled from the level coding, i.e., in the case when all three transform blocks are significant. All three last significant positions are coded successively. Similar to the coding of CBF, the coding of the last significant position can be conditioned to the outcome of the last significant positions of the adjacent (e.g. Collocated) transform blocks. (compare description of FIG. 12) A further technique is the joint coding of the last significant position, i.e., for the two chroma transform blocks, only a single last scanning position is coded instead of two the last significant positions, i.e. the position indication 114 would be coded merely once jointly for luma and chroma, for instance.

The first binarization bound, i.e. cutoff value 164, is adaptive and features a trade-off between complexity and compression efficiency. Less compression efficiency is achieved when selecting the fixed bound too low, and high complexity is the result when selecting the fixed bound too high. Note that a high bound does not lead to a proportional increase in improved compression efficiency, rather, the improvement is very limited. However, the operation points changed due to different partitioning strategies and additional or novel coding techniques prior the residual compression stage. For example, by setting the first binarization bound equal to five results in improved compression efficiency when additional transform modes are enabled, such as adaptive transforms that are either forward-adaptively or backward-adaptively controlled. The first binarization bound can be used to control different coding modes. For example, the first binarization bound may be set equal to zero when a high energy of the levels is detected so that no bins are coded in the regular mode. (compare the above embodiments regarding the variation and setting of the cutoff value) The detection of high signal energy can be realized by analyzing the values of the already transmitted syntax elements (or binary decisions) for a transform block or a subblock of a transform block. As an example, the detection of high signal energy can be realized by comparing the sum of absolute values (in the transform block or a subblock of the transform block) with a certain threshold. Alternatively, the detection can be realized by comparing the number of already coded bins in a first scan pass over the scanning positions (of a transform block or a subblock of the transform block) with a certain threshold. (compare the above embodiments regarding the variation and setting of the cutoff value in combination with the multipass concept)

A configuration for the common operation points is as follows. The initial bound, i.e cutoff value, depends on the used prediction and transform modes, and the quantization parameter and is higher than three, e.g., it is equal to five. (See the above embodiments regarding the setting of the cutoff value) For a combination of modes that is equal to the configuration in HEVC, the initial first bound is set equal to three. In this mode, the bound is reduced depending on the occurrence of the level values. (See the above embodiments regarding the variation of the cutoff value) But when the initial first bound is equal to five, it is kept fixed for the group or even for the whole transform block.

A local template for context derivation has been used as part of existing techniques, however, with limited information, i.e., only a partial amount of the absolute level was evaluated. By applying the changes to the coding structure, existing information is available earlier in the decoding process, and thus, can be used in the context modeling stage. Since the absolute levels are available due to the aforementioned techniques applied to the coding structure, the frequency positions covered by the local template consist of more information. some of the presented embodiments exploit this fact as follows. Since the coding has been ordered so that each level is coded completely, the local template evaluates the already coded neighboring spatial positions. The absolute sum of the neighboring levels and the number of significant levels are employed to derive the context models for bins that are part of the first binarization code which might be a unary binarization or truncated unary binarization. The binarization parameter 163 such as a Rice parameter may be derived from the evaluation too. An example configuration is as follows.

The shape of the template can be fixed or adaptive. Shape adapting embodiments have been described above. For example, when the template size is equal to five, and the evaluation of the first two neighboring position already leads to a very high absolute sum, the evaluation of the remaining neighboring positions can be skipped, resulting in an adaptive shape for the local template. (cp. FIG. 14) The shape can be configured depending on the block size, the color component, and the last significant position and selected transform. In a special case, the size of the template can be set equal to zero, so that none of the already coded quantization levels inside the local neighborhood is used for context derivation. The local template is then disabled. When the residual energy is spread among the frequency positions and flat, i.e., when the absolute levels are low, a template covering more neighboring frequency positions is more efficient. Such situations are often in larger transform blocks in conjunction with a last significant position at a high-frequency position.

In case the bins of the binarization of the quantization indexes are coded in multiple scan passes over the scan positions of a transform block or a subblock of a transform block, only the bins transmitted in the current and previous scan passes can be used for deriving a context model. In that case, the partially reconstructed absolute levels (which are derived using the bins transmitted in the current and previous scan passes) are used. In particular, for context-coded bins that are transmitted in a first pass (over the scan positions of a transform block or subblock), the template is evaluated using partially reconstructed transform coefficient levels that are given by the bins coded in the first scan pass.

Different context model sets can be employed depending on information such as the current diagonal, the block size, the applied transform, the selected predictor or prediction mode, and the position within the truncated Unary code word. In order to avoid context dilution, context sets can be merged. E.g.: neighboring diagonals may be associated to one partition as depicted in the FIG. 25, right hand side) As an example, a certain context set may be used for multiple diagonal positions (i.e., the block of transform coefficients is partitioned into multiple regions depending on the diagonal (x+y) position, and a separate context set is used for each of these partitions). Similarly, the different context sets can be obtained by merging multiple values of other parameters, or combinations of different parameters. A dedicated context model set for the DC position is also beneficial in certain circumstances. (see, for instance, the embodiment providing a sample specific context set for positions 104 and/or 98) That means, for the DC coefficient (which is located at position x=0 and y=0 in the block of transform coefficient, i.e. position 104), a different set of context models than for all other coefficient positions can be used. Such a context set distinction can be applied to all bins that are part of the truncated Unary code. That means, any of the above mentioned methods for specifying context sets may be applied to individual bins of the binarization of transform coefficient levels or, alternatively, to a subset of the bins of the binarization of transform coefficient levels, or, as another alternative to all context-coded bins of the binarization of transform coefficient levels.

The context model selection depends on the outcome of the template evaluation. For example, the absolute sum of the levels and the number of significant positions within the template are derived. Depending on the two numbers, the context models for all bins part of the first binarization code 160 such as a truncated Unary code and the Rice parameter k can be derived. For example, the absolute sum minus the number of significant position results directly to the context model index within the context model set. Since the context model sets are limited, the value may be clipped to the number of context models within the context model set. For the Rice parameter, a mapping table can be derived so that a direct mapping between the absolute sum and the Rice parameter can be established. However, in order to limit the table size, the absolute sum should also be limited.

The context model selection may also be derived by the selected transform. In particular, if a secondary transforms is used, which is only applied to a subset of primary coefficients, a dedicated set of context models can be used for both sub-sets.

There exist coding states that are known and can be exploited in order to improve the compression efficiency. One case is given with level coding for the last significant scanning position. For this position, a dedicated context model is employed for the coding of the bins that are part of the first binarization code which might be a truncated Unary binarization. This can be combined with the current position in the block, e.g., by evaluating the diagonal, so that different context sets can be used. It can further be combined with the method described above, in which another different set of context models is used for bins of the DC transform coefficient level (i.e., the transform coefficient level at location x=0 and y=0 inside the transform block). For the case that the last significant scanning position is equal to the DC position, there are multiple possibilities: The context set for the last position is used (i.e., the last position has higher priority), the context set for the DC position is used (i.e., the last position has higher priority), or a separate context set is used for DC positions that are also last scanning positions. As mentioned above, the different context sets can apply to individual bins of the binarization of transform coefficient levels or, alternatively, to a subset of the bins of the binarization of transform coefficient levels, or, as another alternative to all context-coded bins of the binarization of transform coefficient levels.

Another case is when all coefficients within the local template are significant, and their absolute level is all above a specific threshold. In such a case, the context modeling switches to a mode where the local template evaluation is disabled until the end of the transform block. Again, the usage of different context model sets is possible, e.g., depending on the current diagonal. In contrast, coding modes that occur with a low frequency but needing signaling can be excluded. Such a coding mode is, for example, the coding of CBFs for the groups when the previous group consists of a high number of absolute levels. In the example, the configuration is that the scanning positions covered by a group are processed successively. Another example is the first binarization bound 160. Instead of starting with a fixed bound value at the beginning of each group, the absolute levels of the previous group are analyzed, and the bound varies between one and five. In order to alleviate the throughput aspect, the bound can be set the zero when the previous group consists of very high residual energy. Then the first binarization code 160 would vanish. The usage of the local template is efficient when the statistics are not extreme, i.e., the conditional probabilities are not close to the minimum entropy. In the latter case, the template evaluation can be disabled leading to less complexity while the compression efficiency is maintained. This is especially useful for higher operation points when the amount of levels plays a significant aspect for the processing performance. Another case is given at the beginning of a transform block when a main amount of levels is insignificant. In this case, the template evaluation can be disabled since the uncertainty is high and the amount of additional information that can be used for context modeling is low.

There exist different planes, also referred to as color components, each carrying different color information, e.g., the luminance and chrominance information. All planes cover the same area of the picture and consequently a transform block in a color plane has counterparts in all other color planes. These transform blocks are coded successively, each using the same syntax. Consequently, the same syntax elements are present for each transform block. So, information from a transform block in a color component are available for the following transform blocks. This is exploited for deriving context models/sets for syntax elements in the currently processed block by evaluating their counterparts in other color components. (compare FIG. 12) One case is given with coding the coded block flag (CBF) of the second chroma component. Depending on the value of the preceding CBF of the first chroma component, one of two different contexts is selected. Another example is the first bin of the truncated Unary code for absolute coefficient level coding. Again, the value of the first bin of the truncated Unary code at the same position in the preceding color plane is evaluated in order to select different context sets.

In an embodiment relating to coding structure, the coding is organized so that each transform coefficient level is transmitted completely for each scanning position of the transform block. In another embodiment, the levels are coded in two passes so that all regular coded bins 165 of part 160 are coded followed by the bypass bins 165 of part 162. In another embodiment of the invention, the number of passes is kept, but the processing is for the whole transform block instead of processing subblock by subblock.

In an embodiment, the grouping shape is fixed with a fixed shape size that is smaller than the existing 4×4. In another embodiment, the grouping shape is fixed with varying shape size. The form depends on the transform block size, and/or the color component, and/or the prediction mode, and/or the selected transforms, and/or the last significant position. In a further embodiment, the shape size is adaptively derived using forward-adaptive determination. In this embodiment, the shape size starts with the regular 4×4 form, and the size can become 8×8 as an example.

In an embodiment, the scanning pattern is decoupled from the grouping as exemplarily shown in FIG. 13 so that the CBF for the groups are coded when the first frequency position of the group is coded. In this configuration, the scanning pattern can be for example horizontal so that each row of the transform block is processed completely, whereas the shape is still 4×4 or vertical.

In an embodiment, the coding structure is arranged so that the levels are coded immediately after the coding of the CBF flag for the corresponding transform block. The reordering enables the possibility to evaluate already coded spatially adjacent transform blocks for context modeling. In a further embodiment, the coding of the chroma blocks is interleaved. In this configuration, the last position is coded once and the coding switches between the two chroma transform blocks. In a further embodiment, the last position is coded regular, and the switching between the two chroma blocks is activated when the scanning positions are aligned. In another embodiment, the two chroma blocks are interleaved so that a transform block having the same size as in chroma for 4:2:0 content is generated. Then, the joined chroma block is coded regularly.

In an embodiment, the last significant position is coded jointly for the chroma transform blocks. In this configuration, the last position and not last significant position, rather it is a last position where the coding begins, so the significance information has to be coded for that particular position. In a further embodiment, the last position is coded once for the two chroma blocks but is specified for one of the chroma block only. For the other chroma block, the significance has to be coded at the last significant position of the other chroma block.

In an embodiment, the CBF means that the transform block should be coded. The consequence is that the transform block can be insignificant. In this particular configuration, the last significant position is equal to the last position only. This configuration can be coupled to specific conditions, such as block size, prediction mode, transform mode etc. For example, when 1-dimensional partitions are employed, the resulting stripes are only 1×4 for a 4×4 block. In such a situation, when the first 1×4 stripe is significant, the CBF can be inferred to be equal to one.

In an embodiment, the CBF means that the frequency positions of the group should be coded. In this configuration, all scanning positions are coded and the last scanning position within the group is not inferred.

In an embodiment concerning binarization, the first binarization bound 164 is variable for each transform block depending on the block size, or the color component, or the prediction mode, or the selected transforms. In this configuration, the first bound may be five when another transform mode that involves a signaling in the bitstream. But for the regular transform, the first bound may be kept as three.

In an embodiment, the first bound 164 never decreases when the bound is larger than three. In this embodiment, the assumption is that the levels are not stationary, therefore, it is meaningful to code more bins in the regular mode than usual. In another embodiment, the decrease of the first bound depends on the number of coded symbols within a block (which may represent a transform block or a subblock of a transform block). In a further embodiment, the first bound is adaptive depending on the template evaluation. For example, when the number of significant position is zero the first bound is five. But when a given amount of significant levels are within the template, for example three, then the bound is set to be equal to two, and when five significant levels are within the template, the bound is set to be equal to one.

In an embodiment, the Rice parameter is derived using the template. In this configuration, the absolute sum of the levels is taken and are mapped to a Rice parameter. The table size may have a limit equal to eight, 16, or 32. The values within the lookup table can be derived empirically. In another embodiment of the invention, the Rice parameter is never decreased for a group even with the usage of the template. In a further embodiment of the invention, the Rice parameter depends on the optimal Rice parameter for the levels covered by the template. Note that in this configuration, the first binarization bound of the already coded levels can be considered in the calculation.

In an embodiment, the interval that is covered by the Rice codes depends on the Rice parameter and becomes larger with a higher Rice parameter. In a further embodiment, the interval that is covered by the Rice codes depends on the block size, and/or prediction mode, and/or transform size, and/or quantization parameter. Note that for the embodiments in this paragraph, the second binarization bound can be inferred from the interval covered by the Rice codes.

In an embodiment, the order of the Exp-Golomb is fixed and is equal to zero. In a further embodiment, the Exp-Golomb order is the Rice parameter plus one initially. In another embodiment, the Exp-Golomb order is the Rice parameter initially. In both embodiments, the Exp-Golomb code only covers a limited interval, and when the value is larger than the end of the interval, the Exp-Golomb is applied again for the remaining value but with a different order. In an embodiment, the Exp-Golomb order decreases until it is zero with a step size equal to one. In a further embodiment, the Exp-Golomb order is equal to zero immediately.

As to context modeling, in an embodiment, the template shape is fixed and covers all adjacent spatial neighbors. In a further embodiment, the template shape is fixed and covers also spatially adjacent neighbors in another color channel. This configuration is designed for the coding of chroma transform blocks.

In an embodiment, the template shape is adaptive and is derived at the beginning of the transform block. Particularly, the shape is larger or smaller depending on the transform block size, and/or the prediction mode, and/or the transforms, and/or the quantization parameter. In a further embodiment of the invention, the template shape is adjusted within a transform block. In this configuration, the shape becomes larger and smaller. For example, when the shape size is equal to five and three or four neighboring positions are significant, but the absolute level sum is below a certain threshold, the template is increased to incorporate more neighboring positions. On the other side, when all frequency positions are significant and the absolute level sum is above a certain threshold, the shape becomes smaller, e.g., is set to be equal to three.

In an embodiment, the context model sets for the first bin of the truncated Unary part depends on the diagonal. In this configuration, luma transform blocks may employ three different context sets whereas chroma transform blocks only employ two different context sets. The diagonal defines the switching point and can be different between luma and chroma. In a further embodiment of the invention, different context sets are employed when a transform is selected that has to be signaled in the bitstream.

In an embodiment, the bins starting from the second position, i.e., all bins that are of the truncated Unary code except the first bin, employ the same context set. In a further embodiment of the invention, the bins use the same set of context model set, but the context sets can be different depending on the diagonal. In another embodiment, the bins use the same set of context model set, but the context sets can be different depending on the selected transforms. In another embodiment, the first diagonal employs a dedicated context model set. In a further embodiment, the bins starting from the fourth position, i.e., all bins that are of the truncated Unary code except the first, second and third bin, employ another context set, depending on the selected transforms.

In an embodiment, the context model for the first bin is derived using the absolute sum of the template, limited to a specific threshold having the same size of the used context set. In a further embodiment, the evaluation subtracts the absolute level sum by the number of significant positions prior clipping. In another embodiment, the evaluation subtracts the absolute level sum by the number of significant positions after clipping. In a further embodiment, the variance of the absolute levels is calculated a normalized to the number of context models within the context model set.

In an embodiment, the context model for the second bin up to the end of the truncated Unary code, the context model is selected by subtracting the absolute level sum by the number of significant positions. In a further embodiment of the invention, the existing approach is employed, but modified to incorporate with the template. In this configuration, the switch to the dedicated context model can occur earlier, e.g., when the absolute level sum is above a certain threshold.

In an embodiment, the selected transform is decoded first. If this transform consists of a primary and a secondary transform stage and only a sub-set of the primary transforms is further transformed by the secondary stage, two different templates are used for both sets of coefficient positions.

In an embodiment, a dedicated context model is used for the last significant position for the bins of truncated Unary code. In this configuration, the context models are exclusively used for the last significant position. Details were discussed with respect to FIG. 5. In another embodiment, the context modeling for the bins of truncated Unary code for the last significant position depends on already coded last significant position of spatially adjacent transform blocks, including transform blocks at the same position in another color plane. Particularly, the selected context model set for the current bin of the truncated Unary code, depends on the last significant position in another color plane. Whenever the current position, indicated by the current bin, is greater, another context set is selected.

In an embodiment, the context modeling for the luma CBF depends on the already coded chroma CBFs. In a further embodiment, the context modeling for the second chroma CBF depends on the first, already coded, CBF. In another embodiment of the invention, the context model for the first chroma CBF depends on the already coded luma CBF. In a further embodiment of the invention, when coding structure is changed, the context modeling for CBF uses the energy information from spatially adjacent transform block, also including transform blocks at the same position in another color plane. Particularly, the absolute sum is evaluated and is compared against a list of thresholds. Whenever the value is larger than a threshold, the context index is incremented by one. In a further embodiment, the context modeling for CBF uses the same energy information, but the set of thresholds depends on the prediction mode of the current and/or adjacent blocks, e.g. if the prediction mode is one of the LMChroma modes. In another embodiment, the context modeling for CBF uses the same energy information, but the context sets can be different depending on the prediction mode the current and/or adjacent blocks, e.g. if the prediction mode is one of the LMChroma modes.

In an embodiment, the context modeling for the first bin of the truncated Unary code depends on already coded bins in spatially adjacent transform blocks, also including transform blocks at the same position in another color plane. Particularly, the context model set is selected, depending on the value of the first bin of the truncated Unary code at the same position in another color plane.

In an embodiment, the context modeling for the bins of the truncated Unary code depends on already coded bins in spatially adjacent transform blocks, also including transform blocks at the same position in another color plane. Particularly, the context model set is selected, depending on the value of the corresponding bin position of the truncated Unary code at the same position in another color plane. In a further embodiment, the context modeling for the bins of the truncated Unary code uses the energy information from spatially adjacent transform blocks, also including transform blocks at the same position in another color plane. Particularly, the absolute sum in a distinct area of the transform block is evaluated and is compared against a list of thresholds. Whenever the value is larger than a threshold, another context set is selected.

In an embodiment, the template is enabled/disabled when a sufficient number of absolute levels has been coded. In a further embodiment, the template is enabled/disabled when a sufficient number of significant positions has been coded.

Embodiments set above, are summarized in other words again below.

According to an embodiment, an encoder for encoding a picture into a data stream may be configured to subject a block of the picture separately for a first color component and a second color component to a transformation to obtain a first transform coefficient block and a second transform coefficient block, respectively, and entropy encode the second transform coefficient block context-adaptively using contexts which depend on the first transform coefficient block.

According to one implementation, the encoder may be configured to encode for each partition of a set of partitions into which the second transform coefficient block is subdivided an indication 150 whether the transform coefficients within the respective partition are encoded into the data stream, or whether the encoding of the transform coefficients within the respective partition is skipped and all transform coefficients within the respective partition are zero, and entropy encode the quantization levels of the transform coefficients of the second transform coefficient block for partitions for which the indication indicates that the transform coefficients within the respective partition are encoded into the data stream and skip the encoding of the transform coefficients within the partitions for which the indication indicates that the encoding of the transform coefficients within the respective partition is skipped and all transform coefficients within the partitions are zero, wherein the encoding of the indication is performed using context-adaptive entropy coding using contexts which depend on the first transform coefficient block.

According to a further implementation, the encoder may be configured to encode for each further partition of a set of further partitions into which the first transform coefficient block is subdivided an further indication whether the transform coefficients within the respective further partition are encoded into the data stream, or whether the encoding of the transform coefficients within the respective further partition is skipped and all transform coefficients within the respective further partition are zero, and entropy encode the quantization levels of the transform coefficients of the first transform coefficient block for partitions for which the further indication indicates that the transform coefficients within the respective further partition are encoded into the data stream and skip the encoding of the transform coefficients within the further partitions for which the further indication indicates that the encoding of the transform coefficients within the respective further partition is skipped and all transform coefficients within the further partitions are zero, wherein the encoding of the indication is performed using context-adaptive entropy coding using contexts which depend on the further indication of the further partitions and/or the quantization levels of the transform coefficients of the first transform coefficient block.

According to a further implementation, the encoder may be configured to encode an indication 190 whether the transform coefficients within the second transform coefficient block are encoded into the data stream, or whether the encoding of the transform coefficients within the respective partition is skipped and all transform coefficients within the second transform coefficient block are zero, and entropy encode the quantization levels of the transform coefficients of the second transform coefficient block if the indication indicates that the transform coefficients of the second transform coefficient block are encoded into the data stream and skip the encoding of the transform coefficients of the second transform coefficient block if the indication indicates that the encoding of the transform coefficients of the second transform coefficient block is skipped and all transform coefficients within the partitions are zero, wherein the encoding of the indication 190 is performed using context-adaptive entropy coding using contexts which depend on the first transform coefficient block.

According to a further implementation, the encoder may be configured to encode a further indication 190 whether the transform coefficients of the first transform coefficient block are encoded into the data stream, or whether the encoding of the transform coefficients of the first transform coefficient block is skipped and all transform coefficients within the respective further partition are zero, and entropy encode the quantization levels of the transform coefficients of the first transform coefficient block if the further indication indicates that the transform coefficients of the first transform coefficient block are encoded into the data stream and skip the encoding of the transform coefficients of the first transform coefficient block if the further indication indicates that the encoding of the transform coefficients of the first transform coefficient block within the respective further partition is skipped and all transform coefficients of the first transform coefficient block are zero, wherein the encoding of the indication 190 is performed using context-adaptive entropy coding using contexts which depend on the further indication and/or the quantization levels of the transform coefficients of the first transform coefficient block.

According to a further implementation, the encoder may be configured to encode into the data stream a first indication 114 of a first termination coefficient position at which, when traversing a first scan pattern which sequentially traverses transform coefficients of the first transform coefficient block along a forward direction, a first last non-zero transform coefficient resides, encode into the data stream first data representing a first coded set of transform coefficients traversed by the first scan pattern from the first termination coefficient position in reverse direction, the first data comprising quantization levels of non-zero transform coefficients in the first coded set of transform coefficients, encode into the data stream a second indication 114 of a second termination coefficient position at which, when traversing a second scan pattern which sequentially traverses transform coefficients of the second transform coefficient block along a forward direction, a second last non-zero transform coefficient resides, encode into the data stream second data representing a second coded set of transform coefficients traversed by the second scan pattern from the second termination coefficient position in reverse direction, the second data comprising quantization levels of non-zero transform coefficients in the second coded set of transform coefficients, wherein the encoding of the second indication is performed using context-adaptive entropy coding using contexts which depend on the first termination coefficient position.

According to another embodiment, a decoder for decoding a picture from a data stream, may be configured to subject a block of the picture separately for a first color component and a second color component to a transformation to obtain a first transform coefficient block and a second transform block, respectively, entropy decode the second transform coefficient block context-adaptively using contexts which depend on the first transform coefficient block.

According to one implementation, the decoder may be configured to decode for each partition of a set of partitions into which the second transform coefficient block is subdivided an indication 150 whether the transform coefficients within the respective partition are encoded into the data stream, or whether the encoding of the transform coefficients within the respective partition is skipped and all transform coefficients within the respective partition are zero, and entropy decode the quantization levels of the transform coefficients of the second transform coefficient block for partitions for which the indication indicates that the transform coefficients within the respective partition are encoded into the data stream and skip the decoding of the transform coefficients within the partitions for which the indication indicates that the encoding of the transform coefficients within the respective partition is skipped and all transform coefficients within the partitions are zero, wherein the decoding of the indication is performed using context-adaptive entropy coding using contexts which depend on the first transform coefficient block.

According to a further implementation, the decoder may be configured to decode for each further partition of a set of further partitions into which the first transform coefficient block is subdivided an further indication whether the transform coefficients within the respective further partition are encoded into the data stream, or whether the encoding of the transform coefficients within the respective further partition is skipped and all transform coefficients within the respective further partition are zero, and entropy decode the quantization levels of the transform coefficients of the first transform coefficient block for partitions for which the further indication indicates that the transform coefficients within the respective further partition are encoded into the data stream and skip the decoding of the transform coefficients within the further partitions for which the further indication indicates that the encoding of the transform coefficients within the respective further partition is skipped and all transform coefficients within the further partitions are zero, wherein the decoding of the indication is performed using context-adaptive entropy coding using contexts which depend on the further indication of the further partitions and/or the quantization levels of the transform coefficients of the first transform coefficient block.

According to a further implementation, the decoder may be configured to decode an indication 190 whether the transform coefficients within the second transform coefficient block are encoded into the data stream, or whether the encoding of the transform coefficients within the respective partition is skipped and all transform coefficients within the second transform coefficient block are zero, and entropy decode the quantization levels of the transform coefficients of the second transform coefficient block if the indication indicates that the transform coefficients of the second transform coefficient block are encoded into the data stream and skip the decoding of the transform coefficients of the second transform coefficient block if the indication indicates that the encoding of the transform coefficients of the second transform coefficient block is skipped and all transform coefficients within the partitions are zero, wherein the decoding of the indication 190 is performed using context-adaptive entropy coding using contexts which depend on the first transform coefficient block.

According to a further implementation, the decoder may be configured to decode a further indication 190 whether the transform coefficients of the first transform coefficient block are encoded into the data stream, or whether the encoding of the transform coefficients of the first transform coefficient block is skipped and all transform coefficients within the respective further partition are zero, and entropy decode the quantization levels of the transform coefficients of the first transform coefficient block if the further indication indicates that the transform coefficients of the first transform coefficient block are encoded into the data stream and skip the decoding of the transform coefficients of the first transform coefficient block if the further indication indicates that the encoding of the transform coefficients of the first transform coefficient block within the respective further partition is skipped and all transform coefficients of the first transform coefficient block are zero, wherein the decoding of the indication 190 is performed using context-adaptive entropy coding using contexts which depend on the further indication and/or the quantization levels of the transform coefficients of the first transform coefficient block.

According to a further implementation, the decoder may be configured to decode from the data stream a first indication 114 of a first termination coefficient position at which, when traversing a first scan pattern which sequentially traverses transform coefficients of the first transform coefficient block along a forward direction, a first last non-zero transform coefficient resides, decode from the data stream first data representing a first coded set of transform coefficients traversed by the first scan pattern from the first termination coefficient position in reverse direction, the first data comprising quantization levels of non-zero transform coefficients in the first coded set of transform coefficients, decode from the data stream a second indication 114 of a second termination coefficient position at which, when traversing a second scan pattern which sequentially traverses transform coefficients of the second transform coefficient block along a forward direction, a second last non-zero transform coefficient resides, decode from the data stream second data representing a second coded set of transform coefficients traversed by the second scan pattern from the second termination coefficient position in reverse direction, the second data comprising quantization levels of non-zero transform coefficients in the second coded set of transform coefficients, wherein the decoding of the second indication is performed using context-adaptive entropy coding using contexts which depend on the first termination coefficient position.

According to a further embodiment, an encoder for encoding a picture 12 into a data stream (14 may be configured to encode 108 a transform coefficient block 92 representing a block 84 of the picture 12 into the data stream 14 using a scan pattern 94 which sequentially traverses transform coefficients of the transform coefficient block 92 by encoding into the data stream 14 data 96 representing a coded set 100 shown hatched of transform coefficients 91 traversed by the scan pattern 94 [or scan path] from a first termination coefficient position 98 in a predetermined direction 102 to a second termination coefficient 104, the data 96 comprising quantization levels 106 of [at least] non-zero transform coefficients in the coded set 100 of transform coefficients, wherein the encoder is configured to entropy encode the quantization levels 106 context-adaptively using a first set 110 of contexts 112 for the quantization level of the non-zero transform coefficient at the first termination coefficient position 98 or at the second termination coefficient position 104 which is disjoint to a second set 110 of contexts 112 used for any other non-zero transform coefficient in the coded set 100 of transform coefficients.

According to one implementation, the encoder may be configured to encode into the data stream 14 an indication 114 of a termination coefficient position at which a, when traversing the scan pattern 94 along a forward direction 116, last non-zero transform coefficient resides, wherein the predetermined direction 102 is a reverse direction 118 and the first termination coefficient position is the termination coefficient position indicated by the indication 114 and the second termination coefficient position 104 is a coefficient position which is in the reverse direction 118 traversed latest along the scan pattern 94.

According to a further implementation, the encoder may be configured to use the first set of contexts for the non-zero transform coefficient at the first termination coefficient position 98.

According to a further implementation, the encoder may be, configured to use the first set of contexts for the non-zero transform coefficient at the second termination coefficient position.

According to a further implementation, the encoder may be configured to use the first set of contexts for the non-zero transform coefficient at the first termination coefficient position 98, and use a third set of contexts, disjoint from the first set, for the non-zero transform coefficient at the second termination coefficient position 98, wherein the first and third sets are disjoint from the second sets of contexts used for any non-zero transform coefficient in the coded set of transform coefficients lying, along the scan pattern, between the first and second termination coefficient positions.

According to a further implementation, the first set may be disjoint from the second sets of contexts used for the non-zero transform coefficients at coefficient positions which are in the reverse direction 118 traversed along the scan pattern 94 immediately after the first termination coefficient position 98 and immediately before the second termination coefficient position 104.

According to a further implementation, the disjointness may be independent from the first termination coefficient position 98.

According to a further implementation, the encoder may be configured to entropy encode 116 the quantization levels of the other non-zero transform coefficients of the transform coefficient block 92 context-adaptively, use, for each partition sub-block of partitions 120 into which the transform coefficient block 92 is subdivided, a set of contexts which is disjoint to the first set.

According to a further implementation, the partitions 120 into which the transform coefficient block is subdivided, may extend diagonally along a direction obliquely to a transform coefficient block's 92 diagonal 122 running through the second termination coefficient position e.g. DC position.

According to a further embodiment, a decoder for decoding a picture 12 from a data stream 14 may be configured to decode 108 a transform coefficient block 92 representing a block 84 of the picture 12 from the data stream 14 using a scan pattern 94 which sequentially traverses transform coefficients of the transform coefficient block 92 by decoding from the data stream 14 data 96 representing a coded set 100 shown hatched of transform coefficients 91 traversed by the scan pattern 94 [or scan path] from a first termination coefficient position 98 in a predetermined direction 102 to a second termination coefficient 104, the data 96 comprising quantization levels 106 of [at least] non-zero transform coefficients in the coded set 100 of transform coefficients, wherein the decoder is configured to entropy decode the quantization levels 106 context-adaptively using a first set 110 of contexts 112 for the quantization level of the non-zero transform coefficient at the first termination coefficient position 98 or at the second termination coefficient position 104 which is disjoint to a second set 110 of contexts 112 used for any other non-zero transform coefficient in the coded set 100 of transform coefficients.

According to one implementation, the decoder may be configured to decode from the data stream 14 an indication 114 of a termination coefficient position at which a, when traversing the scan pattern 94 along a forward direction 116, last non-zero transform coefficient resides, wherein the predetermined direction 102 is a reverse direction 118 and the first termination coefficient position is the termination coefficient position indicated by the indication 114 and the second termination coefficient position 104 is a coefficient position which is in the reverse direction 118 traversed latest along the scan pattern 94.

According to a further implementation, the decoder may be configured to use the first set of contexts for the non-zero transform coefficient at the first termination coefficient position 98.

According to a further implementation, the decoder may be configured to use the first set of contexts for the non-zero transform coefficient at the second termination coefficient position.

According to a further implementation, the decoder may be configured to use the first set of contexts for the non-zero transform coefficient at the first termination coefficient position 98, and use a third set of contexts, disjoint from the first set, for the non-zero transform coefficient at the second termination coefficient position 98, wherein the first and third sets are disjoint from the second sets of contexts used for any non-zero transform coefficient in the coded set of transform coefficients lying, along the scan pattern, between the first and second termination coefficient positions.

According to a further implementation, the decoder first set may be disjoint from the second sets of contexts used for the non-zero transform coefficients at coefficient positions which are in the reverse direction 118 traversed along the scan pattern 94 immediately after the first termination coefficient position 98 and immediately before the second termination coefficient position 104.

According to a further implementation, the disjointness may be independent from the first termination coefficient position 98.

According to a further implementation, the decoder may be configured to entropy decode 116 the quantization levels of the other non-zero transform coefficients of the transform coefficient block 92 context-adaptively, use, for each partition (sub-block) of partitions 120 into which the transform coefficient block 92 is subdivided, a set of contexts which is disjoint to the first set.

According to a further implementation, the partitions 120 into which the transform coefficient block is subdivided, may extend diagonally along a direction obliquely to a transform coefficient block's 92 diagonal 122 running through the second termination coefficient position (e.g. DC position).

According to another embodiment, an encoder for encoding a picture into a data stream, may be configured to entropy encode a quantization level of a currently encoded transform coefficient of a transform coefficient block 92 representing a block 84 of the picture 12 context-adaptively by use of a context which is determined based on a sum of, and a number of significant ones among, one or more previously encoded transform coefficients located at positions determined by the local template 132 positioned at the currently encoded transform coefficient.

According to one implementation, the encoder may be, configured to determine the context by forming a difference between a first value determined based on the sum and a second value determined based on the number.

According to a further implementation, the encoder may be configured to entropy encode the quantization level using context-adaptive binary arithmetic coding of a binarization of an absolute value of the quantization level involving a unary code, wherein the context is used for bins of the unary code.

According to another embodiment, a decoder for decoding a picture from a data stream may be configured to entropy decode a quantization level of a currently decoded transform coefficient of a transform coefficient block 92 representing a block 84 of the picture 12 context-adaptively by use of a context which is determined based on a sum of, and a number of significant ones among, one or more previously decoded transform coefficients located at positions determined by the local template 132 positioned at the currently decoded transform coefficient.

According to one implementation, the decoder may be configured to determine the context by forming a difference between a first value determined based on the sum and a second value determined based on the number.

According to a further implementation, the decoder may be configured to entropy decode the quantization level using context-adaptive binary arithmetic coding of a binarization of an absolute value of the quantization level involving a unary code, wherein the context is used for bins of the unary code.

According to another embodiment, an encoder for encoding a picture into a data stream may be configured to encode a transform coefficient block 92 representing a block 84 of the picture 12 into the data stream by encoding an absolute value of a quantization level of a currently encoded transform coefficient of the transform coefficient block in a manner binarized using a binarization 161 which is parameterized using a binarization parameter, setting of the binarization parameter [e.g. cutoff value; Exp Golomb order or Rice parameter] based on a sum of, and a number of significant ones among, one or more previously encoded transform coefficients located at positions determined by a local template 132 positioned at the currently encoded transform coefficient.

According to another embodiment, a decoder for decoding a picture from a data stream may be configured to decode a transform coefficient block 92 representing a block 84 of the picture 12 from the data stream by decoding an absolute value of a quantization level of a currently decoded transform coefficient of the transform coefficient block in a manner binarized using a binarization 161 which is parameterized using a binarization parameter, setting of the binarization parameter [e.g. cutoff value; Exp Golomb order or Rice parameter] based on a sum of, and a number of significant ones among, one or more previously decoded transform coefficients located at positions determined by a local template 132 positioned at the currently decoded transform coefficient.

According to another embodiment, an encoder for encoding a picture into a data stream may be configured to encode the transform coefficient block 92 representing a block 84 of the picture 12 into the data stream using a scan pattern 94 which sequentially traverses transform coefficients of the transform coefficient block by encoding an absolute value of quantization levels 106 of the transform coefficients of the transform coefficient block in a manner binarized using a unary code 160 below a cutoff value 164 and using a non-unary code 162, prefixed by the unary code 160 for the cutoff value, above the cutoff value, adaptively varying the cutoff value for the transform coefficients of the transform coefficient block depending on previously encoded transform coefficients without initial cutoff setting.

According to another embodiment, a decoder for decoding a picture from a data stream may be configured to decode the transform coefficient block 92 representing a block 84 of the picture 12 from the data stream using a scan pattern 94 which sequentially traverses transform coefficients of the transform coefficient block by decoding an absolute value of quantization levels 106 of the transform coefficients of the transform coefficient block in a manner binarized using a unary code 160 below a cutoff value 164 and using a non-unary code 162, prefixed by the unary code 160 for the cutoff value, above the cutoff value, adaptively varying the cutoff value for the transform coefficients of the transform coefficient block depending on previously decoded transform coefficients (without initial cutoff setting).

According to another embodiment, an encoder for encoding a picture into a data stream may be configured to encode a transform coefficient block 92 representing a block 84 of the picture 12 into the data stream by encoding an absolute value of a quantization level 106 of the transform coefficients of the transform coefficient block in a manner binarized using a unary code 160 below a cutoff value [i.e. for absolute values below the cutoff value] and using a non-unary code 162, prefixed by the unary code 160 for the cutoff value, above the cutoff value, [e.g. initially] setting the cutoff value 164 depending on one or more of a size of the block 84, a color component of the block 84, a prediction mode underlying a prediction signal a prediction residual of which the block 84 represents, a transformation underlying the transform coefficient block 92, a quantization parameter used to quantize the transform coefficient block 92, a measure of an energy of previously encoded transform coefficients, an evaluation of previously encoded transform coefficients located at positions determined by a local template 132 positioned at a currently encoded transform coefficient or located at positions within a partition of the transform coefficient block 92 offset to a current partition the currently encoded transform coefficient is located in and preceding the current partition according to a coding order used for encoding the absolute value of the quantization level 106 of the transform coefficients of the transform coefficient block defined by traversing the transform coefficients of the transform coefficient block along a scan pattern in a predetermined direction 102.

According to one implementation, the encoder may be configured to adaptively vary the cutoff value for the transform coefficients of the transform coefficient block depending on previously encoded transform coefficients if the cutoff value is initially set to a value succeeding a predetermined threshold [meaning finer quantization], and keep constant the cutoff value 164 at least preliminarily [e.g. until reaching the last partition in order direction 102 if the cutoff value is initially set to a value exceeding the predetermined threshold [meaning coarser quantization].

According to a further implementation, an encoder may adaptively vary the cutoff value for the currently encoded transform coefficient based on a sum of, and a number of significant ones among, one or more previously encoded transform coefficients located at positions determined by the local template 132 positioned at the currently encoded transform coefficient.

According to a further implementation, the encoder may be configured to entropy encode one or more bins of the unary code context-adaptively using, for each partition of partitions into which the transform coefficient block is subdivided, a set of contexts which is associated with the respective partition, wherein the encoder is configured to perform the setting for a predetermined partition in a manner depending on an evaluation of previously encoded transform coefficients located in a partition which is traversed by the coding order prior to the predetermined partition.

According to a further implementation, the encoder may be configured to adaptively vary the cutoff value in a manner including setting the cutoff value to zero so that no unary code exists if a measure of an energy of previously encoded transform coefficients increases a certain threshold.

According to another embodiment, a decoder for decoding a picture from a data stream may be configured to decode a transform coefficient block 92 representing a block 84 of the picture 12 from the data stream by decoding an absolute value of a quantization level 106 of the transform coefficients of the transform coefficient block in a manner binarized using a unary code 160 below a cutoff value [i.e. for absolute values below the cutoff value] and using a non-unary code 162, prefixed by the unary code 160 for the cutoff value, above the cutoff value, [e.g. initially] setting the cutoff value 164 depending on one or more of a size of the block 84, a color component of the block 84, a prediction mode underlying a prediction signal a prediction residual of which the block 84 represents, a transformation underlying the transform coefficient block 92, a quantization parameter used to quantize the transform coefficient block 92, a measure of an energy of previously decoded transform coefficients, an evaluation of previously decoded transform coefficients located at positions determined by a local template 132 positioned at a currently decoded transform coefficient or located at positions within a partition of the transform coefficient block 92 offset to a current partition the currently decoded transform coefficient is located in and preceding the current partition according to a coding order used for decoding the absolute value of the quantization level 106 of the transform coefficients of the transform coefficient block defined by traversing the transform coefficients of the transform coefficient block along a scan pattern in a predetermined direction 102.

According to one implementation, the decoder may be configured to adaptively vary the cutoff value for the transform coefficients of the transform coefficient block depending on previously decoded transform coefficients if the cutoff value is initially set to a value succeeding a predetermined threshold [meaning finer quantization], and keep constant the cutoff value 164 at least preliminarily [e.g. until reaching the last partition in order direction 102 if the cutoff value is initially set to a value exceeding the predetermined threshold [meaning coarser quantization].

According to a further implementation, the decoder may be configured to adaptively vary the cutoff value for the currently encoded transform coefficient based on a sum of, and a number of significant ones among, one or more previously encoded transform coefficients located at positions determined by the local template 132 positioned at the currently decoded transform coefficient.

According to a further implementation, the decoder may be configured to entropy decode one or more bins of the unary code context-adaptively using, for each partition of partitions into which the transform coefficient block is subdivided, a set of contexts which is associated with the respective partition, wherein the decoder is configured to perform the setting for a predetermined partition in a manner depending on an evaluation of previously decoded transform coefficients located in a partition which is traversed by the coding order prior to the predetermined partition.

According to a further implementation, the decoder may be configured to adaptively vary the cutoff value in a manner including setting the cutoff value to zero so that no unary code exists if a measure of an energy of previously decoded transform coefficients increases a certain threshold.

According to another embodiment, an encoder for encoding a picture into a data stream may be configured to entropy encode a quantization level of a currently encoded transform coefficient of a transform coefficient block 92 representing a block 84 of the picture 12 context-adaptively by setting a shape of a local template 132 or disabling the local template 132 [so that the template-specific context dependency is disabled] depending on previously encoded transform coefficients and/or depending on one or more of a size of the block 84, a position of a termination coefficient position at which, when traversing the scan pattern along a forward direction 116, a last non-zero transform coefficient resides, a transformation underlying the transform coefficient block 92, use of a context which is determined based on one or more previously encoded transform coefficients located at positions determined by the local template 130 positioned at the currently encoded transform coefficient, or if the local template disabled, is independent from previously encoded transform coefficients.

According to one implementation, the encoder may be configured to, in setting a shape of a local template depending on the previously encoded transform coefficients, set the shape of the local template depending on one or more previously encoded transform coefficients located at positions determined by a first local primitive template 170 positioned at the currently encoded transform coefficient.

According to a further implementation, the encoder may be configured to, in setting a shape of a local template depending on the previously encoded transform coefficients, decide depending on one or more previously encoded transform coefficients located at positions determined by a first local primitive template 170 positioned at the currently encoded transform coefficient, whether the shape of the local template 132 shall be the first local primitive template 170 or a second primitive template 172, wherein the second primitive template extends farther away from the currently encoded transform coefficient than the first second primitive template and includes or not includes the positions determined by the first local primitive template.

According to a further implementation, the encoder may be configured to perform the decision depending on a sum of, or a number of significant ones among, the one or more previously encoded transform coefficients located at positions determined by the first local primitive template 170 positioned at the currently encoded transform coefficient.

According to a further implementation, the encoder may be configured to disable the local template, if an accumulative value derived based on previously encoded transform coefficients within the transform coefficient block or a count of previously encoded transform coefficients within the transform coefficient block being greater than some threshold, exceeds a predetermined amount, and/or disable the local template, if a count of previously encoded transform coefficients within the transform coefficient block being insignificant, exceeds a predetermined amount.

According to a further implementation, the encoder may be configured to determine the context based on a sum of, or a number of significant ones among, the one or more previously encoded transform coefficients located at the positions determined by the local template positioned at the currently encoded transform coefficient.

According to another embodiment, a Decoder for decoding a picture from a data stream may be configured to entropy decode a quantization level of a currently decoded transform coefficient of a transform coefficient block 92 representing a block 84 of the picture 12 context-adaptively by setting a shape of a local template 132 or disabling the local template 132 [so that the template-specific context dependency is disabled] depending on previously decoded transform coefficients and/or depending on one or more of a size of the block 84, a position of a termination coefficient position at which, when traversing the scan pattern along a forward direction 116, a last non-zero transform coefficient resides, a transformation underlying the transform coefficient block 92, use of a context which is determined based on one or more previously decoded transform coefficients located at positions determined by the local template 130 positioned at the currently decoded transform coefficient, or if the local template disabled, is independent from previously decoded transform coefficients.

According to one implementation, the decoder may be configured to, in setting a shape of a local template depending on the previously decoded transform coefficients, set the shape of the local template depending on one or more previously decoded transform coefficients located at positions determined by a first local primitive template 170 positioned at the currently decoded transform coefficient 130.

According to a further implementation, the decoder may be configured to, in setting a shape of a local template depending on the previously decoded transform coefficients, decide depending on one or more previously decoded transform coefficients located at positions determined by a first local primitive template 170 positioned at the currently decoded transform coefficient, whether the shape of the local template 132 shall be the first local primitive template 170 or a second primitive template 172, wherein the second primitive template extends farther away from the currently decoded transform coefficient than the first second primitive template and includes or not includes the positions determined by the first local primitive template.

According to a further implementation, the decoder may be configured to perform the decision depending on a sum of, or a number of significant ones among, the one or more previously decoded transform coefficients located at positions determined by the first local primitive template 170 positioned at the currently decoded transform coefficient.

According to a further implementation, the decoder may be configured to disable the local template, if an accumulative value derived based on previously decoded transform coefficients within the transform coefficient block or a count of previously decoded transform coefficients within the transform coefficient block being greater than some threshold, exceeds a predetermined amount, and/or disable the local template, if a count of previously decoded transform coefficients within the transform coefficient block being insignificant, exceeds a predetermined amount.

According to a further implementation, the decoder may be configured to determine the context based on a sum of, or a number of significant ones among, the one or more previously decoded transform coefficients located at the positions determined by the local template positioned at the currently decoded transform coefficient.

According to another embodiment, an encoder for encoding a picture into a data stream may be configured to encode a transform coefficient 92 of a transform coefficient block 92 representing a block 84 of the picture 12 by entropy encoding quantization levels 106 of the transform coefficients of the transform coefficient block context-adaptively using, for each partition of partitions into which the transform coefficient block is subdivided, a set of contexts which is associated with the respective partition, wherein the partitions into which the transform coefficient block is subdivided, vary in shape [i.e. do not conform to each other] and/or are shaped depending on a scanning pattern along which the entropy encoding the quantization levels of the transform coefficients of the transform coefficient block is performed [and which may be signaled in the data stream, for instance, or determined inherently], and/or are shaped depending on a size of the block 84, and/or are shaped depending on explicit partition shaping information.

According to one implementation, the encoder may be configured to entropy encode the quantization levels of the transform coefficients of the transform coefficient block context-adaptively sequentially by following a scan pattern which sequentially traverses transform coefficients of the transform coefficient block in a manner traversing the partitions sequentially without interleaving transform coefficients of different partitions.

According to a further implementation, the partitions into which the transform coefficient block is subdivided, extend diagonally along a direction obliquely to a normal direction through a DC transform coefficient of the transform coefficient block.

According to another embodiment, a decoder for decoding a picture from a data stream may be configured to decode a transform coefficient 92 of a transform coefficient block 92 representing a block 84 of the picture 12 by entropy decoding quantization levels 106 of the transform coefficients of the transform coefficient block context-adaptively using, for each partition of partitions into which the transform coefficient block is subdivided, a set of contexts which is associated with the respective partition, wherein the partitions into which the transform coefficient block is subdivided, vary in shape [i.e. do not conform to each other] and/or are shaped depending on a scanning pattern along which the entropy decoding the quantization levels of the transform coefficients of the transform coefficient block is performed [and which may be signaled in the data stream, for instance, or determined inherently], and/or are shaped depending on a size of the block 84, and/or are shaped depending on explicit partition shaping information.

According to one implementation, the decoder may be configured to entropy decode the quantization levels of the transform coefficients of the transform coefficient block context-adaptively sequentially by following a scan pattern which sequentially traverses transform coefficients of the transform coefficient block in a manner traversing the partitions sequentially without interleaving transform coefficients of different partitions.

According to a further implementation, the partitions into which the transform coefficient block is subdivided, extend diagonally along a direction obliquely to a normal direction through a DC transform coefficient of the transform coefficient block.

According to another embodiment, an encoder for encoding a picture into a data stream may be configured to encode a transform coefficient of a transform coefficient block 92 representing a block 84 of the picture 12 by encoding for each partition of a set of partitions into which the transform coefficient block is subdivided an indication 150 whether all transform coefficients within the respective partition are encoded into the data stream, or whether the encoding of all transform coefficients within the respective partition is skipped and all transform coefficients within the respective partition are zero, and entropy encoding, for each partition for which the indication indicates that all transform coefficients within the respective partition are encoded into the data stream, quantization levels of all transform coefficients of the respective partition context-adaptively using a set of contexts which is associated with the respective partition.

According to one implementation, the encoder may be configured to entropy encode, for each partition for which the indication indicates that all transform coefficients within the respective partition are encoded into the data stream, the quantization levels of all transform coefficients of the respective partition by entropy encoding, for a last transform coefficient of the of the respective partition which is encoded last among the transform coefficients of the respective partition, a flag indicating whether the last transform coefficient is zero or not, irrespective of whether any of the previously encoded transform coefficients within the respective partition are all zero or not.

According to a further implementation, the decoder for decoding a picture from a data stream may be configured to decode a transform coefficient of a transform coefficient block 92 representing a block 84 of the picture 12 by decoding for each partition of a set of partitions into which the transform coefficient block is subdivided an indication 150 whether all transform coefficients within the respective partition are decoded into the data stream, or whether the decoding of all transform coefficients within the respective partition is skipped and all transform coefficients within the respective partition are zero, and entropy decoding, for each partition for which the indication indicates that all transform coefficients within the respective partition are decoded into the data stream, quantization levels of all transform coefficients of the respective partition context-adaptively using a set of contexts which is associated with the respective partition.

According to a further implementation, the decoder may be configured to entropy decode, for each partition for which the indication indicates that all transform coefficients within the respective partition are decoded into the data stream, the quantization levels of all transform coefficients of the respective partition by entropy decoding, for a last transform coefficient of the of the respective partition which is decoded last among the transform coefficients of the respective partition, a flag indicating whether the last transform coefficient is zero or not, irrespective of whether any of the previously decoded transform coefficients within the respective partition are all zero or not.

According to another embodiment, an encoder for encoding a picture into a data stream may be configured to encode a partitioning mode of a transform coefficient block 92 representing a block 84 of the picture 12 into the data stream, encode the transform coefficient by if the partition mode is a first mode [e.g. partition into partitions 120 switched on], entropy encoding quantization levels of the transform coefficients of the transform coefficient block context-adaptively using, for each partition of partitions into which the transform coefficient block is subdivided, a set of contexts which is associated with the respective partition, and if the partition mode is a second mode [e.g. partition into partitions 120 switched off], entropy encoding the quantization levels of the transform coefficients of the transform coefficient block context-adaptively using a global set of contexts (but depending on mode and with disjointness merely being optional).

According to one implementation, an encoder, configured to if the partition mode is the first mode, encode for each partition of a set of partitions an indication whether the quantization levels of the transform coefficients within the respective partition are encoded into the data stream, or whether the encoding of the quantization levels of the transform coefficients within the respective partition is skipped and all transform coefficients within the respective partition are zero, and skip, in entropy encoding the quantization levels of the transform coefficients, the entropy encoding with respect to partitions for which the indication indicates that the encoding of the quantization levels of the transform coefficients within the partitions is skipped and all transform coefficients within the partitions are zero.

According to an embodiment, a decoder for decoding a picture from a data stream may be configured to decode a partitioning mode of a transform coefficient block 92 representing a block 84 of the picture 12 from the data stream, decode the transform coefficient by if the partition mode is a first mode [e.g. partition into partitions 120 switched on], entropy decoding quantization levels of the transform coefficients of the transform coefficient block context-adaptively using, for each partition of partitions into which the transform coefficient block is subdivided, a set of contexts which is associated with the respective partition, and if the partition mode is a second mode [e.g. partition into partitions 120 switched off], entropy decoding the quantization levels of the transform coefficients of the transform coefficient block context-adaptively using a global set of contexts (→ as, but depending on mode and with disjointness merely being optional; such a some for the whole block 92.

According to one implementation, the decoder may be configured to if the partition mode is the first mode, decode for each partition of a set of partitions an indication whether the quantization levels of the transform coefficients within the respective partition are decoded into the data stream, or whether the decoding of the quantization levels of the transform coefficients within the respective partition is skipped and all transform coefficients within the respective partition are zero, and skip, in entropy decoding the quantization levels of the transform coefficients, the entropy decoding with respect to partitions for which the indication indicates that the decoding of the quantization levels of the transform coefficients within the partitions is skipped and all transform coefficients within the partitions are zero.

According to another embodiment, an encoder for encoding a picture into a data stream may be configured to encode a transform coefficient block 92 representing a block 84 of the picture 12 into the data stream 14 using a scan pattern 94' which sequentially traverses transform coefficients 91 of the transform coefficient block by entropy encoding quantization levels 106 of the transform coefficients of the transform coefficient block context-adaptively using, for each partition of partitions 120a,b,c into which the transform coefficient block is subdivided, a set 110a,b,c of contexts which is associated 126 with the respective partition 120, wherein the scan pattern 94' sequentially traverses the transform coefficients 91 of the transform coefficient block 92 in a manner so that at least one transform coefficient (such as the hatched ones 91') of a first partition e.g. 120a or 120c is traversed between two transform coefficients of a second partition e.g. 120b.

According to one implementation, the encoder may be configured so that one set of contexts is commonly associated with the first partition and second partitions e.g. 120a or 120c.

According to a further implementation, the encoder may be configured to, in entropy encoding the quantization levels of the transform coefficients of the transform coefficient block 92 context-adaptively, determine for a currently encoded transform coefficient 130 a context out of the set 110 of contexts 112 associated with the partition e.g. 120a the currently encoded transform coefficient is located in, based on one or more previously encoded transform coefficients located at positions determined by a local template 132 positioned at the currently encoded transform coefficient.

According to a further implementation, the encoder may be configured to, in entropy encoding the quantization levels of the transform coefficients of the transform coefficient block context-adaptively, determine for a currently encoded transform coefficient a context out of the set of contexts associated with the partition the currently encoded transform coefficient is located in, based on one or more previously encoded transform coefficients located at positions determined by a local template 132 positioned at the currently encoded transform coefficient, irrespective of whether the positions are within the partition the currently encoded transform coefficient is located in, and/or a count (exemplarily 4 in the example figure) of previously encoded transform coefficients e.g. hatched ones 140 located within the partition e.g. 120a the currently encoded transform coefficient 130 is located in, which exceed one or more certain thresholds.

According to a further implementation, the encoder may be configured to encode for each partition 120a,b,c of a set of partitions into which the transform coefficient block 92 is subdivided an indication 150 whether the transform coefficients within the respective partition are encoded into the data stream, or whether the encoding of the transform coefficients within the respective partition is skipped and all transform coefficients within the respective partition are zero, and skipping, in entropy encoding the quantization levels of the transform coefficients, the entropy encoding with respect to partitions for which the indication indicates that the encoding of the transform coefficients within the partitions is skipped and all transform coefficients within the partitions are zero.

According to a further implementation, the encoder may be configured to encode the indication 150 into the data stream in between the quantization levels of transform coefficients within partitions for which the indication indicates that the transform coefficients within the respective partition are encoded into the data stream e.g. for $120_1$ and $120_3$, in place of [in case of CBF being zero such as $CBF_2$ in the example], or in front of [in case of CBF being one such as $CBF_3$ in the example], a first encountered transform coefficient within the partition the indication relates to.

According to another embodiment, a decoder for decoding a picture from a data stream may be configured to decode a transform coefficient block 92 representing a block 84 of the picture 12 from the data stream 14 using a scan pattern 94' which sequentially traverses transform coefficients 91 of the transform coefficient block by entropy decoding quantization levels 106 of the transform coefficients of the transform coefficient block context-adaptively using, for each partition of partitions into which the transform coefficient block is subdivided, a set 110a,b,c of contexts which is associated 126 with the respective partition 120, wherein the scan pattern 94' sequentially traverses the transform coefficients 91 of the transform coefficient block 92 in a manner so that at least one transform coefficient (such as the hatched ones 91') of a first partition is traversed between two transform coefficients of a second partition.

According to one implementation, the decoder may be configured so that one set of contexts is commonly associated with the first partition and second partitions e.g. 120a or 120c.

According to a further implementation, the decoder may be configured to, in entropy decoding the quantization levels of the transform coefficients of the transform coefficient block 92 context-adaptively, determine for a currently encoded transform coefficient 130 a context out of the set 110 of contexts 112 associated with the partition e.g. 120a the currently decoded transform coefficient is located in, based on one or more previously encoded transform coefficients located at positions determined by a local template 132 positioned at the currently decoded transform coefficient.

According to a further implementation, the decoder may be configured to, in entropy decoding the quantization levels of the transform coefficients of the transform coefficient block context-adaptively, determine for a currently decoded transform coefficient a context out of the set of contexts associated with the partition the currently decoded transform coefficient is located in, based on one or more previously decoded transform coefficients located at positions determined by a local template 132 positioned at the currently decoded transform coefficient, irrespective of whether the positions are within the partition the currently decoded transform coefficient is located in, and/or a count (exemplarily 4 in the example figure of previously decoded transform coefficients e.g. hatched ones 140 located within the partition e.g. 120a the currently decoded transform coefficient 130 is located in, which exceed one or more certain thresholds.

According to a further implementation, the decoder may be configured to decode for each partition 120a,b,c of a set of partitions into which the transform coefficient block 92 is subdivided an indication 150 whether the transform coefficients within the respective partition are decoded into the data stream, or whether the decoding of the transform coefficients within the respective partition is skipped and all transform coefficients within the respective partition are zero, and skipping, in entropy decoding the quantization levels of the transform coefficients, the entropy decoding with respect to partitions for which the indication indicates that the decoding of the transform coefficients within the partitions is skipped and all transform coefficients within the partitions are zero.

According to a further implementation, the encoder may be configured to decode the indication 150 from the data stream in between the quantization levels of transform coefficients within partitions for which the indication indicates that the transform coefficients within the respective partition are decoded into the data stream e.g. for $120_1$ and $120_3$, in place of [in case of CBF being zero such as $CBF_2$ in the example], or in front of [in case of CBF being one such as $CBF_3$ in the example], a first encountered transform coefficient within the partition the indication relates to.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A video encoder configured to:
   entropy encode an absolute value of a quantization level of a current transform coefficient at position (xC, yC), wherein the absolute value is encoded using context adaptive binary arithmetic encoding of bins of a first binarization; and
   for the current transform coefficient, encode a bin of the first binarization by using a context which is determined based on
      a sum of minimum absolute values of transform coefficient quantization levels, based on encoded bins of the first binarization, at one or more transform coefficient positions among (xC+1, yC), (xC+2, yC), (xC+1, yC+1), (xC, yC+1), and (xC, yC+2).

2. The video encoder of claim 1, wherein the context is determined further based on
   a number of significant, i.e., nonzero, transform coefficient quantization levels at the one or more transform coefficient positions among (xC+1, yC), (xC+2, yC), (xC+1, yC+1), (xC, yC+1), and (xC, yC+2).

3. The video encoder of claim 2, wherein the context is determined based on a difference of the sum and the number.

4. The video encoder of claim 1, wherein the absolute value of the quantization level of the current transform coefficient is encoded further based on a second binarization, bins of the second binarization encoded using equiprobability bypass coding.

5. The video encoder of claim 1, wherein bins of the first binarization include a first bin in bin order which indicates whether an absolute value of a quantization level of a respective transform coefficient is significant, i.e., nonzero, a second bin in bin order which indicates whether the absolute value of the quantization level of the respective transform coefficient is greater than one, a third bin in bin order which indicates whether the absolute value of the quantization level of the respective transform coefficient has odd or even parity, and a fourth bin in bin order which indicates whether the absolute value of the quantization level of the respective transform coefficient is greater than three.

6. The video encoder of claim 1, wherein the absolute value of the quantization level of the current transform coefficient is encoded in multiple passes of a transform block.

7. A video decoder configured to:
   determine an absolute value of a quantization level of a current transform coefficient at position (xC, yC), wherein the absolute value is determined based on context adaptive binary arithmetic decoding of bins of a first binarization; and
   for the current transform coefficient, decode a bin of the first binarization by using a context which is determined based on
      a sum of minimum absolute values of transform coefficient quantization levels, based on decoded bins of the first binarization, at one or more transform coefficient positions among (xC+1, yC), (xC+2, yC), (xC+1, yC+1), (xC, yC+1), and (xC, yC+2).

8. The video decoder of claim 7, wherein the context is determined further based on
   a number of significant, i.e., nonzero, transform coefficient quantization levels at the one or more transform coefficient positions among (xC+1, yC), (xC+2, yC), (xC+1, yC+1), (xC, yC+1), and (xC, yC+2).

9. The video decoder of claim 8, wherein the context is determined based on a difference of the sum and the number.

10. The video decoder of claim 7, wherein the absolute value of the quantization level of the current transform coefficient is determined further based on decoded bins of a second binarization, bins of the second binarization decoded using equiprobability bypass coding.

11. The video decoder of claim 7, wherein bins of the first binarization include a first bin in bin order which indicates whether an absolute value of a quantization level of a respective transform coefficient is significant, i.e., nonzero, a second bin in bin order which indicates whether the absolute value of the quantization level of the respective transform coefficient is greater than one, a third bin in bin order which indicates whether the absolute value of the quantization level of the respective transform coefficient has odd or even parity, and a fourth bin in bin order which indicates whether the absolute value of the quantization level of the respective transform coefficient is greater than three.

12. The video decoder of claim 7, wherein the absolute value of the quantization level of the current transform coefficient is determined in multiple passes of a transform block.

13. A method of video encoding, the method comprising:
   entropy encoding an absolute value of a quantization level of a current transform coefficient at position (xC, yC), wherein the absolute value is encoded using context adaptive binary arithmetic encoding of bins of a first binarization; and
   for the current transform coefficient, encoding a bin of the first binarization by using a context which is determined based on
      a sum of minimum absolute values of transform coefficient quantization levels, based on encoded bins of the first binarization, at one or more transform coefficient positions among (xC+1, yC), (xC+2, yC), (xC+1, yC+1), (xC, yC+1), and (xC, yC+2).

14. The method of claim 13, wherein the context is determined further based on
a number of significant, i.e., nonzero, transform coefficient quantization levels at the one or more transform coefficient positions among (xC+1, yC), (xC+2, yC), (xC+1, yC+1), (xC, yC+1), and (xC, yC+2).

15. The method of claim 14, wherein the context is determined based on a difference of the sum and the number.

16. The method of claim 13, wherein the absolute value of the quantization level of the current transform coefficient is encoded further based on a second binarization, bins of the second binarization encoded using equiprobability bypass coding.

17. The method of claim 13, wherein bins of the first binarization include a first bin in bin order which indicates whether an absolute value of a quantization level of a respective transform coefficient is significant, i.e., nonzero, a second bin in bin order which indicates whether the absolute value of the quantization level of the respective transform coefficient is greater than one, a third bin in bin order which indicates whether the absolute value of the quantization level of the respective transform coefficient has odd or even parity, and a fourth bin in bin order which indicates whether the absolute value of the quantization level of the respective transform coefficient is greater than three.

18. The method of claim 13, wherein the absolute value of the quantization level of the current transform coefficient is encoded in multiple passes of a transform block.

19. A method of video decoding, the method comprising:
determining an absolute value of a quantization level of a current transform coefficient at position (xC, yC), wherein the absolute value is determined using context adaptive binary arithmetic decoding of bins of a first binarization; and
for the current transform coefficient, decoding a bin of the first binarization by using a context which is determined based on
a sum of minimum absolute values of transform coefficient quantization levels, based on decoded bins of the first binarization, at one or more transform coefficient positions among (xC+1, yC), (xC+2, yC), (xC+1, yC+1), (xC, yC+1), and (xC, yC+2).

20. The method of claim 19, wherein the context is determined further based on
a number of significant, i.e., nonzero, transform coefficient quantization levels at the one or more transform coefficient positions among (xC+1, yC)(xC+2, yC), (xC+1, yC+1), (xC, yC+1), and (xC, yC+2).

21. The method of claim 20, wherein the context is determined based on a difference of the sum and the number.

22. The method of claim 19, wherein the absolute value of the quantization level of the current transform coefficient is determined further based on decoded bins of a second binarization, bins of the second binarization decoded using equiprobability bypass coding.

23. The method of claim 19, wherein bins of the first binarization include a first bin in bin order which indicates whether an absolute value of a quantization level of a respective transform coefficient is significant, i.e., nonzero, a second bin in bin order which indicates whether the absolute value of the quantization level of the respective transform coefficient is greater than one, a third bin in bin order which indicates whether the absolute value of the quantization level of the respective transform coefficient has odd or even parity, and a fourth bin in bin order which indicates whether the absolute value of the quantization level of the respective transform coefficient is greater than three.

24. The method of claim 19, wherein the absolute value of the quantization level of the current transform coefficient is determined in multiple passes of a transform block.

25. A non-transitory digital storage medium having a computer program stored thereon to perform, when the computer program is run by a computer, a method of video encoding, the method comprising:
entropy encoding an absolute value of a quantization level of a current transform coefficient at position (xC, yC), wherein the absolute value is encoded using context adaptive binary arithmetic encoding of bins of a first binarization; and
for the current transform coefficient, encoding a bin of the first binarization by using a context which is determined based on
a sum of minimum absolute values of transform coefficient quantization levels, based on encoded bins of the first binarization, at one or more transform coefficient positions among (xC+1, yC), (xC+2, yC), (xC+1, yC+1), (xC, yC+1), and (xC, yC+2).

26. The non-transitory digital storage medium of claim 25, wherein the context is determined further based on
a number of significant, i.e., nonzero, transform coefficient quantization levels at the one or more transform coefficient positions among (xC+1, yC), (xC+2, yC), (xC+1, yC+1), (xC, yC+1), and (xC, yC+2).

27. The non-transitory digital storage medium claim 26, wherein the context is determined based on a difference of the sum and the number.

28. The non-transitory digital storage medium of claim 25, wherein the absolute value of the quantization level of the current transform coefficient is encoded further based on a second binarization, bins of the second binarization encoded using equiprobability bypass coding.

29. The non-transitory digital storage medium of claim 25, wherein bins of the first binarization include a first bin in bin order which indicates whether an absolute value of a quantization level of a respective transform coefficient is significant, i.e., nonzero, a second bin in bin order which indicates whether the absolute value of the quantization level of the respective transform coefficient is greater than one, a third bin in bin order which indicates whether the absolute value of the quantization level of the respective transform coefficient has odd or even parity, and a fourth bin in bin order which indicates whether the absolute value of the quantization level of the respective transform coefficient is greater than three.

30. The non-transitory digital storage medium of claim 25, wherein the absolute value of the quantization level of the current transform coefficient is encoded in multiple passes of a transform block.

31. A non-transitory digital storage medium having a computer program stored thereon to perform, when the computer program is run by a computer, a method of video decoding, the method comprising:
determining an absolute value of a quantization level of a current transform coefficient at position (xC, yC), wherein the absolute value is determined using context adaptive binary arithmetic decoding of bins of a first binarization; and for the current transform coefficient, decoding a bin of the first binarization by using a context which is determined based on a sum of minimum absolute values of transform coefficient quantization levels, based on decoded bins of the first binarization, at one or more transform coefficient positions among (xC+1, yC), (xC+2, yC), (xC+1, yC+1), (xC, yC+1), and (xC, yC+2).

32. The non-transitory digital storage medium of claim 31, wherein the context is determined further based on a number of significant, i.e., nonzero, transform coefficient quantization levels at the one or more transform coefficient positions among (xC+1, yC), (xC+2, yC), (xC+1, yC+1), (xC, yC+1), and (xC, yC+2).

33. The non-transitory digital storage medium of claim 32, wherein the context is determined based on a difference of the sum and the number.

34. The non-transitory digital storage medium of claim 31, wherein the absolute value of the quantization level of the current transform coefficient is determined further based on decoded bins of a second binarization, bins of the second binarization decoded using equi-probability bypass coding.

35. The non-transitory digital storage medium of claim 31, wherein bins of the first binarization include a first bin in bin order which indicates whether an absolute value of a quantization level of a respective transform coefficient is significant, i.e., nonzero, a second bin in bin order which indicates whether the absolute value of the quantization level of the respective transform coefficient is greater than one, a third bin in bin order which indicates whether the absolute value of the quantization level of the respective transform coefficient has odd or even parity, and a fourth bin in bin order which indicates whether the absolute value of the quantization level of the respective transform coefficient is greater than three.

36. The non-transitory digital storage medium of claim 31, wherein the absolute value of the quantization level of the current transform coefficient is determined in multiple passes of a transform block.

* * * * *